United States Patent
Ye et al.

(10) Patent No.: US 12,464,161 B2
(45) Date of Patent: *Nov. 4, 2025

(54) MOTION-COMPENSATION PREDICTION BASED ON BI-DIRECTIONAL OPTICAL FLOW

(71) Applicant: InterDigital VC Holdings, Inc., Wilmington, DE (US)

(72) Inventors: Yan Ye, San Diego, CA (US); Xiaoyu Xiu, San Diego, CA (US); Yuwen He, San Diego, CA (US)

(73) Assignee: InterDigital VC Holdings, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/749,991

(22) Filed: May 20, 2022

(65) Prior Publication Data

US 2022/0368943 A1 Nov. 17, 2022

Related U.S. Application Data

(63) Continuation of application No. 16/628,480, filed as application No. PCT/US2018/040681 on Jul. 3, 2018, now Pat. No. 11,363,293.

(Continued)

(51) Int. Cl.
*H04N 19/577* (2014.01)
*H04N 19/103* (2014.01)
(Continued)

(52) U.S. Cl.
CPC ......... *H04N 19/577* (2014.11); *H04N 19/103* (2014.11); *H04N 19/139* (2014.11); *H04N 19/176* (2014.11)

(58) Field of Classification Search
None
See application file for complete search history.

(56) References Cited

U.S. PATENT DOCUMENTS

| | | |
|---|---|---|
| 2015/0350671 A1 | 12/2015 | Alshin et al. |
| 2017/0094305 A1* | 3/2017 | Li .................... H04N 19/52 |

(Continued)

FOREIGN PATENT DOCUMENTS

| | | |
|---|---|---|
| AU | 2001236214 B2 | 9/2005 |
| AU | 2013205783 A1 | 12/2013 |

(Continued)

OTHER PUBLICATIONS

"JEM-6.0 Reference Software", Available at <https://jvet.hhi.fraunhofer.de/svn/svn_HMJEMSoftware/tags/HM-16.6-JEM-6.0>, 1 page.

(Continued)

*Primary Examiner* — Chikaodili E Anyikire
(74) *Attorney, Agent, or Firm* — Condo Roccia Koptiw LLP

(57) ABSTRACT

A device may determine whether to enable or disable bi-directional optical flow (BIO) for a current coding unit (CU) (e.g., block and/or sub-block). Prediction information for the CU may be identified and may include prediction signals associated with a first reference block and a second reference block (e.g., or a first reference sub-block and a second reference sub-block). A prediction difference may be calculated and may be used to determine the similarity between the two prediction signals. The CU may be reconstructed based on the similarity. For example, whether to reconstruct the CU with BIO enabled or BIO disabled may be based on whether the two prediction signals are similar. It may be determined to enable BIO for the CU when the two prediction signals are determined to be dissimilar. For (Continued)

example, the CU may be reconstructed with BIO disabled when the two prediction signals are determined to be similar.

16 Claims, 36 Drawing Sheets

Related U.S. Application Data

(60) Provisional application No. 62/599,241, filed on Dec. 15, 2017, provisional application No. 62/579,559, filed on Oct. 31, 2017, provisional application No. 62/564,598, filed on Sep. 28, 2017, provisional application No. 62/560,823, filed on Sep. 20, 2017, provisional application No. 62/528,296, filed on Jul. 3, 2017.

(51) Int. Cl.
*H04N 19/139* (2014.01)
*H04N 19/176* (2014.01)

(56) References Cited

U.S. PATENT DOCUMENTS

| | | | |
|---|---|---|---|
| 2018/0192071 A1* | 7/2018 | Chuang | H04N 19/517 |
| 2018/0242004 A1 | 8/2018 | Park et al. | |
| 2018/0262773 A1* | 9/2018 | Chuang | H04N 19/577 |
| 2018/0278949 A1* | 9/2018 | Karczewicz | H04N 19/513 |
| 2019/0045214 A1* | 2/2019 | Ikai | H04N 19/52 |
| 2019/0045215 A1* | 2/2019 | Chen | H04N 19/577 |
| 2019/0320199 A1* | 10/2019 | Chen | H04N 19/105 |
| 2020/0221122 A1* | 7/2020 | Ye | H04N 19/103 |
| 2021/0127133 A1* | 4/2021 | Chen | H04N 19/577 |
| 2021/0281869 A1 | 9/2021 | Ugur et al. | |

FOREIGN PATENT DOCUMENTS

| | | |
|---|---|---|
| CN | 105847804 A | 8/2016 |
| EP | 3340620 A1 | 6/2018 |
| JP | 2018-536320 A | 12/2018 |
| RU | 2565363 C2 | 10/2015 |
| TW | 201715891 A | 5/2017 |
| WO | 00/18134 A1 | 3/2000 |
| WO | 2014/107074 A1 | 7/2014 |
| WO | 2017/034089 A1 | 3/2017 |
| WO | 2017/036399 A1 | 3/2017 |

OTHER PUBLICATIONS

"JEM-7.0 Reference Software", Available at <https://jvet.hhi.fraunhofer.de/svn/svn_HMJEMSoftware/tags/HM-16.6-JEM-7.0>, 1 page.
Alshin et al., "AHG6: On Bio Memory Bandwidth", JVET-D0042, Samsung Electronics Ltd., Joint Video Exploration Team (JVET) of ITU-T SG 16 WP 3 and ISO/IEC JTC 1/SC 29/WG 11, 4th Meeting: Chengdu, CN, Oct. 15-21, 2016, pp. 1-5.
Alshina et al., "Known Tools Performance Investigation for Next Generation Video Coding", VCEG-AZ05, Samsung Electronics, ITU—Telecommunications Standardization Sector, Study Group 16 Question 6, Video Coding Experts Group (VCEG), 52nd Meeting, Warsaw, Poland, Jun. 19-26, 2015, 5 pages.
Bross et al., "High Efficiency Video Coding (HEVC) Text Specification Draft 10 (for FDIS & Consent)", JCTVC-L1003_V1, Editor, Joint Collaborative Team on Video Coding (JCT-VC) of ITU-T SG 16 WP 3 and ISO/IEC JTC 1/SC 29/WG 11, 12th Meeting: Geneva, CH, Jan. 14-23, 2013, 321 pages.
Chen et al., "Algorithm Description of Joint Exploration Test Model 7 (JEM 7)", JVET-G1001-V1, Editors, Joint Video Exploration Team (JVET) of ITU-T SG16 WP3 and ISO/IEC JTC 1/SC 29/WG 11, 7th Meeting: Torino, IT, Jul. 13-21, 2017, 50 pages.
Chen et al., "Algorithm Description of Joint Exploration Test Model 6 (JEM 6)", JVET-F1001-V2, Editors, Joint Video Exploration Team (JVET) of ITU-T SG 16 WP 3 and ISO/IEC JTC 1/SC 29/WG 11, Hobart, AU, Mar. 31-Apr. 7, 2017, 49 pages.
Chen et al., "Coding Tools Investigation for Next Generation Video Coding", Qualcomm Incorporated, COM 16-C 806-E, International Telecommunication Union, Telecommunication Standardization Sector, Jan. 2015, pp. 1-7.
Chuang et al., "A Block-Based Design for Bi-Directional Optical Flow (BIO)", JVET-F0022, Qualcomm Inc., Joint Video Exploration Team (JVET) of ITU-T SG 16 WP 3 and ISO/IEC JTC 1/SC 29/WG 11, 6th Meeting: Hobart, AU, Mar. 31-Apr. 7, 2017, pp. 1-3.
ITU-T, "Advanced Video Coding for Generic Audiovisual Services", ITU-T Recommendation H.264, Series H: Audiovisual and Multimedia Systems, Infrastructure of Audiovisual Services—Coding of Moving Video, Nov. 2007, 564 pages.
Karczewicz et al., "Report of AHG1 on Coding Efficiency Improvements", VCEG-AZ01, Qualcomm, Samsung, ITU—Telecommunications Standardization Sector, Study Group 16 Question 6, Video Coding Experts Group (VCEG), 52nd Meeting: Warsaw, Poland, Jun. 19-26, 2015, 2 pages.
Lee et al., "Bio Improvement to Reduce the Encoder and Decoder Complexities", JVET-C0031, LG Electronics, Joint Video Exploration Team (JVET) of ITU-T SG 16 WP 3 and ISO/IEC JTC 1/SC 29/WG 11, 3rd Meeting: Geneva, CH, May 26-31, 2016, pp. 1-4.
Ohm et al., "Report of AHG on Future Video Coding Standardization Challenges", AHG, ISO/IEC JTC1/SC29/WG11 MPEG2014/M36782, Warsaw, Poland, Jun. 2015, 4 pages.
SMPTE, "VC-1 Compressed Video Bitstream Format and Decoding Process", SMPTE 421M, Apr. 2006, 493 pages.
Tourapis et al., "H.264/14496-10 AVC Reference Software Manual", JVT-AE010, Dolby Laboratories Inc., Fraunhofer-Institute HHI, Microsoft Corporation, Joint Video Team (JVT) of ISO/IEC MPEG & ITU-T VCEG (ISO/IEC JTC1/SC29/WG11 and ITI-T SG16 Q.6), 31st Meeting: London, UK, Jun. 28-Jul. 3, 2009, 90 pages.
Wikipedia, "SIMD", Available at <https://en.wikipedia.org/wiki/SIMD>, pp. 1-8.
Alshin et al., "Bi-Directional Optical Flow for Improving Motion Compensation", Samsung Electronics Co., Ltd., 28th Picture Coding Symposium, PCS2010, Nagoya, Japan, Dec. 8-10, 2010, pp. 422-425.

* cited by examiner

MOTION-COMPENSATION PREDICTION BASED ON BI-DIRECTIONAL OPTICAL FLOW

CROSS-REFERENCE

This application is a continuation application of U.S. Non-Provisional application Ser. No. 16/628,480, which is the National Stage Entry under 35 U.S.C. § 371 of Patent Cooperation Treaty Application No. PCT/US2018/040681, filed Jul. 3, 2018, which claims the benefit of: U.S. Provisional Application No. 62/528,296, filed Jul. 3, 2017; U.S. Provisional Application No. 62/560,823, filed Sep. 20, 2017; U.S. Provisional Application No. 62/564,598, filed Sep. 28, 2017; U.S. Provisional Application No. 62/579,559, filed Oct. 31, 2017; and U.S. Provisional Application No. 62/599,241, filed Dec. 15, 2017, the contents of which are incorporated by reference herein.

BACKGROUND

Video coding systems are widely used to compress digital video signals to reduce the storage need and/or transmission bandwidth of such signals. There are various types of video coding systems, such as block-based, wavelet-based, and object-based systems. Currently block-based hybrid video coding systems are widely used and/or deployed. Examples of block-based video coding systems include international video coding standards such as the MPEG1/2/4 part 2, H.264/MPEG-4 part 10 AVC, VC-1, and the latest video coding standard called High Efficiency Video Coding (HEVC), which was developed by JCT-VC (Joint Collaborative Team on Video Coding) of ITU-T/SG16/Q.6/VCEG and ISO/IEC/MPEG.

SUMMARY

A device for performing video data coding may be configured to determine whether to enable or disable bi-directional optical flow (BIO) for a current coding unit (e.g., a block and/or a sub-block). Prediction information for the current coding unit may be identified. The prediction information may include a prediction signal associated with a first reference block (e.g., or sub-block) and a prediction signal associated with a second reference block (e.g., or sub-block). A prediction difference between the two prediction signals may be calculated. The similarity between the two prediction signals may be determined based on the prediction difference. The current coding unit may be reconstructed based on the similarity of the two prediction signals. For example, whether to reconstruct the current coding unit with BIO enabled or BIO disabled may be determined based on whether the two prediction signals are sufficiently similar. It may be determined to enable BIO for the current coding unit when the two prediction signals are determined not to be similar (e.g., dissimilar). For example, the current coding unit may be reconstructed with BIO disabled when the two prediction signals are determined to be similar.

The prediction difference, which may be used to determine the similarity between two prediction signals, may be determined in multiple ways. For example, calculating the prediction difference may include calculating an average difference between the respective sample values of two reference blocks associated with the two prediction signals. The sample values may be interpolated from their respective reference blocks. For example, calculating the prediction difference may include calculating an average motion vector difference between the respective motion vectors of two reference blocks associated with the two prediction signals. The motion vectors may be scaled based on the temporal distance between a reference picture and a current coding unit.

The similarity between the two prediction signals may be determined by comparing the prediction difference between two prediction signals to a threshold. When the prediction difference is less than or equal to the threshold, the two prediction signals may be determined to be similar. When the prediction difference is greater than the threshold, the two prediction signals may not be determined to be sufficiently similar (e.g., dissimilar). The threshold may be determined by the video coding device and/or received at the video coding device. The threshold may be determined based on a desired complexity level and/or a desired coding efficiency.

A device for performing video data coding may be configured to group one or more sub-blocks into a sub-block group. For example, contiguous sub-blocks that have similar motion information may be grouped together into a sub-block group. Sub-block groups may vary in shape and size, and may be formed based on the shape and or size of a current coding unit. Sub-blocks may be grouped horizontally and/or vertically. A motion compensation operation (e.g., a single motion compensation operation) may be performed on the sub-block group. BIO refinement may be performed for the sub-block group. For example, the BIO refinement may be based on the gradient values of the sub-block of the sub-block group.

BIO gradients may be derived such that single instruction multiple data (SIMD) based acceleration may be utilized. In one or more techniques, the BIO gradient may be derived by applying interpolation filters and gradient filters where horizontal filtering may be performed followed by a vertical filtering. In BIO gradient derivation, rounding operations may be performed on the input values, which may be implemented by additions and right shifts.

Devices, processes, and instrumentalities are disclosed for skipping BIO operations at the (e.g., regular) motion compensation (MC) stage (e.g., block level) of a video encoder and/or decoder. In one or more techniques, the BIO operation may be (e.g., partially or completely) disabled for one or more blocks/sub-blocks where one or more factors/conditions may be satisfied. BIO may be disabled for block(s)/sub-block(s) that are coded in/by a frame-rate up conversion (FRUC) bilateral mode. BIO may be disabled for block(s)/sub-block(s) that are predicted by at least two motion vectors which are approximately proportional in the temporal domain. BIO may be disabled when an average difference between at least two prediction blocks is less than, or equal to, a pre-defined/predetermined threshold. BIO may be disabled based on gradient information.

A decoding device for video data coding may comprise a memory. The decoding device may comprise a processor. The processor may be configured to identify a plurality of sub-blocks of at least one coding unit (CU). The processor may be configured to select one or more sub-blocks of the plurality of sub-blocks for MC. The processor may be configured to determine a status of an MC condition as satisfied, or unsatisfied. The processor may be configured to initiate motion compensation without BIO motion refinement processing for the one or more sub-blocks if the status of the MC condition is satisfied. The processor may be configured to initiate motion compensation with BIO motion refinement processing for the one or more sub-blocks if the status of MC condition is unsatisfied.

BRIEF DESCRIPTION OF THE DRAWINGS

Like reference numerals in the figures indicate like elements.

DETAILED DESCRIPTION

A detailed description of illustrative embodiments will now be described with reference to the various Figures. Although this description provides a detailed example of possible implementations, it should be noted that the details are intended to be exemplary and in no way limit the scope of the application.

Figure 1:
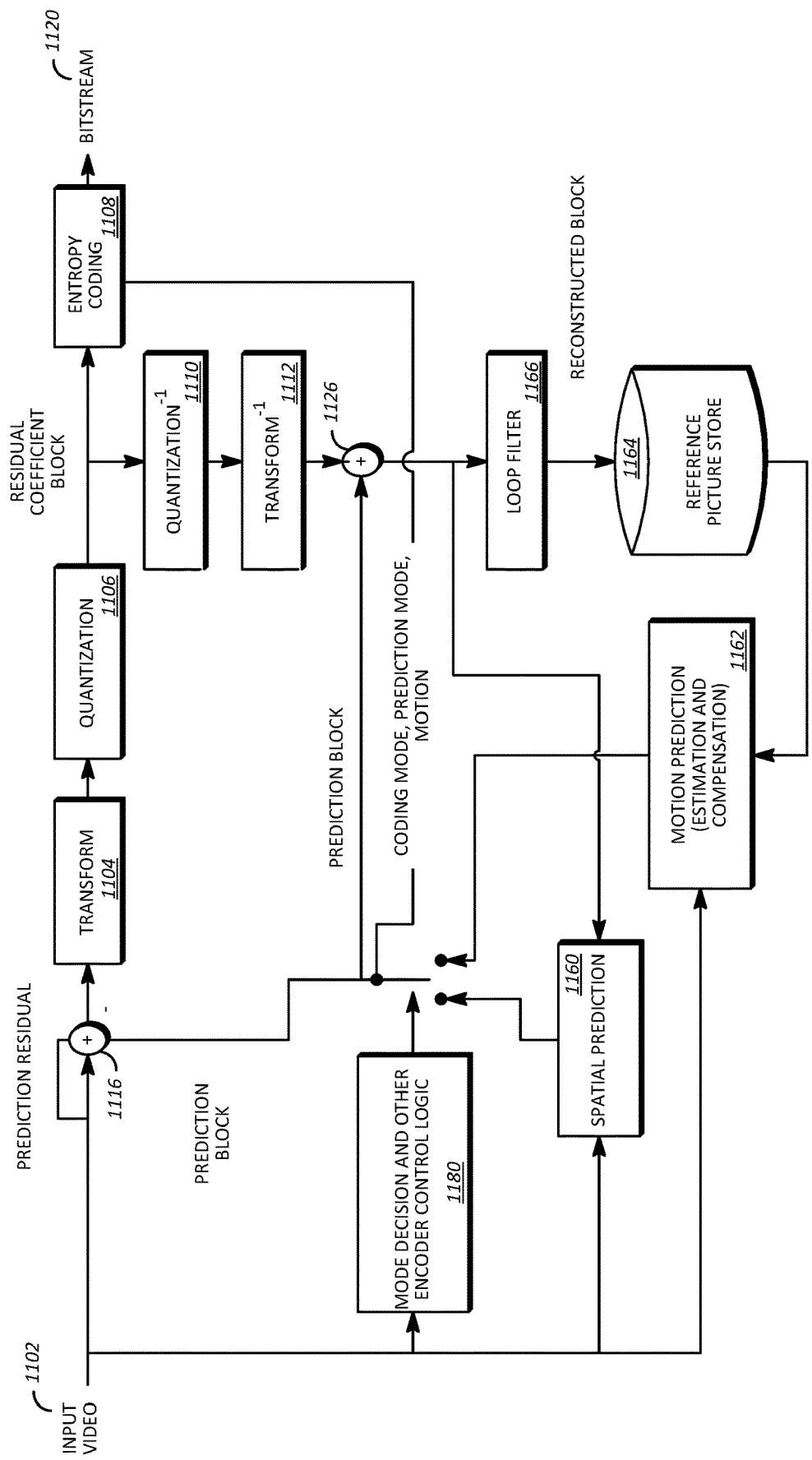
FIG. 1 illustrates an example general diagram of block-based video encoder.

FIG. 1 illustrates an example block diagram of a block-based hybrid video encoding system. The input video signal 1102 may be processed block by block. Extended block sizes (called a "coding unit" or CU) may be used to efficiently compress high resolution (1080p and beyond) video signals. A CU can be up to 64×64 pixels. A CU can be further partitioned into prediction units (PU), for which separate prediction methods are applied. For one or more, or each, input video block (MB or CU), spatial prediction (1160) and/or temporal prediction (1162) may be performed. Spatial prediction (or "intra prediction") uses pixels from the samples of already coded neighboring blocks (e.g., which are called reference samples) in the same video picture/slice to predict the current video block. Spatial prediction may reduce spatial redundancy inherent in the video signal. Temporal prediction (e.g., also referred to as "inter prediction" and/or "motion compensated prediction") may use reconstructed pixels from the already coded video pictures to predict the current video block. Temporal prediction may reduce temporal redundancy inherent in the video signal.

Temporal prediction signal for a given video block may be signaled by one or more motion vectors which indicate the amount and/or the direction of motion between the current block and its reference block. Also, if multiple reference pictures are supported, then for one or more, or each, video block, its reference picture index may be sent. The reference index may be used to identify from which reference picture in the reference picture store (1164) the temporal prediction signal comes. After spatial and/or temporal prediction, the mode decision block (1180) in the encoder may choose the best prediction mode, for example based on the rate-distortion optimization method.

The prediction block may be subtracted from the current video block (1116). The prediction residual may be de-correlated using transform (1104) and/or quantized (1106). The quantized residual coefficients may be inverse quantized (1110) and/or inverse transformed (1112) to form the reconstructed residual, which may be added back to the prediction block (1126) to form the reconstructed video block. Further in-loop filtering such as de-blocking filter and/or Adaptive Loop Filters may be applied (1166) on the reconstructed video block, perhaps before it is put in the reference picture store (1164) and/or used to code future video blocks. To form the output video bit-stream 1120, coding mode (e.g., inter and/or intra), prediction mode information, motion information, and/or quantized residual coefficients may be sent to the entropy coding unit (1108) to be further compressed and/or packed to form the bit-stream.

Figure 2:
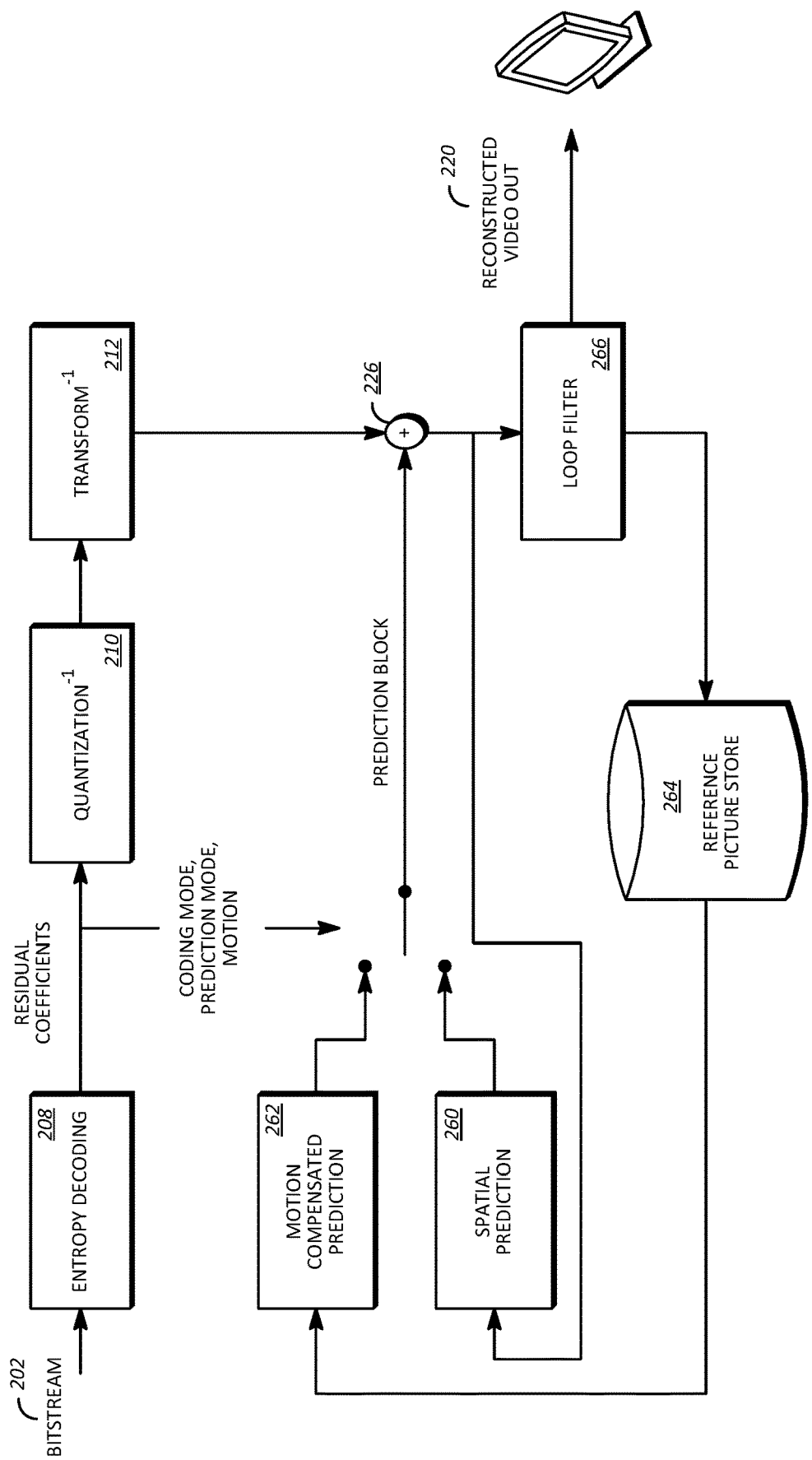
FIG. 2 illustrates an example general block diagram of video decoder.

FIG. 2 illustrates a general block diagram of a block-based video decoder. The video bit-stream 202 may be unpacked and/or entropy decoded at entropy decoding unit 208. The coding mode and/or prediction information may be sent to the spatial prediction unit 260 (e.g., if intra coded) and/or the temporal prediction unit 262 (e.g., if inter coded) to form the prediction block. The residual transform coefficients may be sent to an inverse quantization unit 210 and/or inverse transform unit 212 to reconstruct the residual block. The prediction block and the residual block may be added together at 226. The reconstructed block may go through in-loop filtering, perhaps for example before it may be stored in reference picture store 264. The reconstructed video in reference picture store may be sent out to drive a display device and/or may be used to predict future video blocks.

As shown in FIG. 1 and/or FIG. 2, spatial prediction (e.g., intra prediction), temporal prediction (e.g., inter prediction), transform, quantization, entropy coding and/or loop filters may be performed or used. Bi-prediction in video coding may include a combination of two temporal prediction blocks obtained from the reference pictures that may already be reconstructed using averaging. Due to the limitation of the block-based motion compensation (MC), for example, there may still be remaining small motion(s) that can be observed between the two prediction blocks. Bi-directional optical flow (BIO) may be applied to compensate such motion for one or more, or every, sample inside at least one block. The BIO may be a sample-wise motion refinement that may be performed on top of the block-based motion-compensated predictions when bi-prediction is used. The derivation of the refined motion vector for one or more, or each, sample in at least one block may be based on the classical optical flow model. Let $I^{(k)}(x, y)$ be the sample value at the coordinate (x, y) of the prediction block derived from the reference picture list k (k=0, 1), and $\partial I^{(k)}(x, y)/\partial x$ and $\partial I^{(k)}(x, y)/\partial y$ may indicate the horizontal and vertical gradients of the sample. Assuming the optical flow model is valid, the motion refinement $(v_x, v_y)$ at (x, y) can be derived by:

$$\frac{\partial I^{(k)}(x, y)}{\partial t} + v_x \cdot \frac{\partial I^{(k)}(x, y)}{\partial x} + v_y \cdot \frac{\partial I^{(k)}(x, y)}{\partial y} = 0 \quad (1)$$

With the combination of the optical flow equation (1) and the interpolation of the prediction blocks along the motion trajectory (e.g., as show in FIG. 3), the BIO prediction may be obtained as:

$$pred_{BIO}(x, y) = \frac{1}{2} \cdot \left[ I^{(0)}(x, y) + I^{(1)}(x, y) + \frac{v_x}{2} \left( \tau_1 \frac{\partial I^{(1)}(x, y)}{\partial x} - \tau_0 \frac{\partial I^{(0)}(x, y)}{\partial x} \right) + \frac{v_y}{2} \left( \tau_1 \frac{\partial I^{(1)}(x, y)}{\partial y} - \tau_0 \frac{\partial I^{(0)}(x, y)}{\partial y} \right) \right] \quad (2)$$

where $\tau_0$ and $\tau_1$ may indicate the temporal distances of the reference pictures $Ref_0$ and $Ref_1$ associated with) $I^{(0)}$ and $I^{(1)}$ to the current picture CurPic, e.g.:

$$\tau_0 = POC(\text{CurPic}) - POC(\text{Ref}_0)$$

$$\tau_1 = POC(\text{Ref}_1) - POC(\text{CurPic}) \quad (3)$$

Figure 3:
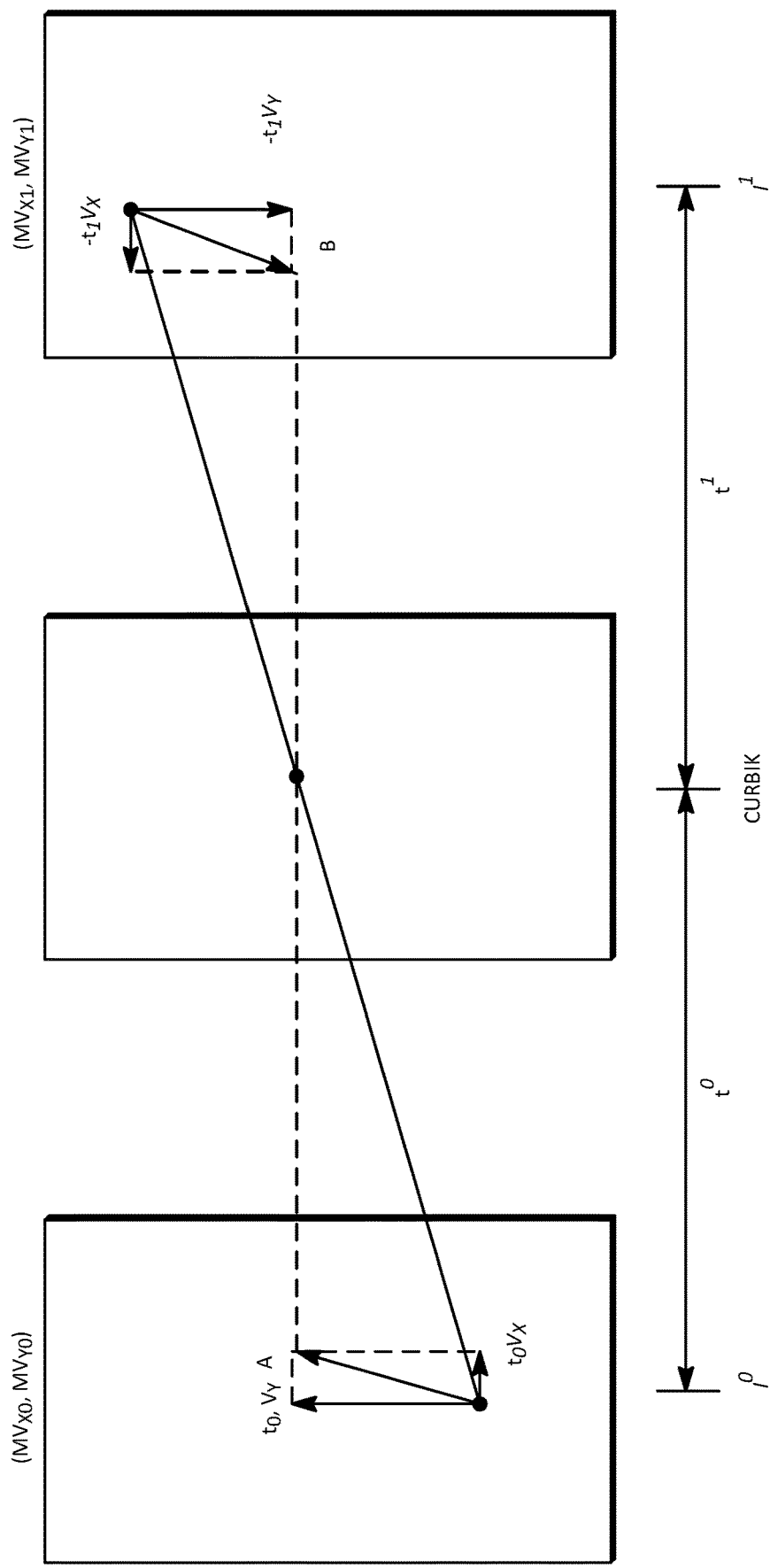
FIG. 3 illustrates an example of bidirectional optical flow.

In FIG. 3, $(MV_{x0}, MV_{y0})$ and $(MV_{x1}, MV_{y1})$ may indicate the block-level motion vectors that may be used to generate the two prediction blocks $I^{(0)}$ and $I^{(1)}$. Further, the motion refinement $(v_x, v_y)$ at the sample location (x, y) may be calculated by minimizing the difference $\Delta$ between the values of the samples after motion refinement compensation (e.g., A and B in FIG. 3), as shown as:

$$\Delta(x, y) = I^{(0)}(x, y) - I^{(1)}(x, y) + v_x \left( \tau_1 \frac{\partial I^{(1)}(x, y)}{\partial x} + \tau_0 \frac{\partial I^{(0)}(x, y)}{\partial x} \right) + v_y \left( \tau_1 \frac{\partial I^{(1)}(x, y)}{\partial y} + \tau_0 \frac{\partial I^{(0)}(x, y)}{\partial y} \right) \quad (4)$$

Perhaps to ensure the regularity of the derived motion refinement, for example, it may be assumed that the motion refinement is consistent within a local surrounding area centered at (x, y). In an example BIO design, the values of $(v_x, v_y)$ may be derived by minimizing $\Delta$ inside the 5×5 window $\Omega$ around the current sample at (x, y) as:

$$(v_x^*, v_y^*) = \underset{(v_x, v_y)}{\operatorname{argmin}} \sum_{(i,j)} \Delta^2(i, j) \quad (5)$$

BIO may be applied to bi-prediction blocks, which may be predicted by two reference blocks from temporally neighboring pictures. The BIO may be enabled without sending additional information from encoder to decoder. The BIO may be applied to some bi-directional predicted blocks which have both the forward and backward prediction signals (e.g., $\tau_0 \cdot \tau_1 > 0$). If, for example, the two prediction blocks of the current blocks are from the same direction (either the forward or the backward direction, e.g., $\tau_0 \cdot \tau_1 < 0$), the BIO may be applied when the prediction blocks are associated with non-zero motions, e.g., abs($MV_{x0}$)+abs $(MV_{y0}) \neq 0$ and $abs(MV_{x1}) + abs(MV_{y1}) \neq 0$, and the two motion vectors are proportional to the temporal distances between the current picture and the reference pictures, e.g., $$\frac{MV_{x0}}{MV_{x1}} = \frac{MV_{y0}}{MV_{y1}} = \frac{\tau_0}{\tau_1} \quad (6)$$

If, for example, the two prediction blocks of the current block are from the same reference picture (e.g., $\tau_0 = \tau_1$), the BIO may be disabled. When the local illumination compensation (LIC) is used for the current block, the BIO may be disabled.

As shown in (2) and (4), perhaps in addition to the block-level MC, gradients may be derived in the BIO for a sample of a motion compensated block (e.g., $I^{(0)}$ and $I^{(1)}$) (e.g., in order to derive the local motion refinement and/or generate the final predication at that sample location). In BIO, the horizontal and vertical gradients of samples in the prediction blocks $$\left( e.g., \frac{\partial I^{(0)}(x, y)}{\partial x}, \frac{\partial I^{(1)}(x, y)}{\partial x} \text{ and } \frac{\partial I^{(0)}(x, y)}{\partial y}, \frac{\partial I^{(1)}(x, y)}{\partial y} \right)$$

may be calculated at the same time when the prediction signals are generated based on a filtering processes which may be consistent with motion compensation interpolation (e.g., 2D separable finite impulse response (FIR) filters). The input to the gradient derivation process may be the same reference samples used for motion compensation and the fractional components (fracX, fracY) of the input motion ($MV_{x0/x1}$, $MV_{y0/y1}$).

To derive the gradient values at the sample positions (e.g., each sample position), different filters (e.g., one interpolation filter $h_L$ and one gradient filter $h_G$) may be applied separately, perhaps, for example, in different orders per the direction of the gradient that may be calculated. When deriving horizontal gradients $$\left( e.g., \frac{\partial I^{(0)}(x, y)}{\partial x} \text{ and } \frac{\partial I^{(1)}(x, y)}{\partial x} \right),$$

the interpolation filter $h_L$ may be applied vertically to the samples inside the prediction block for deriving the sample values at the vertical fractional positions at fracY. The gradient filter $h_G$ may then be applied horizontally to the generated vertical fractional samples, perhaps to calculate the horizontal gradient values based on the value of fracX. When deriving vertical gradients $$\left( e.g., \frac{\partial I^{(0)}(x, y)}{\partial y} \text{ and } \frac{\partial I^{(1)}(x, y)}{\partial y} \right),$$

the gradient filter, $h_G$, may be applied vertically on top of the prediction samples to calculate the intermediate vertical gradients corresponding to fracY, and horizontal interpolation of the intermediate vertical gradients using the interpolation filter $h_L$ according to the value of fracX. The lengths of both the gradient filter and the interpolation filter may be 6-tap or 8-tap. Table 1 and Table 2 illustrates example filter coefficients that may be used for $h_G$ and $h_L$, respectively, according to the precision of the block-level motion vector.

TABLE 1

Example gradient filters used in BIO

| Fractional position | Gradient filter ($h_G$) |
|---|---|
| 0 | {8, −39, −3, 46, −17, 5} |
| 1/16 | {8, −32, −13, 50, −18, 5} |
| 1/8 | {7, −27, −20, 54, −19, 5} |
| 3/16 | {6, −21, −29, 57, −18, 5} |
| 1/4 | {4, −17, −36, 60, −15, 4} |
| 5/16 | {3, −9, −44, 61, −15, 4} |
| 3/8 | {1, −4, −48, 61, −13, 3} |
| 7/16 | {0, 1, −54, 60, −9, 2} |
| 1/2 | {−1, 4, −57, 57, −4, 1} |

TABLE 2

Example interpolation filters used for prediction signal generation in BIO

| Fractional position | Interpolation filter ($h_L$) |
|---|---|
| 0 | {0, 0, 64, 0, 0, 0} |
| 1/16 | {1, −3, 64, 4, −2, 0} |
| 1/8 | {1, −6, 62, 9, −3, 1} |
| 3/16 | {2, −8, 60, 14, −5, 1} |
| 1/4 | {2, −9, 57, 19, −7, 2} |
| 5/16 | {3, −10, 53, 24, −8, 2} |
| 3/8 | {3, −11, 50, 29, −9, 2} |
| 7/16 | {3, −11, 44, 35, −10, 3} |
| 1/2 | {3, −10, 35, 44, −11, 3} |

Figure 4A:
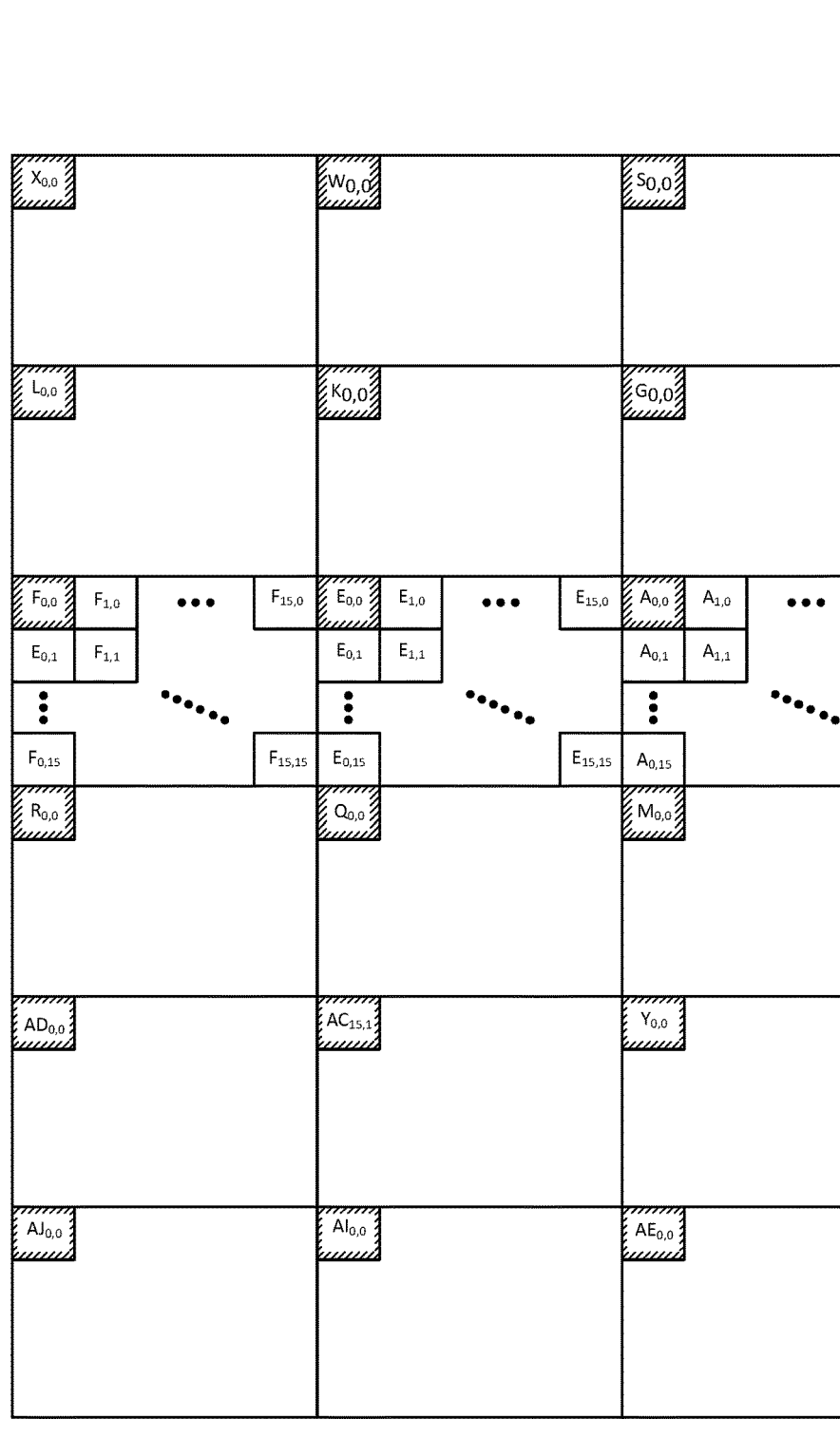
FIGS. 4A and 4B illustrate illustrates an example gradient derivation process in the BIO with the motion precision of 1/16-pel.
Figure 4B:
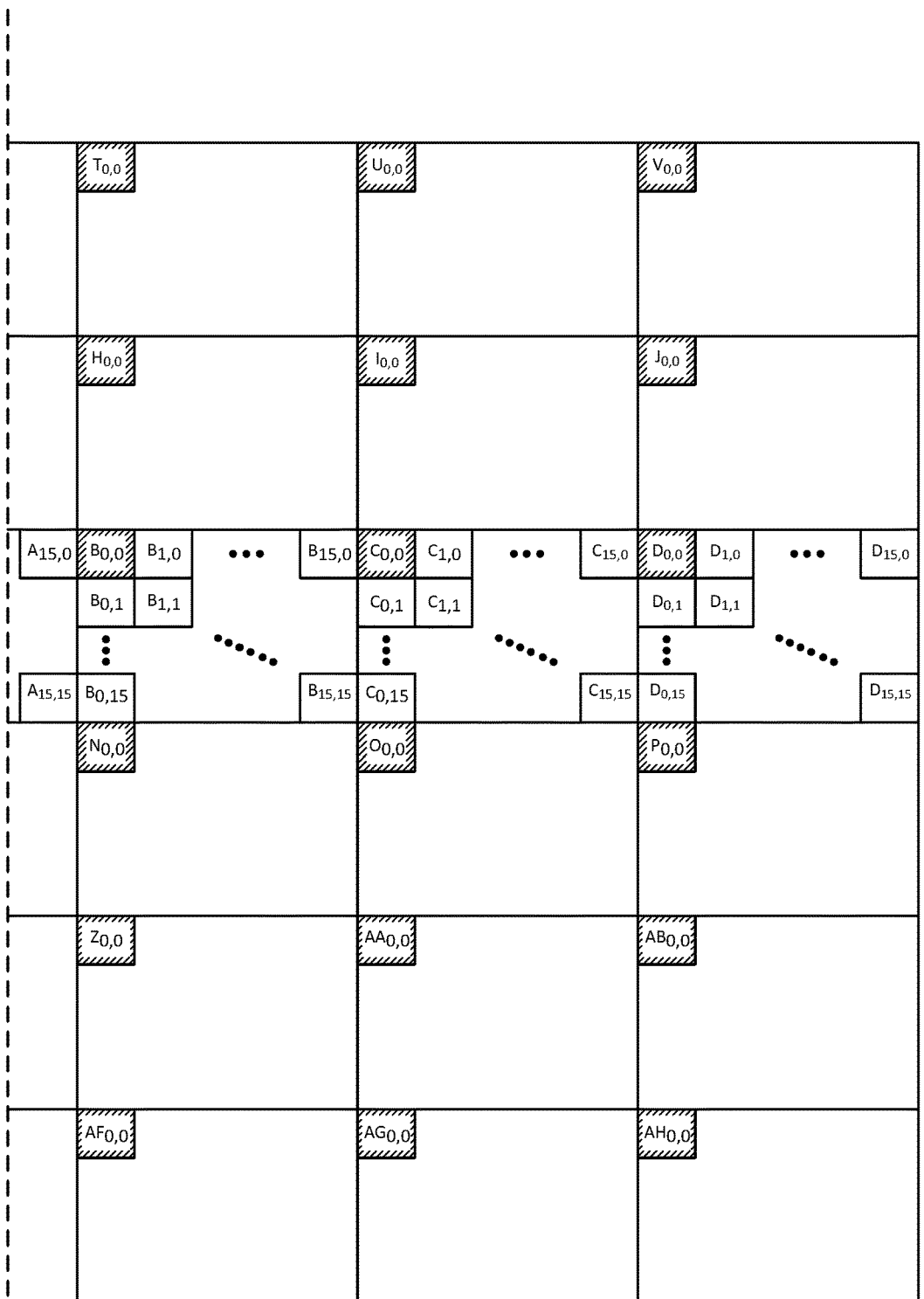

FIGS. 4A and 4B illustrate illustrates an example gradient derivation process applied in BIO, where the sample values at integer sample positions are shown with patterned squares and the sample values at fractional sample positions are shown with blank squares. The motion vector precision may be increased to 1/16-pel, and there may be 255 fractional samples positions defined within the region of an integer sample in FIGS. 4A and 4B where the subscript coordinate (x, y) represents the corresponding horizontal and vertical fractional position of a sample (e.g., the coordinate (0, 0) correspond to the samples at the integer positions. The horizontal and vertical gradient values may be calculated at the fraction position (1, 1) (e.g., $a_{1,1}$). Per FIGS. 4A and 4B, for a horizontal gradient derivation, the fractional samples $f_{0,1}, e_{0,1}, a_{0,1}, b_{0,1}, c_{0,1}$ and $d_{0,1}$ may be derived by applying an interpolation filter $h_L$ in the vertical direction, e.g., $f_{0,1} = (X_{0,0} - 3 \cdot L_{0,0} + 64 \cdot F_{0,0} + 4 \cdot R_{0,0} - 2 \cdot AD_{0,0} + \text{OffSet}_0) >> (B-8)$ $e_{0,1} = (W_{0,0} - 3 \cdot K_{0,0} + 64 \cdot E_{0,0} + 4 \cdot Q_{0,0} - 2 \cdot AC_{0,0} + \text{OffSet}_0) >> (B-8)$ $a_{0,1} = (S_{0,0} - 3 \cdot G_{0,0} + 64 \cdot A_{0,0} + 4 \cdot M_{0,0} - 2 \cdot Y_{0,0} + \text{OffSet}_0) >> (B-8)$ $b_{0,1} = (\tau_{0,0} - 3 \cdot H_{0,0} + 64 \cdot B_{0,0} + 4 \cdot N_{0,0} - 2 \cdot Z_{0,0} + \text{OffSet}_0) >> (B-8)$ $c_{0,1} = (U_{0,0} - 3 \cdot I_{0,0} + 64 \cdot C_{0,0} + 4 \cdot O_{0,0} - 2 \cdot AA_{0,0} + \text{OffSet}_0) >> (B-8)$ $d_{0,1} = (V_{0,0} - 3 \cdot J_{0,0} + 64 \cdot D_{0,0} + 4 \cdot P_{0,0} - 2 \cdot AB_{0,0} + \text{OffSet}_0) >> (B-8)$ (7)

where B is the bit-depth of the input signal; $\text{OffSet}_0$ is the rounding offset which may be equal to $$OffSet_0 = \begin{cases} 2^{B-9}, & B > 8 \\ 0, & B = 8 \end{cases} \quad (8)$$

The precision of $f_{0,1}$, $e_{0,1}$, $a_{0,1}$, $b_{0,1}$, $c_{0,1}$ and $d_{0,1}$ may be 14-bit. The horizontal gradient of $a_{1,1}$ may be calculated by applying the corresponding gradient filter $h_G$ horizontally to the derived fractional samples. This may be done by calculating the non-rounded gradient values at the intermediate 20-bit, as illustrated by:

$$gH\_a'_{1,1} = 8 \cdot f_{0,1} - 32 \cdot e_{0,1} - 13 \cdot a_{0,1} + 50 \cdot b_{0,1} - 18 \cdot c_{0,1} + 5 \cdot d_{0,1} \quad (9)$$

The final horizontal gradient may be calculated by shifting the intermediate gradient value into the output precision as:

$$gH\_a_{1,1} = \text{sign}(gH\_a'_{1,1}) \cdot ((\text{abs}(gH\_a'_{1,1}) + \text{OffSet}_1) >> (18-B)) \quad (10)$$

where sign(•) and abs(•) are the functions that return the sign and the absolute value of the input signal; $\text{OffSet}_1$ is the rounding offset which may be calculated as $2^{17-B}$.

When deriving the vertical gradient value at (1, 1), the intermediate vertical gradient values at fractional position (0, 1) may be derived, e.g., $$gV\_f'_{0,1} = 8 \cdot X_{0,0} - 32 \cdot L_{0,0} - 13 \cdot F_{0,0} + 50 \cdot R_{0,0} - 18 \cdot AD_{0,0} + 5 \cdot AJ_{0,0}$$

$$gV\_e'_{0,1} = 8 \cdot W_{0,0} - 32 \cdot K_{0,0} - 13 \cdot E_{0,0} + 50 \cdot Q_{0,0} - 18 \cdot AC_{0,0} + 5 \cdot AI_{0,0}$$

$$gV\_a'_{0,1} = 8 \cdot S_{0,0} - 32 \cdot G_{0,0} - 13 \cdot A_{0,0} + 50 \cdot M_{0,0} - 18 Y_{0,0} + 5 \cdot AE_{0,0}$$

$$gV\_b'_{0,1} = 8 \cdot T_{0,0} - 32 \cdot H_{0,0} - 13 \cdot B_{0,0} + 50 \cdot N_{0,0} - 18 \cdot Z_{0,0} + 5 \cdot AF_{0,0}$$

$$gV\_c'_{0,1} = 8 \cdot U_{0,0} - 32 \cdot I_{0,0} - 13 \cdot C_{0,0} + 50 \cdot O_{0,0} - 18 \cdot AA_{0,0} + 5 \cdot AG_{0,0}$$

$$gV\_d'_{0,1} = 8 \cdot V_{0,0} - 32 J_{0,0} - 13 \cdot D_{0,0} + 50 \cdot P - 18 \cdot AB_{0,0} + 5 \cdot AH_{0,0} \quad (11)$$

The intermediate gradient values may then be adjusted by shifting to 14-bit values as:

$$gV\_f_{0,1} = \text{sign}(gV\_f'_{0,1}) \cdot ((\text{abs}(gV\_f'_{0,1}) + \text{OffSet}_0) >> (B-8))$$

$$gV\_e_{0,1} = \text{sign}(gV\_e'_{0,1}) \cdot ((\text{abs}(gV\_e'_{0,1}) + \text{OffSet}_0) >> (B-8))$$

$$gV\_a_{0,1} = \text{sign}(gV\_a'_1) \cdot ((\text{abs}(gV\_a'_{0,1}) + \text{OffSet}_0) >> (B-8))$$

$$gV\_b_{0,1} = \text{sign}(gV\_b'_{0,1}) \cdot ((\text{abs}(gV\_b'_{0,1}) + \text{OffSet}_0) >> (B-8))$$

$$gV\_c_{0,1} = \text{sign}(gV\_c'_{0,1}) \cdot ((\text{abs}(gV\_c'_{0,1}) + \text{OffSet}_0) >> (B-8))$$

$$g\_d_{0,1} = \text{sign}(g\_d'_{0,1}) \cdot ((\text{abs}(g\_d'_{0,1}) + \text{OffSet}_0) >> (B-8)) \quad (12)$$

The vertical gradient value at fractional position (1, 1) may be obtained by an interpolation filter k on top of the intermediate gradient values at fractional position (0, 1). This may be done by calculating the non-rounded gradient value at 20-bit which may then be adjusted to the output bit-depth through shifting operation, as shown as:

$$gV\_a'_{1,1} = gV\_f_{0,1} - 3 \cdot gV_{e_{0,1}} + 64 \cdot gV\_a_{0,1} + 4 \cdot gV\_b_{0,1} - 2 \cdot gV\_c_{0,1} \quad (13)$$

$$gV\_a_{1,1} = \text{sign}(gV\_a'_{1,1}) \cdot ((\text{abs}(gV\_a'_{1,1}) + \text{OffSet}_1) >> (18-B)) \quad (14)$$

Figure 5A:
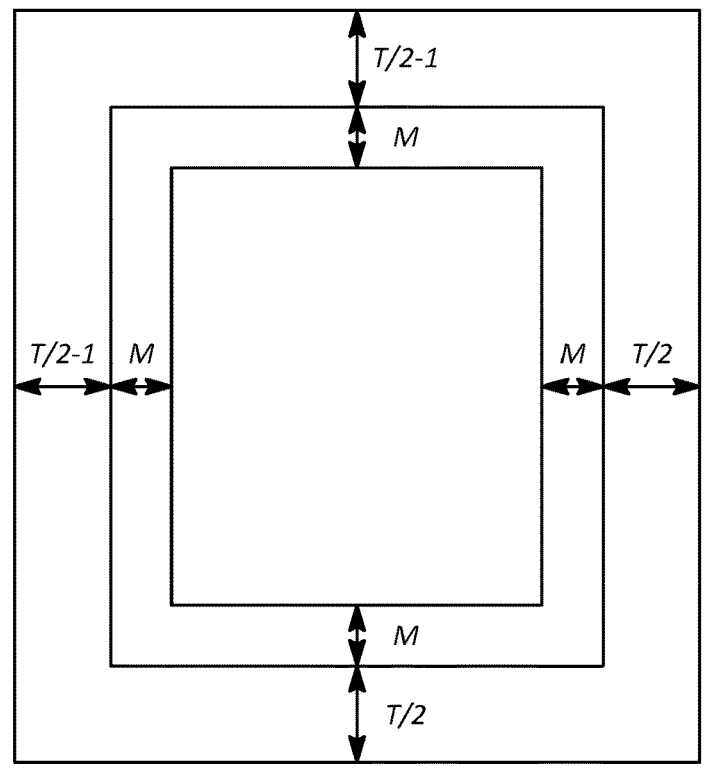
FIG. 5A illustrates an example memory access of the BIO without a block extension constraint.
Figure 5B:
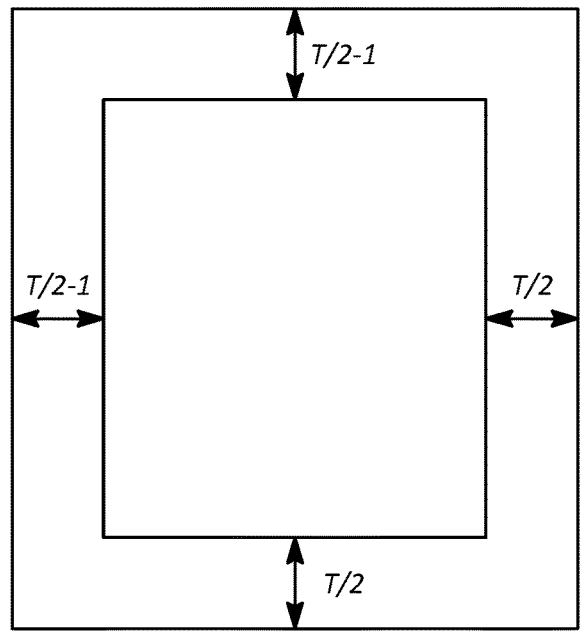
FIG. 5B illustrates an example memory access of the BIO with a block extension constraint

As shown in (5), perhaps to derive the local motion refinement ($v_x$, $v_y$) at one position, the sample values and the gradient values may be calculated for some samples in a surrounding window Ω around the sample. The window size may be (2M+1)×(2M+1), where M=2. As described herein, the gradient derivation may access additional reference samples in the extended area of the current block. Given that the length T of the interpolation filter and the gradient filter may be 6, the corresponding extended block size may be equal to T−1=5. For a given W×H block, the memory access required by the BIO may be (W+T−1+2M)×(H+T−1+2M)= (W+9)×(H+9), which may be larger than the memory access (W+7)×(H+7) used by the motion compensation. To control memory access of the BIO, a block extension constraint may be used. If, for example, a block constraint is applied, the neighboring samples that may be within the current block may be used, perhaps for calculating the local motion refinement ($v_x$, $v_y$) at a position inside the block. FIGS. 5A and 5B compare the size of the memory access region for the BIO before and after a block extension constraint is applied.

Figure 6:
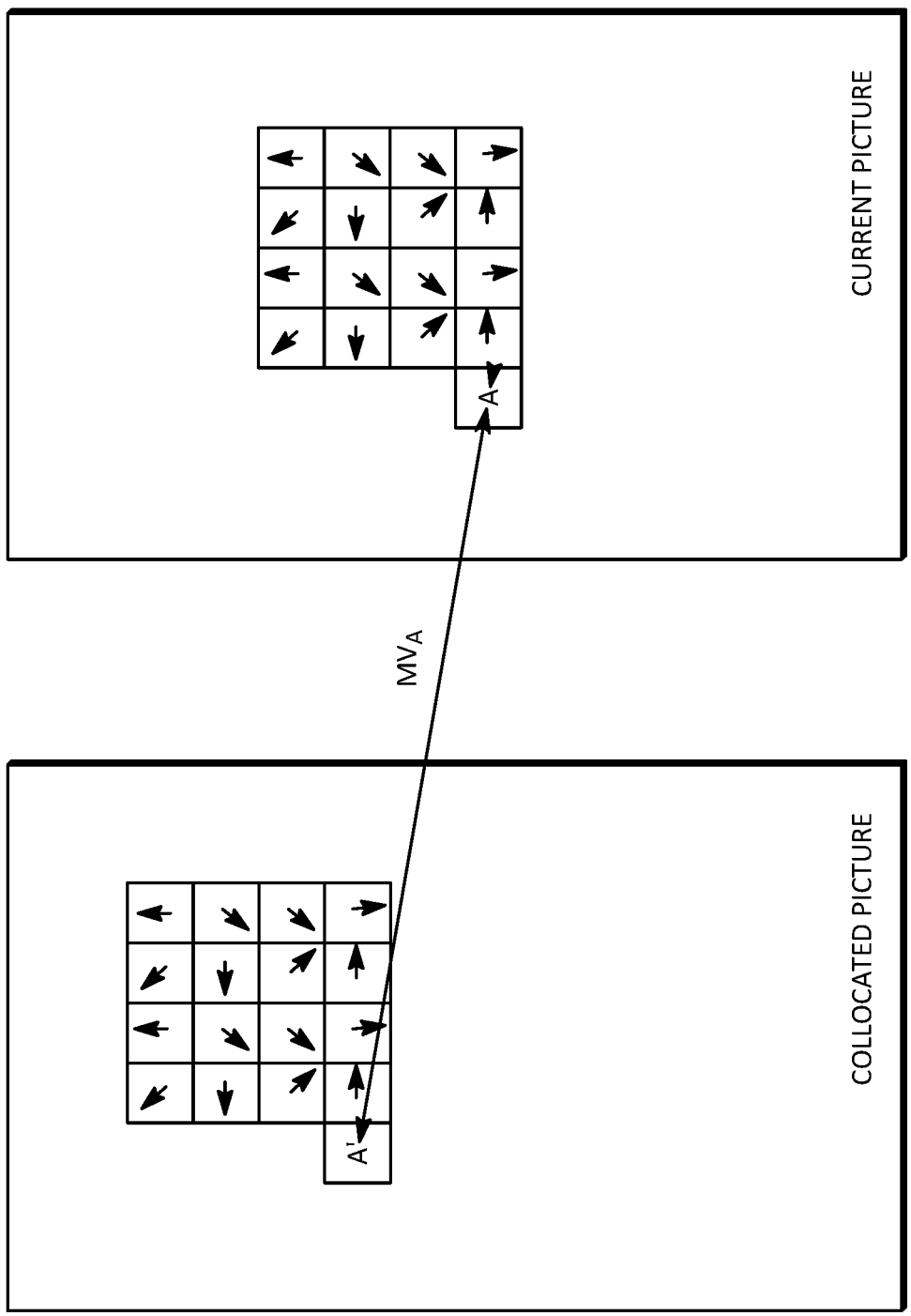
FIG. 6 illustrates an example of advanced temporal motion vector prediction.

In advanced temporal motion vector prediction (ATMVP), a temporal motion vector prediction may be improved by allowing a block to derive multiple motion information (e.g., motion vector and reference indices) for sub-blocks in the block from multiple smaller blocks of the temporal neighboring pictures of the current picture. The ATMVP may derive motion information of the sub-blocks in a block by, identifying the corresponding block of the current block (which may be called collocated block) in a temporal reference picture. The selected temporal reference picture may be called the collocated picture. The current block may be split into sub-blocks where the motion information of each sub-block from the corresponding small block in the collocated picture may be derived, as shown in FIG. 6.

The collocated block and the collocated picture may be identified by the motion information of the spatial neighboring blocks of the current block. FIG. 6 illustrates a process where an available candidate in the merge candidate list is considered process. It may be assumed that block A is identified as the available merge candidate of the current block based on the scanning order of merge candidate list. The corresponding motion vector of block A (e.g., $MV_A$ and its reference index may be used to identify the collocated picture and the collocated block. The location of the collocated block in the collocated picture may be determined by adding the motion vector of block A ($MV_A$) to the coordinate of the current block.

For a sub-block in the current block, the motion information of its corresponding small block (as indicated by the arrows in FIG. 6) in the collocated block may be used to derive the motion information of a sub-block in the current block. When the motion information of each small block in the collocated block is identified, it may then be converted to the motion vector and reference index of the corresponding sub-block in the current block (e.g., in the same way as temporal motion vector prediction (TMVP), where temporal motion vector scaling may be applied).

Figure 7:
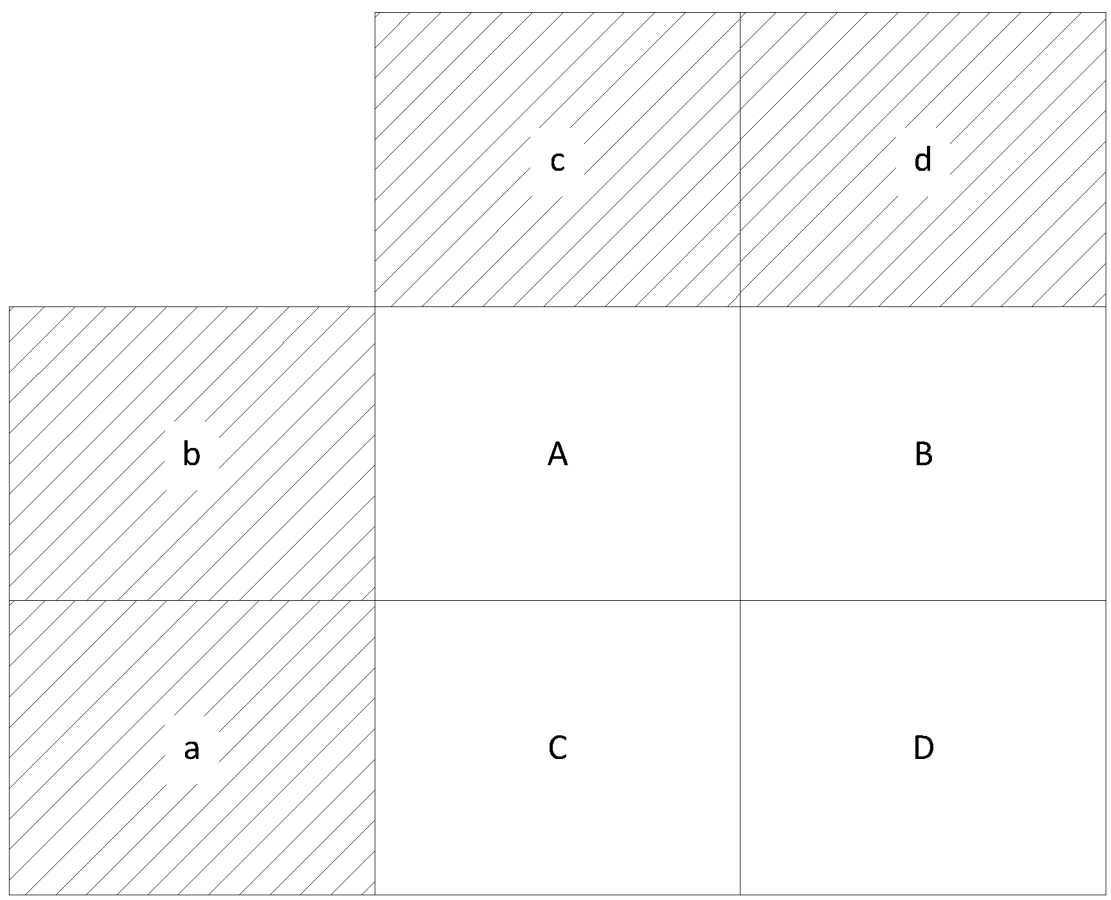
FIG. 7 illustrates an example spatial temporal motion vector prediction.

In spatial-temporal motion vector prediction (STVMP), motion information of the sub-blocks in a coding block may be derived in a recursive manner, and example of which is illustrated in FIG. 7. FIG. 7 shows one example to illustrate the concept. As shown in FIG. 7, the current block may contain four sub-blocks A, B, C and D. The neighboring small blocks that are spatial neighbors to the current block are labeled as a, b, c and d, respectively. The motion derivation for sub-block A may identify its two spatial neighbors. The first neighbor of sub-block A may be neighbor c. If, for example, the small block c is not available or intra coded, the following neighboring small blocks above the current block (from left to right) may be checked. A second neighbor of sub-block A may be the left neighbor b. If, for example the small block b is not available or intra coded, the following neighboring small blocks to the left of the current block (from top to bottom) may be checked. The motion information of the temporal neighbors of sub-block A may be obtained by following similar procedure of TMVP process in HEVC. The motion information of the available spatial and temporal neighbors (e.g., up to 3) may be averaged and used as the motion information of sub-block A. Based on the raster scan order, the above STMVP process may be repeated to derive the motion information of other sub-blocks in the current video block.

Frame-rate up conversion mode (FRUC) may be supported for inter-coded blocks. When this mode is enabled, for example, motion information (e.g., including motion vectors and/or reference indices) of the coded block may not be signaled. The information may be derived at the decoder side by template-matching and/or bilateral-matching techniques. Perhaps during the motion derivation process at decoder, for example, the merge candidate list of the block and/or a set of preliminary motion vectors generated from the motion vectors of the temporal collocated blocks of the current block may be checked. The candidate that leads to the minimum sum of absolute difference (SAD) may be selected as the starting point. A (e.g., local) search based on template-matching and/or bilateral-matching around the starting point may be performed. The MV that results in the minimum SAD may be taken as the MV for the whole block. The motion information may be further refined at a sub-block level for better motion compensation efficiency.

Figure 8A:
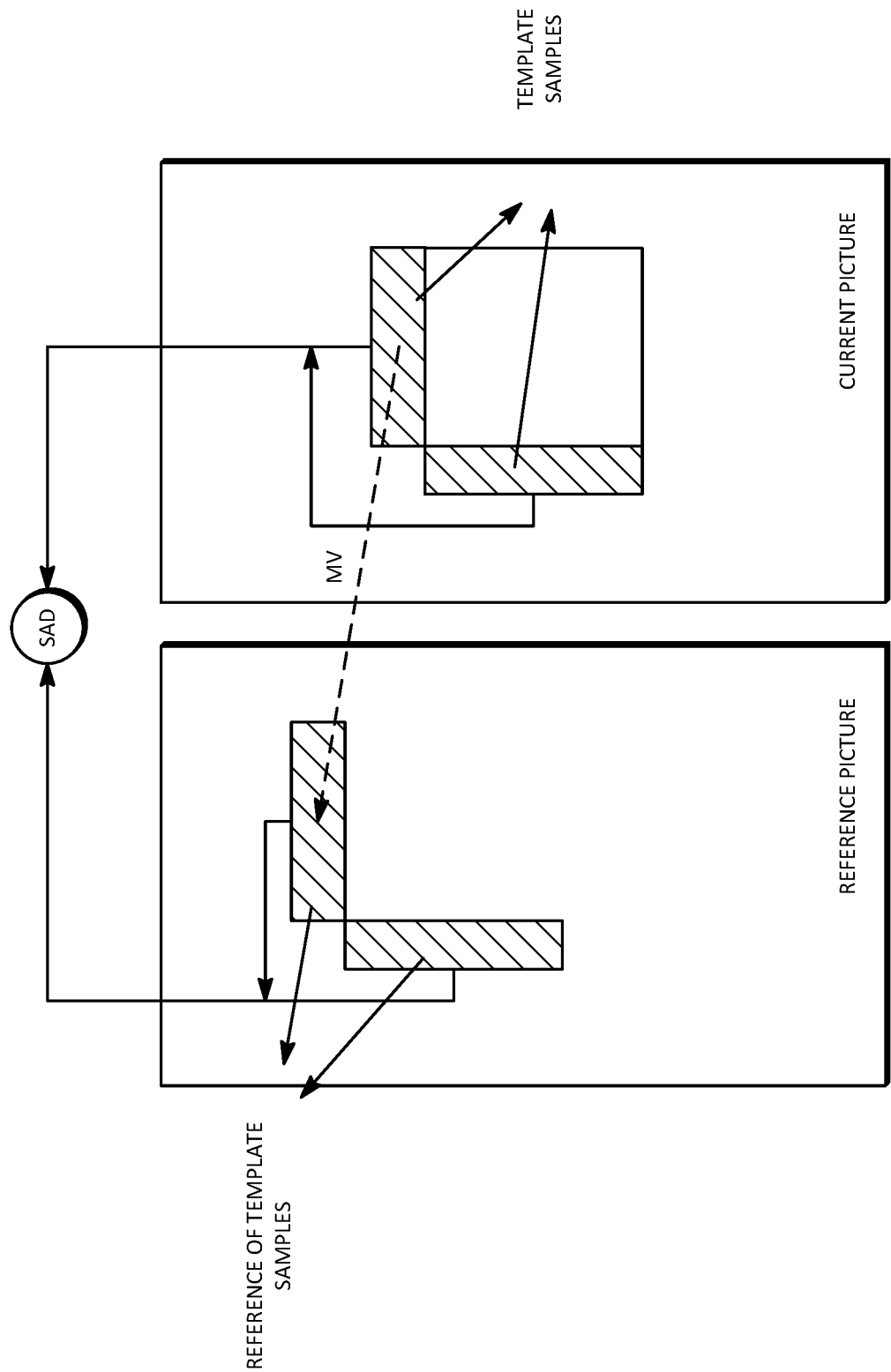
FIG. 8A illustrates an example frame-rate up conversion with template-matching.
Figure 8B:
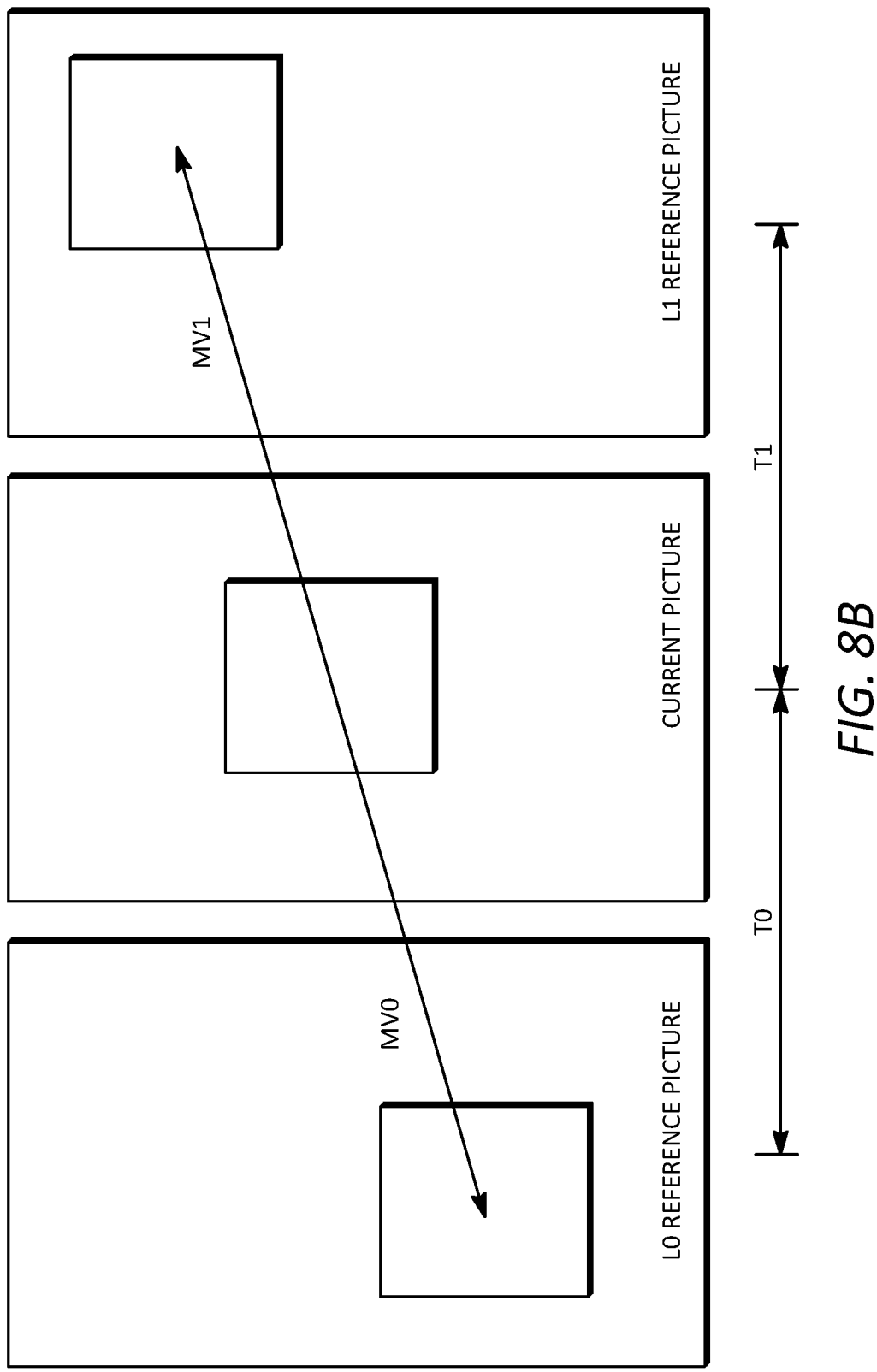
FIG. 8B illustrates an example frame-rate up conversion with bilateral-matching.

FIG. 8A and FIG. 8B illustrate an example of the FRUC process. As shown in FIG. 8A, template-matching may be used to derive motion information of the current block by finding a (e.g., the best) match between a template (e.g., top and/or left neighboring blocks of the current block) in the current picture and a block (e.g., same size as the template) in a reference picture. In FIG. 8B, the bilateral-matching may be used to derive motion information of the current block by finding a (e.g., the best) match between two blocks along the motion trajectory of the current block in two different reference pictures. The motion search process of bilateral-matching may be based on motion trajectory, e.g., the motion vectors $MV_0$ and $M_{V1}$ pointing to the two reference blocks may be proportional to the temporal distances between the current picture and one, or each, of the two reference pictures (e.g., $\tau_0$ and $\tau_1$).

Figure 9A:
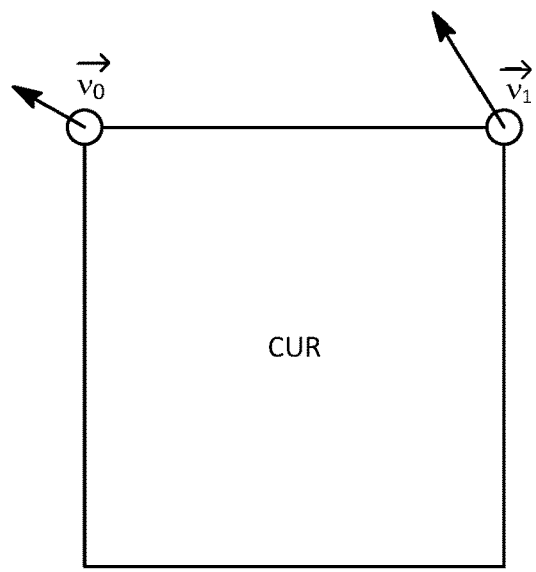
FIG. 9A illustrates an example of the affine mode with a simplified affine model.

A translation motion model may be applied for motion compensation prediction. There are many kinds of motion, e.g., zoom in/out, rotation, perspective motions and other irregular motions. An affine transform motion compensation prediction may be applied. As shown in FIG. 9A, an affine motion field of the block may be described by some (e.g., two) control point motion vectors. Based on the control point motion, the motion field of an affine block may be described as:

$$v_x = \frac{(v_{1x} - v_{0x})}{w}x - \frac{(v_{1y} - v_{0y})}{w}y + v_{0x} \quad (15)$$

Figure 9B:
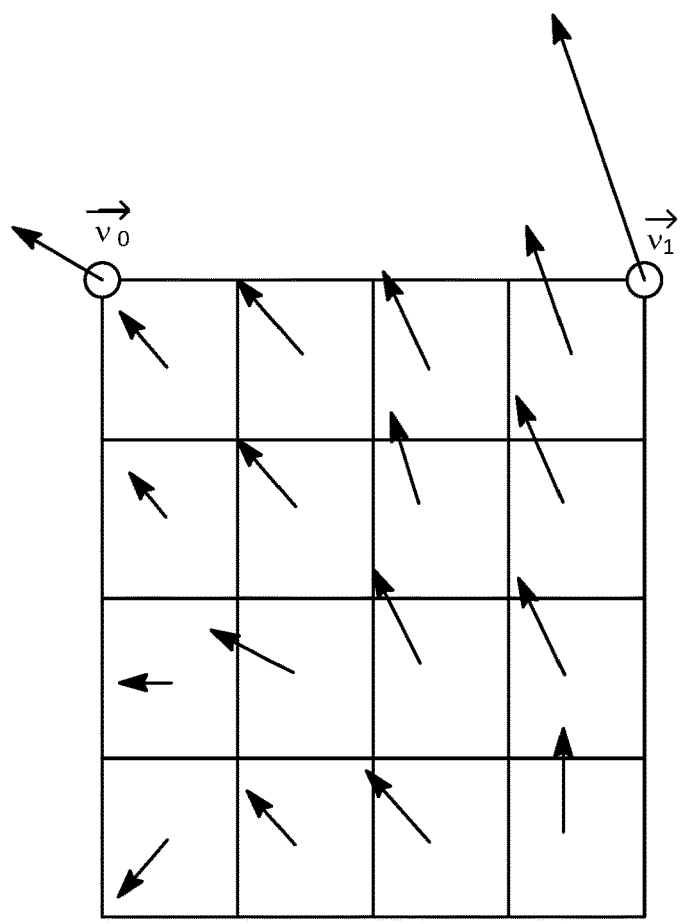
FIG. 9B illustrates an example of the affine mode with a sub-block-level motion derivation for affine blocks.

-continued
$$v_y = \frac{(v_{1y} - v_{0y})}{w}x + \frac{(v_{1x} - v_{0x})}{w}y + v_{0y}$$

Where (v0x, v0y) may be a motion vector of the top-left corner control point, and (v1x, v1y) may be a motion vector of the top-right corner control point, as shown in FIG. 9A. Perhaps, for example, when a video block is coded by affine mode, its motion field may be derived based on the granularity of 4×4 block. To derive the motion vector of a 4×4 block, the motion vector of the center sample of each sub-block, as shown in FIG. 9B may be calculated according to (15), and may be rounded to 1/16-pel accuracy. The derived motion vectors may be used at the motion compensation stage to generate the prediction signal of a sub-block inside the current block.

Single instruction multiple data (SIMD) instructions may be used in the software/hardware design of modern video codecs to accelerate the processing speed of both encoding and decoding SIMD may perform the same operation on multiple data elements simultaneously perhaps by using a single instruction. SIMD width defines the number of data elements that may be processed in parallel by a register. 128-bit SIMD may be used in general-purpose central processing units (CPUs). Graphics processing units (GPUs) can support wider SIMD implementations, e.g., supporting arithmetic, logical, load, store instructions with 512-bit registers.

As discussed herein, to reduce the number of filtering operations, a BIO implementation may use 2D separable FIR filters in the gradient derivation process, e.g., the combination of a 1D low-pass interpolation filter and a 1D high-pass gradient filter. The selection of the corresponding filter coefficients may be based on the fractional position of the target sample. Due to such characteristics (e.g., 2D separable filters), some computational operations may be conducted in parallel for multiple samples. The gradient derivation process may be suitable for SIMD acceleration.

Figure 10A:
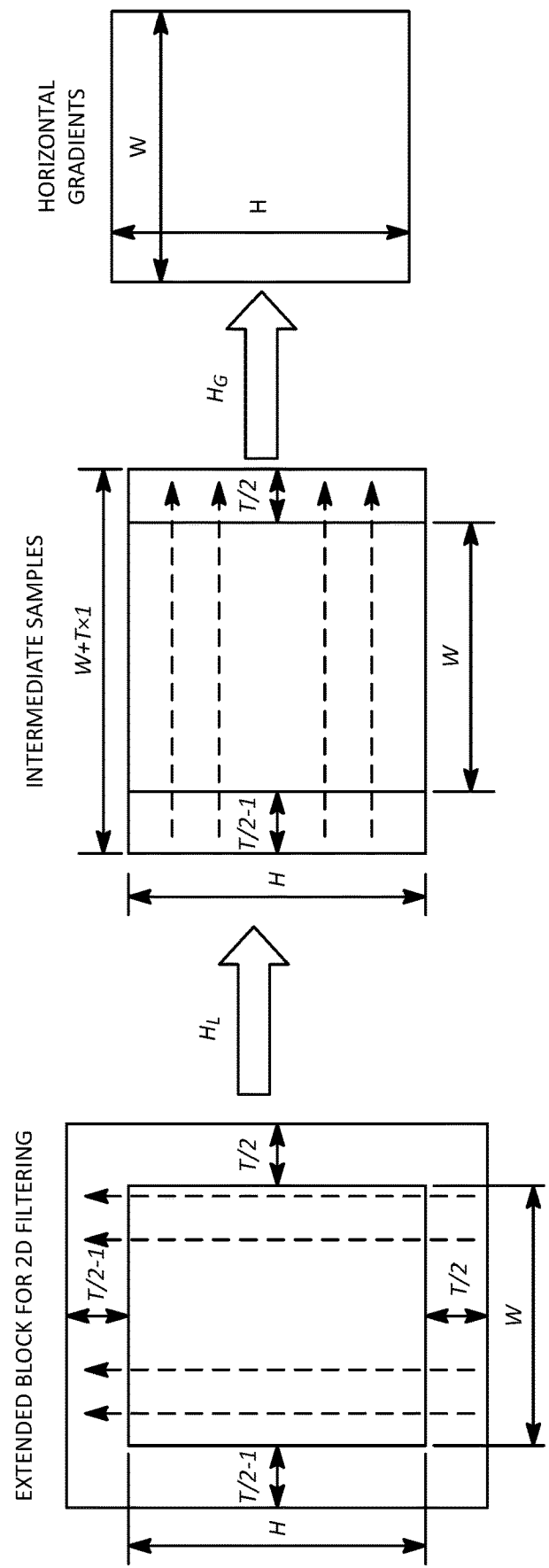
FIG. 10A illustrates an example 2D gradient filtering process of a BIO, where dash arrows indicate the filtering direction for the horizontal gradient derivation.
Figure 10B:
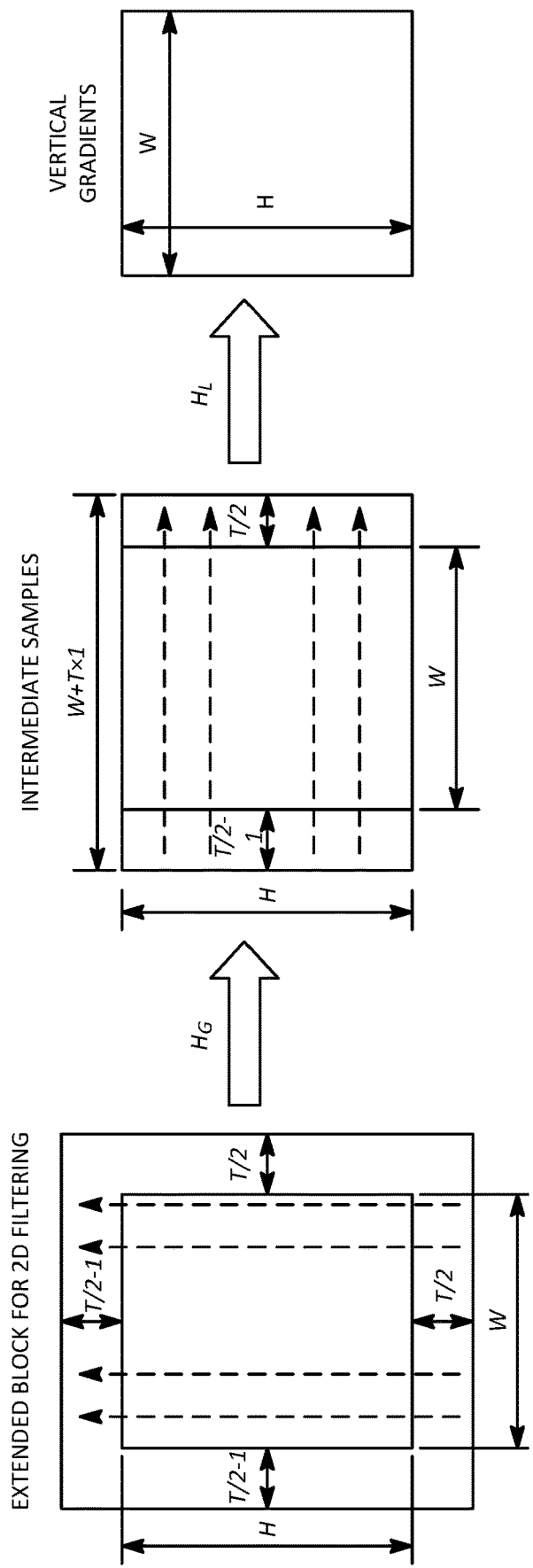
FIG. 10B illustrates an example 2D gradient filtering process of a BIO, where dash arrows indicate the filtering direction for the vertical gradient derivation.

Vertical filtering may be applied followed by a horizontal filtering for the horizontal and vertical gradient derivations. For example, to calculate horizontal gradients, the vertical interpolation may be performed using an interpolation filter $h_L$ to generate the intermediate samples, followed by the gradient filter $h_G$ being horizontally applied on top of the intermediate samples. For the calculation of the vertical gradients, the gradient filter $h_G$ may be applied in the vertical direction to calculate the intermediate vertical gradients which may then be input to the horizontal interpolation filter $h_L$. Given that the filter length of both $h_L$ and $h_G$ is T=6, the horizontal filtering process may generate additional intermediate data (e.g., the intermediate samples for the horizontal gradient calculation and the intermediate gradients for the vertical gradient calculation) in a horizontal extended region of the current block to provide sufficient reference data for the following horizontal filtering process. FIGS. 10A and B illustrate a 2D gradient filtering processes that may be applied for the BIO, where the dash lines indicate the respective direction where each filtering process may be applied. As shown in FIGS. 10A and 10B, for a W×H block, the size of the intermediate data is (W+T−1)×H=(W+5)×H. In HEVC and JEM, the width of a coding block may be a power of 2, e.g., 4, 8, 16, 32 and so forth. A sample may be stored by either 1 byte (for 8-bit video) or 2 bytes (for video signal beyond 8-bit) in memory. As discussed herein, the width of the intermediate data that is input to the horizontal filtering process may be W+5. Given the existing SIMD width, the SIMD registers may not be fully utilized during the horizontal filtering process, which could reduce the parallelism efficiency of the SIMD implementation. For example, for a coding block with a width of 8, the width of the intermediate data may be 8+5=13. Assuming a 128-bit SIMD implementation and 10-bit input video, it may need two SIMD operation loops to process each line of the intermediate data during the horizontal filtering process. For example, a first SIMD loop may use the payload of the 128-bit register by filtering 8 samples in parallel while there may be 5 samples remaining in a second loop (e.g., 5×16-bit=80-bit).

Figure 11:
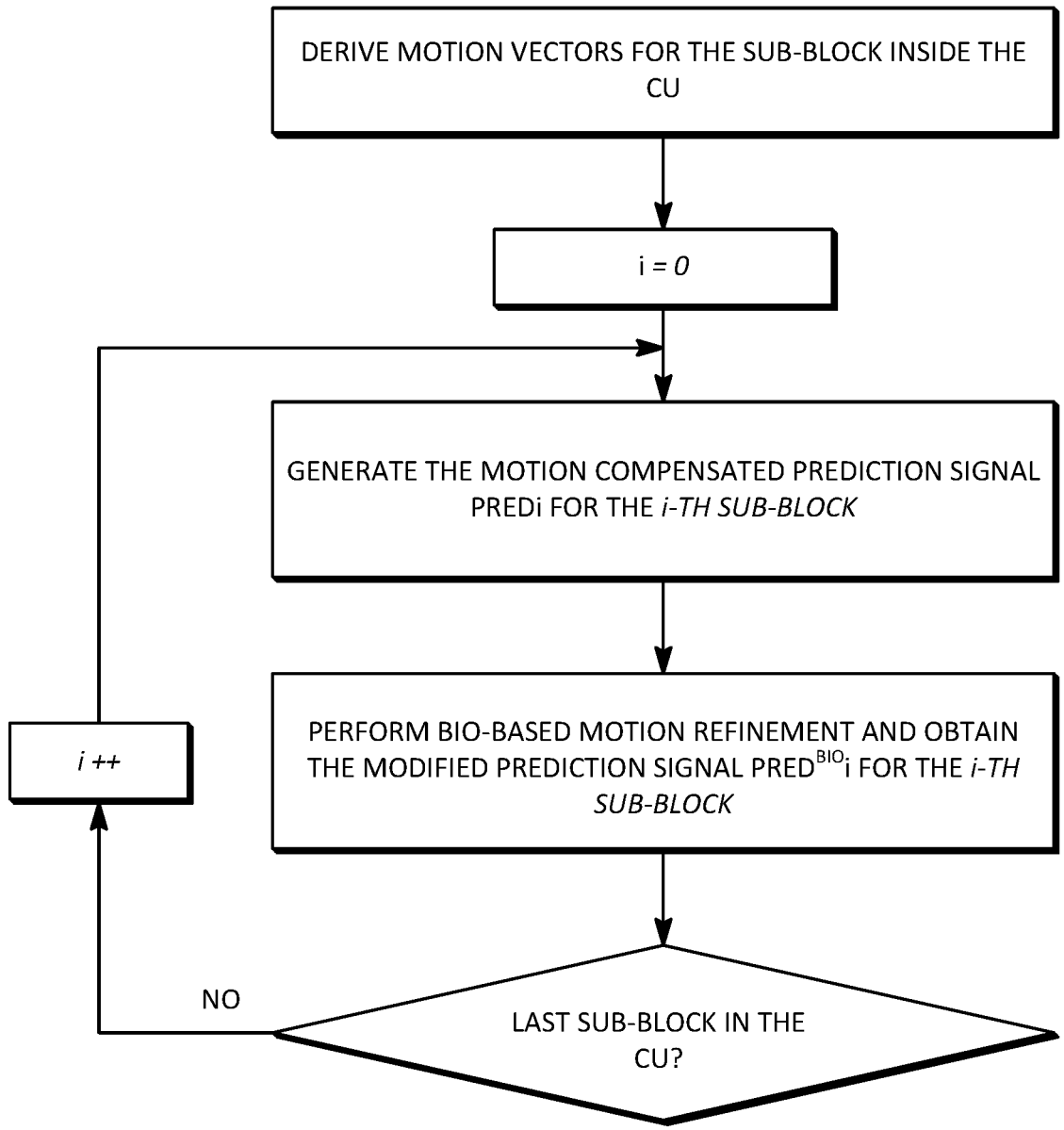
FIG. 11 illustrates an example of a motion compensation process.

As shown in (10), (12) and (14), the rounding operations during the gradient derivation process may be conducted by: calculating the absolute of the input data, rounding the absolute by adding one offset followed by a right shift, multiplying the rounded absolute value with the sign of the input data. As discussed herein, one or more sub-block coding modes may be used (e.g., ATMVP, STMVP, FRUC and affine mode). When a sub-block level coding mode is enabled, the current coding block may be further partitioned into multiple small sub-blocks and the motion information for each sub-block may be derived separately. Because the motion vectors of the sub-blocks inside one coding block may be different, the motion compensation may be performed separately for each sub-block. Assuming the current block is coded by a sub-block mode, FIG. 11 illustrates an example process used to generate the prediction signal of the block using BIO-related operations. As shown in FIG. 11, the motion vectors may be derived for some (e.g., all) sub-blocks of the current block. The regular MC may then be applied to generate the motion-compensated prediction signal (e.g., Predi) for the sub-block(s) inside the block. If, for example, the BIO is used, the BIO-based motion refinement may be further performed to obtain the modified prediction signal PredBIOi for the sub-block. This may result in multiple invocations of the BIO for generating the prediction signal of each sub-block. The interpolation filtering and the gradient filtering may access additional reference samples (depending on the filter length) for performing the BIO at the sub-block-level. The number of sub-blocks that are contained in a block may be relatively large. Frequent switching between the motion compensation operation and using different motion vectors may take place.

BIO prediction derivation may be implemented for an efficient SIMD implementation.

In an example BIO implementation, the BIO prediction may be derived with Equation (2). In an example BIO implementation, BIO prediction may include one or more steps (e.g., two steps). A step (e.g., a first step) may be to derive an adjustment (e.g., with Equation (16)) from the high precision. A step (e.g., a second step) may be to derive the BIO prediction by combing predictions (e.g., two predictions) from lists (e.g., two lists) and the adjustment, as seen in Equation (17).

$$adj_{hp}(x, y) = v_x * \left( \tau_1 \frac{\partial I^{(1)}(x, y)}{\partial x} - \tau_0 \frac{\partial I^{(0)}(x, y)}{\partial x} \right) + v_y * \quad (16)$$

$$\left( \tau_1 \frac{\partial I^{(1)}(x, y)}{\partial y} - \tau_0 \frac{\partial I^{(0)}(x, y)}{\partial y} \right)$$

$$adj(x, y) = \text{sign}(adj_{hp}(x, y)) * ((|adj_{hp}(x, y)| + \text{round 1}) \gg \text{shift 1})$$

Parameter round1 may be equal to (1<<(shift1−1)) for 0.5 rounding.

$$\text{pred}_{BIO}(x,y)=(I^{(0)}(x,y)+I^{(1)}(x,y)+\text{adj}(x,y)+\text{round2}) \\ \gg \text{shift2} \quad (17)$$

Parameter round2 may be equal to (1<<(shift2−1)) for 0.5 rounding.

The rounding in Equation (16) may calculate the absolute value and the sign from a variable, and combine the sign and the intermediate result after right shifting. The rounding in Equation (16) may use multiple operations.

BIO gradients may be derived such that SIMD-based acceleration may be utilized. For example, BIO gradients may be derived by applying horizontal filtering followed by vertical filtering. The length of the intermediate data input to the second filtering process (e.g., vertical filtering) may be a multiple of the length of SIMD registers, perhaps to fully utilize the parallelism capability of the SIMD. In an example, the rounding operations on the input values may be directly performed. This may be implemented by additions and right shifts.

A vertical filtering may be followed by a horizontal filtering in the BIO gradient derivation process. The width of the intermediate block may not be well aligned with the lengths of common SIMD registers. The rounding operations during the gradient derivation process may also be performed based on absolute values, which may introduce costly computations (e.g., absolute calculation and multiplications) for SIMD implementation.

As shown in FIGS. 10A and 10B, vertical filtering may be followed by a horizontal filtering in the gradient calculation process of the BIO. Perhaps, because of the length of the interpolation filters and the gradient filters that may be used, the width of the intermediate data after the vertical filtering may be W+5. Such width may or may not be aligned with the widths of the SIMD registers that may be used in practice.

Figure 12A:
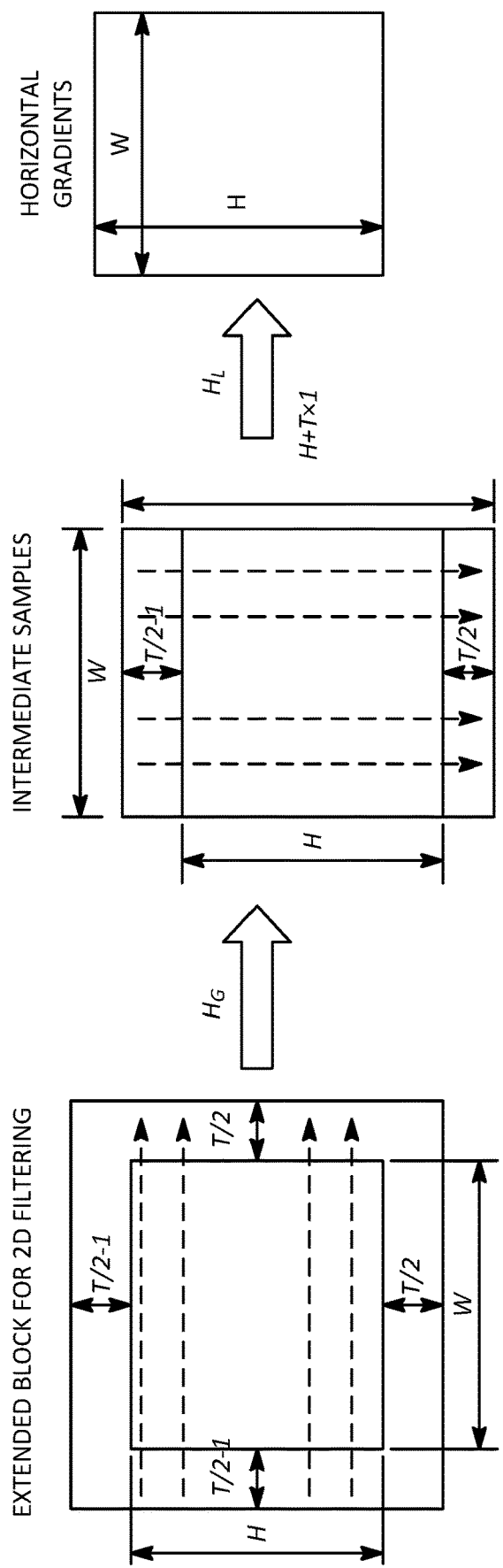
FIG. 12A illustrates an example modified 2D gradient filtering process of the BIO, where dash arrows indicate the filtering directions of the horizontal gradient derivation.
Figure 12B:
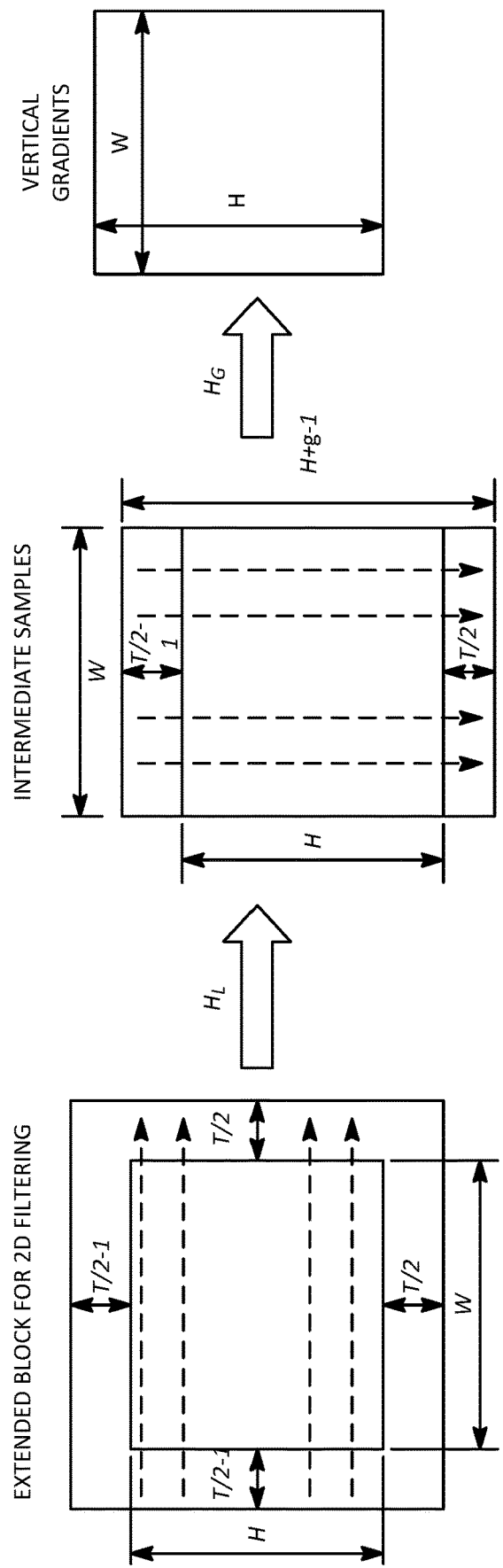
FIG. 12B illustrates an example modified 2D gradient filtering process of the BIO, where dash arrows indicate the filtering directions of the vertical gradient derivation.

Horizontal filtering may be performed followed by a vertical filtering for both the horizontal and vertical gradient derivations. To calculate horizontal gradients, the horizontal gradient filter $h_G$ may be performed to generate the intermediate horizontal gradients based on the fractional horizontal motion fracX, followed by the interpolation filter $h_L$ being vertically applied on top of the intermediate horizontal gradients according to the fractional vertical motion fracY. For the calculation of the vertical gradients, the interpolation filter $h_L$ may be applied in the horizontal direction based on the value of fracX, perhaps to calculate the intermediate samples. The gradient filter $h_G$ may be applied vertically to the intermediate samples depending, perhaps, on the value of fracY. FIGS. 12A and 12B illustrate the corresponding 2D gradient derivation process after filtering. As shown in FIGS. 12A and 12B, the size of the intermediate data (e.g., the intermediate gradients for the horizontal gradient calculation and the intermediate samples for the vertical gradient calculation) may be W×(H+T−1)=W×(H+5). The filtering process of FIGS. 12A and 12B may ensure that the width of the intermediate data (e.g., W) can align with the SIMD register lengths (e.g., 128-bit and 512-bit) that may be used in an implementation. Take the same example in FIGS. 10A and 10B for the illustration with the assumption of a 128-bit SIMD implementation, 10-bit input video and the block width W=8. As seen in FIGS. 10A and 10B, two set of SIMD operations may be used to process the data in each line of the intermediate block (e.g., W+5), where the first set may use the payload of the 128-bit SIMD registers (e.g., 100% usage), while the second set may use 80-bit out of the 128-bit payload (e.g., 62.5% usage). A set of SIMD operations may utilize the 128-bit register capacity, e.g., 100% usage.

As discussed herein, the BIO gradient derivation may round an input value based on its absolute value, which may minimize round errors. For example, absolute of the input may be calculated by, rounding the absolute value, and multiplying the rounded absolute value with the sign of the input. This rounding may be described as:

$$\sigma_r = \text{sign}(\sigma_i) \cdot ((\text{abs}(\sigma_i) + o) >> \text{shift}) \quad (18)$$

where $\sigma\_i$ and $\sigma\_r$ may be the corresponding values of the input signal and the signal after rounding; o and shift may be offset and the number of the right shifts that may be applied during the rounding. The rounding operations on the input values when deriving gradients for a BIO block may be performed, e.g., $$\sigma_r = (\sigma_i + o) >> \text{shift} \quad (19)$$

Figure 13:
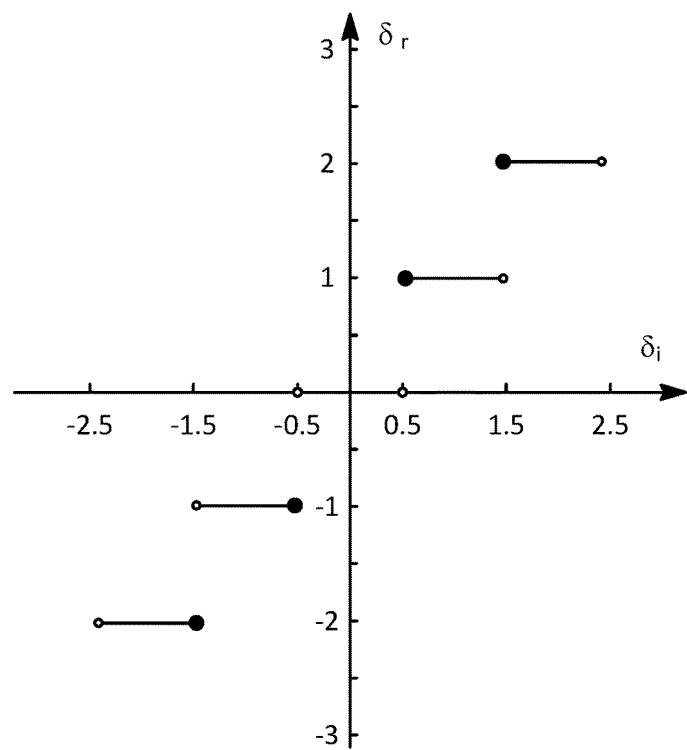
FIG. 13 illustrates an example mapping function of a rounding method for the BIO gradient derivation.
Figure 14:
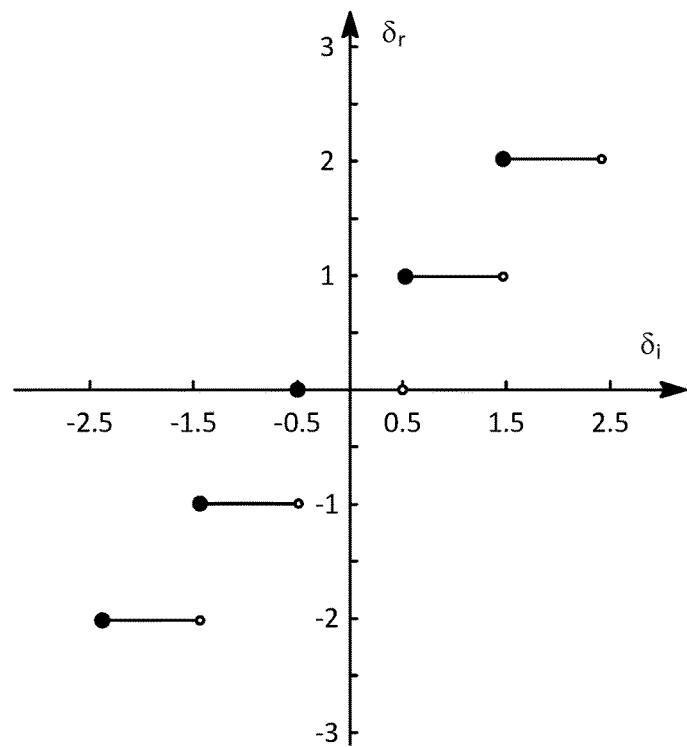
FIG. 14 illustrates an example mapping function of a rounding method for the BIO gradient derivation.

FIG. 13 and FIG. 14 compare the mapping functions of different rounding methods. As seen in FIG. 13 and FIG. 14, the difference between the rounded values calculated by the two methods may be minor. A difference may exist when input value of $\sigma\_i$ is, perhaps, equal to −0.5, −1.5, −2.5, . . . , which may be rounded to the integers −1, −2, −3, . . . by the rounding method of FIG. 13 and to the integers 0, −1, −2, . . . by the rounding method of FIG. 14. The coding performance impact introduced by the rounding method of FIG. 14 may be negligible. As seen in (17), the rounding method of FIG. 14 may be finished by a single step and may be implemented by additions and right shifts, both of which may be less expensive than the calculation of absolute values and the multiplications that may be used in (16).

Figure 15A:
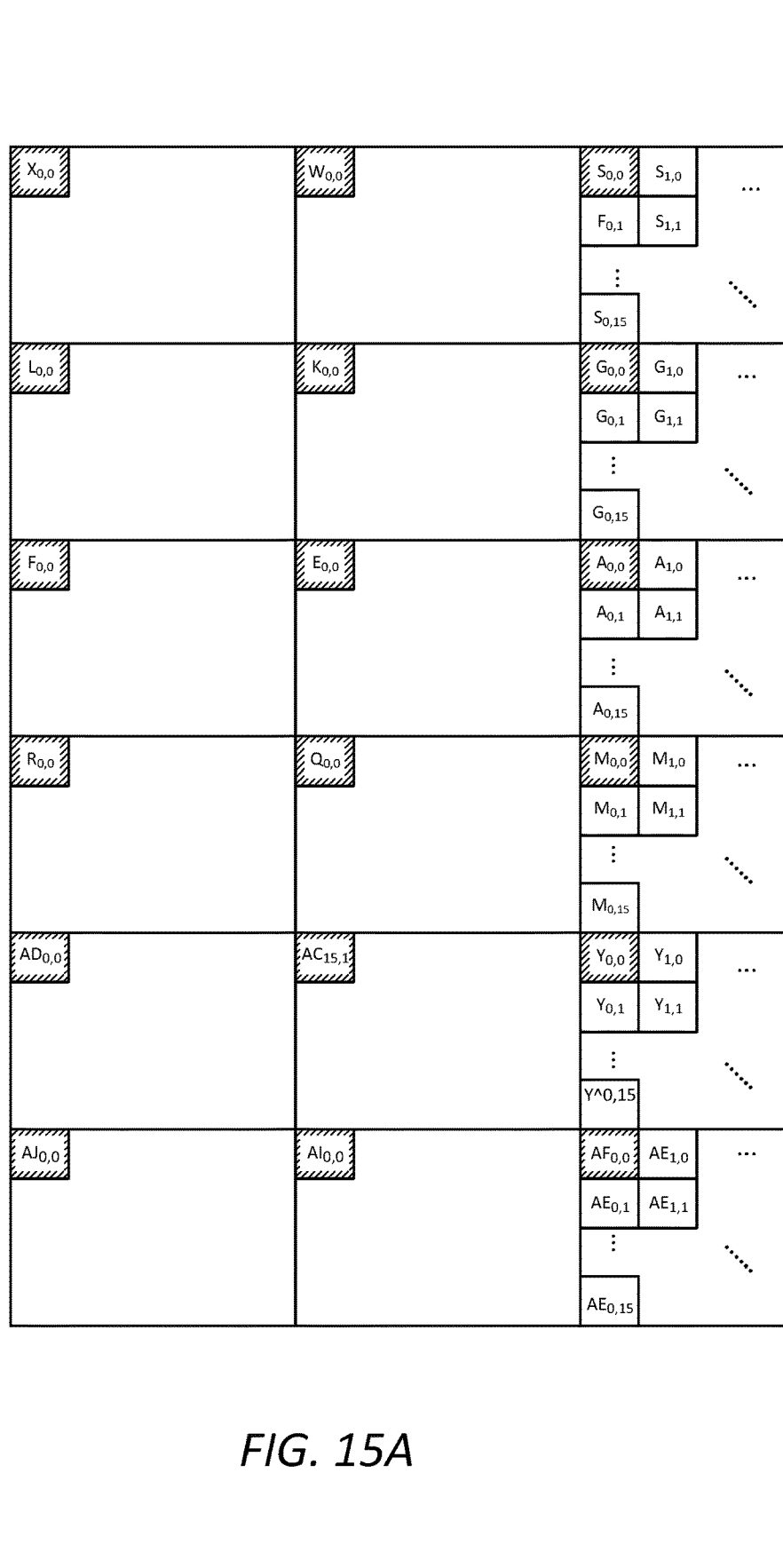
FIG. 15A illustrates an example gradient derivation process in the BIO with a motion precision of 1/16-pel.
Figure 15B:
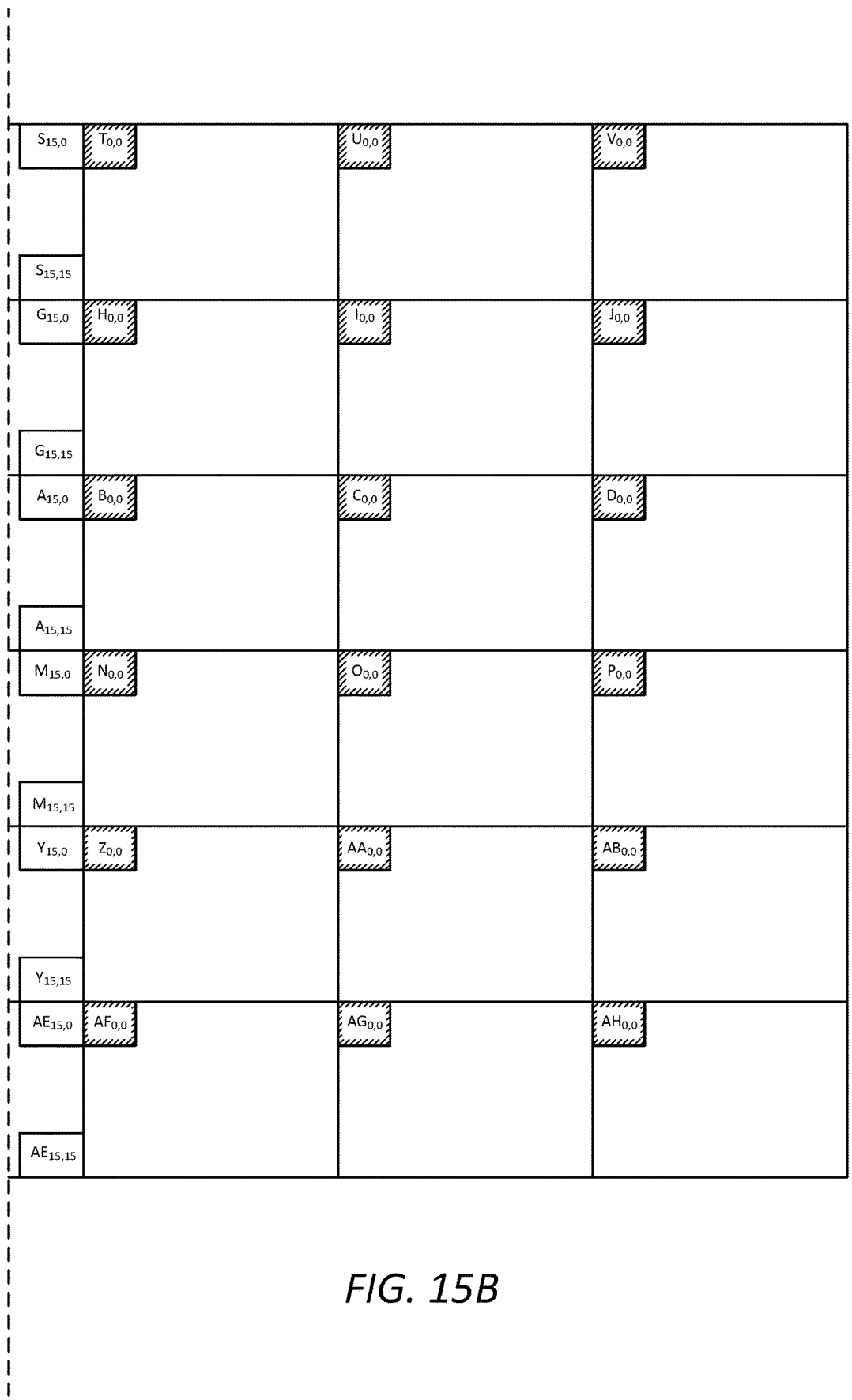
FIG. 15B illustrates an example gradient derivation process in the BIO with a motion precision of 1/16-pel.

As discussed herein, the ordering of a 2D separable filter and/or the use of certain rounding methods may impact BIO gradient derivation. FIGS. 15A and 12B illustrate an exemplary gradient derivation process where the ordering of a 2D separable filter and the use of certain rounding methods may impact BIO gradient derivation. For example, when deriving a horizontal gradient, the horizontal gradient values at the fractional samples s1,0, g1,0, a1,0, m1,0 and y1,0 may be derived by applying the gradient filter $h_G$ in the horizontal direction, e.g., $$gH\_s'_{1,0} = (8 \cdot X_{0,0} - 32 \cdot W_{0,0} - 13 \cdot S_{0,0} + 50 \cdot T_{0,0} - 18 \cdot U_{0,0} + 5 \cdot V_{0,0} + \text{OffSet}_0) >> (B-8)$$

$$gH\_g'_{1,0} = (8 \cdot L_{0,0} - 32 \cdot K_{0,0} - 13 \cdot G_{0,0} + 50 \cdot H_{0,0} - 18 \cdot I_{0,0} + 5 \cdot J_{0,0} + \text{OffSet}_0) >> (B-8)$$

$$gH\_a'_{1,0} = (8 \cdot F_{0,0} - 32 \cdot E_{0,0} - 13 \cdot A_{0,0} + 50 \cdot B_{0,0} - 18 \cdot C_{0,0} + 5 \cdot D_{0,0} + \text{OffSet}_0) >> (B-8)$$

$$gH\_m'_{1,0} = (8 \cdot R_{0,0} - 32 \cdot Q_{0,0} - 13 \cdot M_{0,0} + 50 \cdot N_{0,0} - 18 O_{0,0} + 5 \cdot P_{0,0} + \text{OffSet}_0) >> (B-8)$$

$$gH\_y'_{1,0} = (8 \cdot AD_{0,0} - 32 \cdot AC_{0,0} - 13 \cdot Y_{0,0} + 50 \cdot Z_{0,0} - 18 \cdot AA_{0,0} + 5 \cdot AB_{0,0} + \text{OffSet}_0) >> (B-8) \quad (20)$$

The horizontal gradient of all, e.g., $gH\_a'_{1,1}$, may be interpolated from those intermediate horizontal gradient values by applying the interpolation filter $h_L$ vertically, as illustrated as:

$$gH\_a'_{1,1} = (gH\_s'_{1,0} - 3 \cdot gH\_g'_{1,0} + 64 \cdot gH\_a'_{1,0} + 4 \cdot gH\_m'_{1,0} - 2 \cdot gH\_y'_{1,0} + \text{OffSet}_1) >> (18-B) \quad (21)$$

The vertical gradient may be calculated by interpolating the sample values at fractional position (1,0) by applying the interpolation filter $h_L$ in the horizontal direction, e.g., $$s_{1,0} = (X_{0,0} - 3 \cdot W_{0,0} + 64 \cdot S_{0,0} + 4 \cdot T_{0,0} - 2 \cdot U_{0,0} + \text{OffSet}_0) >> (B-8)$$

$$g_{1,0} = (L_{0,0} - 3 \cdot K_{0,0} + 64 \cdot G_{0,0} + 4 \cdot H_{0,0} - 2 \cdot I_{0,0} + \text{OffSet}_0) >> (B-8)$$

$$a_{1,0} = (F_{0,0} - 3 \cdot E_{0,0} + 64 \cdot A_{0,0} + 4 \cdot B_{0,0} - 2 \cdot C_{0,0} + \text{OffSet}_0) >> (B-8)$$

$$m_{1,0} = (R_{0,0} - 3 \cdot Q_{0,0} + 64 \cdot M_{0,0} + 4 \cdot N_{0,0} - 2 O_{0,0} + \text{OffSet}_0) >> (B-8)$$

$$y_{0,1} = (AD_{0,0} - 3 \cdot AC_{0,0} + 64 \cdot Y_{0,0} + 4 Z_{0,0} - 2 \cdot AA_{0,0} + \text{OffSet}_0) >> (B-8)$$

$$ae_{0,1} = (AJ_{0,0} - 3 \cdot AI_{0,0} + 64 \cdot AE_{0,0} + 4 \cdot AF_{0,0} - 2 \cdot AG_{0,0} + \text{OffSet}_0) >> (B-8) \quad (22)$$

The vertical gradient value at a1,1 may be obtained by vertically performing the gradient filter $h_G$ on top of the intermediate fraction positions at (1,0), as shown as:

$$gV\_a'_{1,1} = (8 \cdot s_{1,0} - 32 g_{1,0} - 13 a_{1,0} + 50 \cdot m_{1,0} - 18 \cdot y_{1,0} + 5 \cdot ae_{1,0} + \text{OffSet}_1) >> (18-B) \quad (23)$$

The bit-depth increases caused by the interpolation filter and the gradient filter may be the same (e.g., 6-bit as indicated by Table 1 and Table 2). Changing the filtering order may not affect the internal bit-depth.

As discussed herein, one or more coding tools (e.g., ATMVP, STMVP, FRUC and affine mode) based on sub-block-level motion compensation may be used. If these coding tools are enabled, a coding block may split into multiple small sub-blocks (e.g., 4×4 blocks) and may derive its own motion information (e.g., reference picture indices and motion vectors) that may be used at the motion compensation stage. Motion compensation may be performed separately for each sub-block. The additional reference samples may be fetched to perform the motion compensation for each sub-block. Region-based motion compensation based on variable block sizes may be applied to merge the contiguous sub-blocks that present the same motion information inside the coding block for a motion compensation process. This may lower the number the motion compensation process and the BIO process applied inside the current block. Different schemes may be used to merge neighboring sub-blocks. Line-based sub-block merging and 2D sub-block merging may be performed.

Motion compensated prediction may be performed for the blocks that are coded by sub-block modes. Variable block-size motion compensation may be applied by merging the contiguous sub-blocks that have the same motion information into a sub-block-group. A single motion compensation may be performed for each sub-block-group.

Figure 16A:
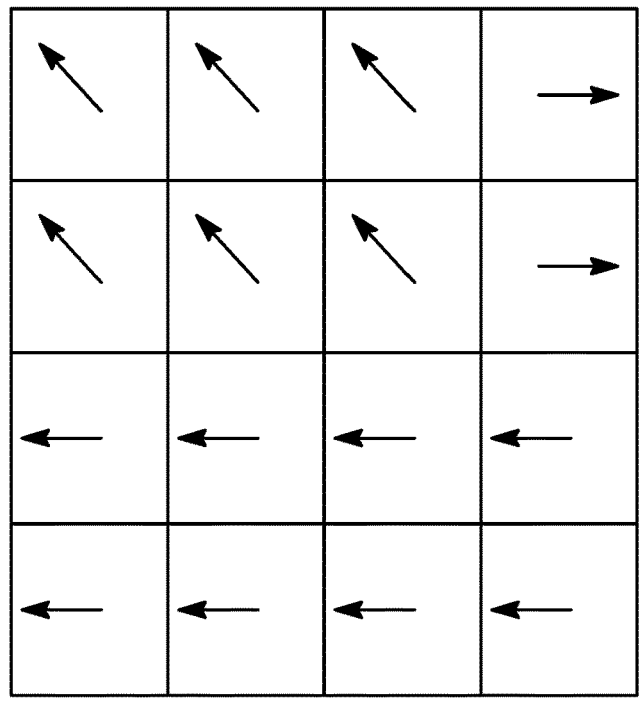
FIG. 16A illustrates an example comparison of various sub-block-based motion compensation.
Figure 16B:
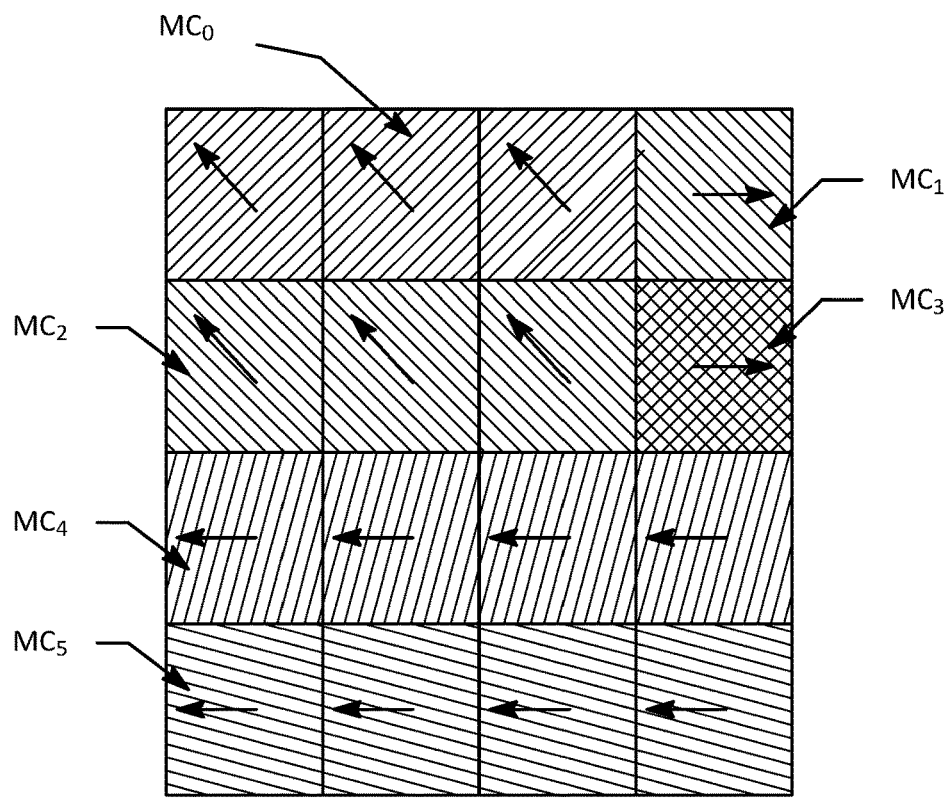
FIG. 16B illustrates and example comparison of various sub-block-based motion compensation with sub-block merging.

In line-based sub-block merging, adjacent sub-blocks may be merged by locating the same sub-block line inside the current coding block that has identical motion into one group and performs a single motion compensation for the sub-blocks within the group. FIG. 16A shows an example where the current coding block consists of 16 sub-blocks and each block may be associated with a specific motion vector. Based on the existing sub-block-based motion compensation method (as shown in FIG. 11), perhaps to generate the prediction signal of the current block, both the regular motion compensation and the BIO motion refinement may be done for each sub-block separately. Correspondingly, there may be 16 invocations of the motion compensation operations (each operation includes both the regular motion compensation and the BIO). FIG. 16B illustrates the sub-block motion compensation process after the line-based sub-block merging scheme is applied. As shown in FIG.

16B, after horizontally merging the sub-blocks with identical motion, the number of the motion compensation operations may be reduced to 6.

Sub-block merging may be dependent on a block's shape.

As seen in FIG. 16B, the motion of neighboring sub-blocks in a horizontal direction may be considered for merging at the motion compensation stage. For example, the sub-blocks in a (e.g., the same) sub-block row inside the CU may be considered for merging at the motion compensation stage. A (e.g., one) quad-tree plus binary-tree (QTBT) structure may be applied to partition the blocks in a (e.g., one) picture. In the QTBT structure, a (e.g., each) coding unit tree (CTU) may be partitioned using a quad-tree implementation. A (e.g., each) quad-tree leaf node may be partitioned by a binary-tree. This partitioning may occur in the horizontal and/or vertical direction. Coding blocks in a rectangular and/or square shape may be used for intra coding and/or inter coding. This may be due to the binary-tree partitions. If, for example, such a block partitioning scheme is implemented and a line-based sub-block merging method is applied, sub-blocks may have similar (e.g., identical) motion in the horizontal direction. For example, if a rectangular block is vertically oriented (e.g., the block height is larger than the block width), adjacent sub-blocks located in the same sub-block column may be more correlated than the adjacent sub-blocks that are located in the same sub-block row. In such case, sub-blocks may be merged in the vertical direction.

Figure 18A:
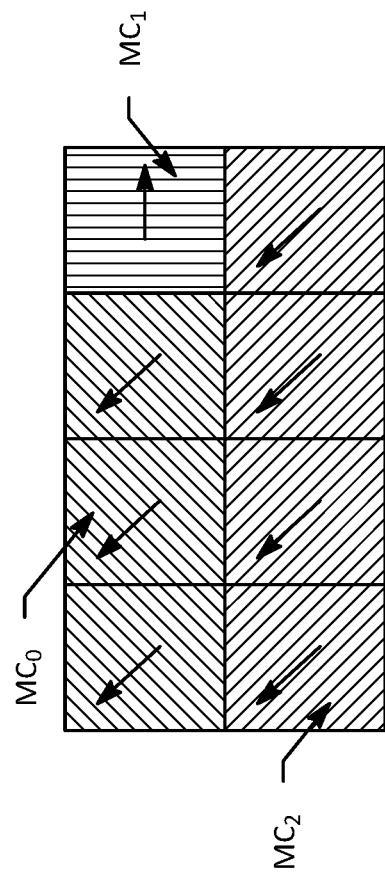
FIG. 18A illustrates an example row-wise sub-block merging implementation.
Figure 18A:
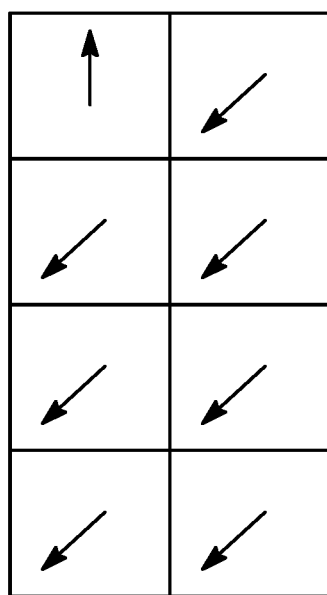
Figure 18B:
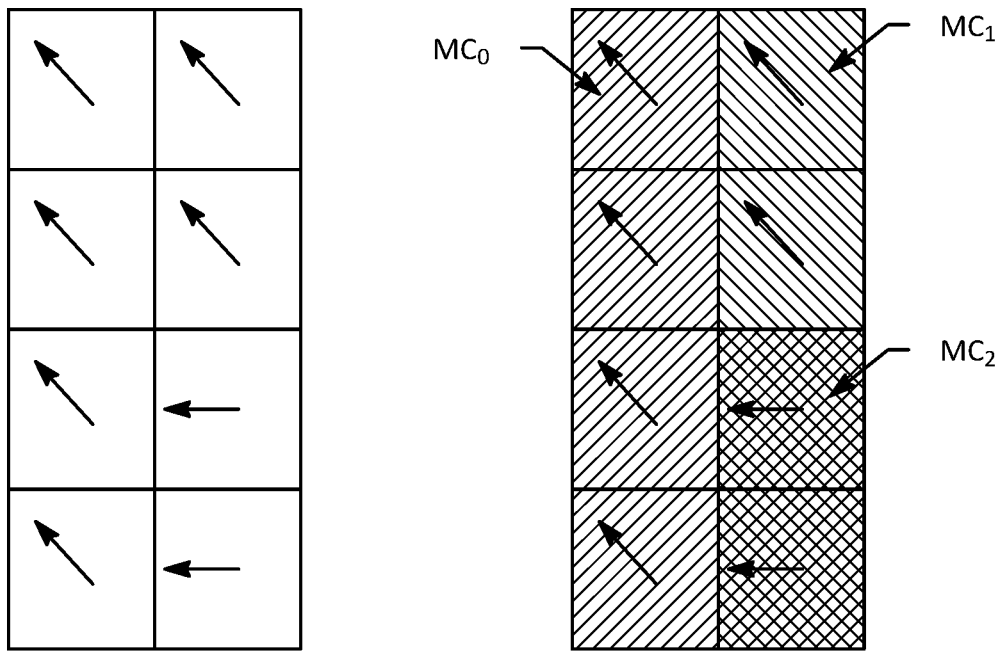
FIG. 18B illustrates an example column-wise sub-block merging implementation.

A block-shape dependent sub-block merging scheme may be used. For example, if a CU's width is greater than or equal to its height, a row-wise sub-block merging scheme may be used to jointly predict the sub-blocks with the same motion in the horizontal direction (e.g., the sub-blocks that are located in the same sub-block row). This may be performed using a (e.g., one) motion compensation operation. If, for example, a CU's height is greater than its width, a column wise sub-block merging scheme may be used to merge adjacent sub-blocks that have the same motion and are located in the same sub-block column inside the current CU. This may be performed using a (e.g., one) motion compensation operation. FIGS. 18A and 18B illustrate an example implementation of adaptive sub-block merging based on block shape.

In the line/column-based sub-block merging scheme described herein, the motion consistency of the neighboring sub-blocks in the horizontal direction and/or in the vertical direction may be considered to merge the sub-blocks at the motion compensation stage. In practice, the motion information of the adjacent sub-blocks may be highly correlated in the vertical direction. For example, as shown in FIG. 16A, the motion vectors of the first three sub-blocks in the first sub-block row and the second sub-block row may be the same. In such case, both the horizontal and vertical motion consistency may be considered when merging sub-blocks for a more efficient motion compensation. A 2D sub-block merging scheme may be used, where the adjacent sub-blocks in both horizontal and vertical directions may be merged into a sub-block group. To calculate the block size for each motion compensation, a progressive searching method can be used to merge the sub-blocks both horizontally and vertically. Given a sub-block position, it may work by: calculating the maximum number of consecutive sub-blocks in the sub-block rows (e.g., each sub-block row) that can be merged into one single motion compensation stage; comparing the motion compensation block-size that may be achieved at current sub-block row with that as calculated at the last sub-block row; and/or merging the sub-block. This may proceed by repeating the above steps until, perhaps, the motion compensation block-size may not be further increased after merging additional sub-blocks in a given sub-block row.

The searching method described herein may be summarized by the following example procedures. Given a sub-block position $b_{i,j}$ at i-th sub-block row and j-th sub-block column, the number of consecutive sub-blocks in the i-th sub-block row with the same motion as the current sub-block (e.g., N') may be calculated. The corresponding motion compensation block-size $S_i=N_i$ and set k=i; may proceed to the (k+1)-th sub-block row and calculate the number of consecutive sub-blocks that are allowed to be merged (e.g., $N_{k+1}$); update $N_{k+1}=\min(N_k, N_{k+1})$ and calculate the corresponding motion compensation block-size $S_{k+1}=N_{k+1}\cdot(k-i+1)$; if $S_{k+1}>S_k$, set $N_{k+1}=N_k$, k=k+1, proceed to the (k+1)-th sub-block row and calculate the number of consecutive sub-blocks that are allowed to be merged (e.g., $N_{k+1}$); update $N_k+1=\min(N_k, N_{k+1})$ and calculate the corresponding motion compensation block-size $S_{k+1}=N_{k+1}\cdot(k-i-1)$; otherwise, terminate.

Figure 16C:
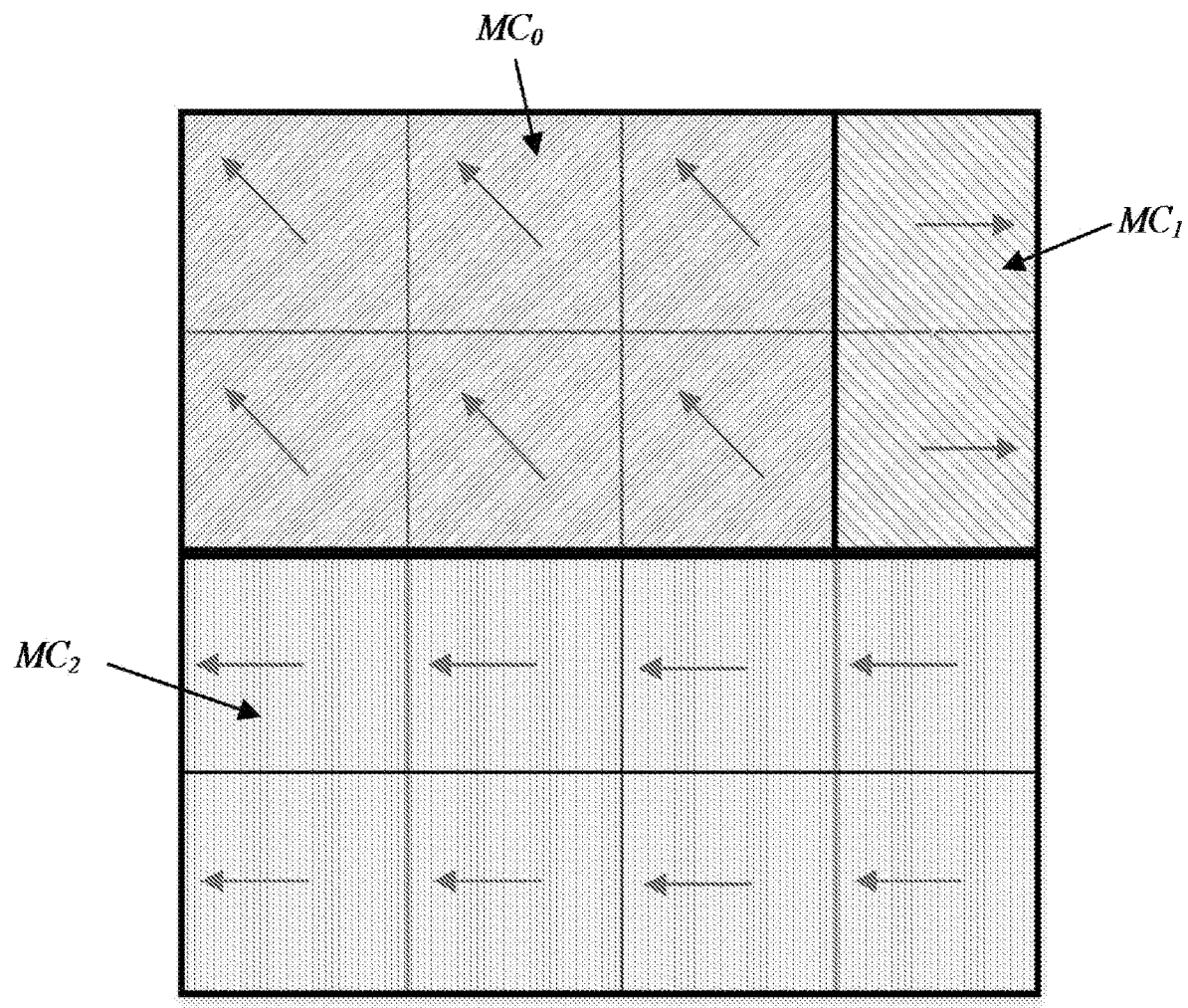
FIG. 16C illustrates an example comparison of various sub-block-based motion compensation with 2D sub-block merging.

FIG. 16C illustrates the corresponding sub-block motion compensation process after the 2D sub-block merging scheme is applied. As seen in FIG. 16C, the number of the motion compensation operations may be 3 (e.g., a motion compensation operation for the three sub-block groups).

Figure 17A:
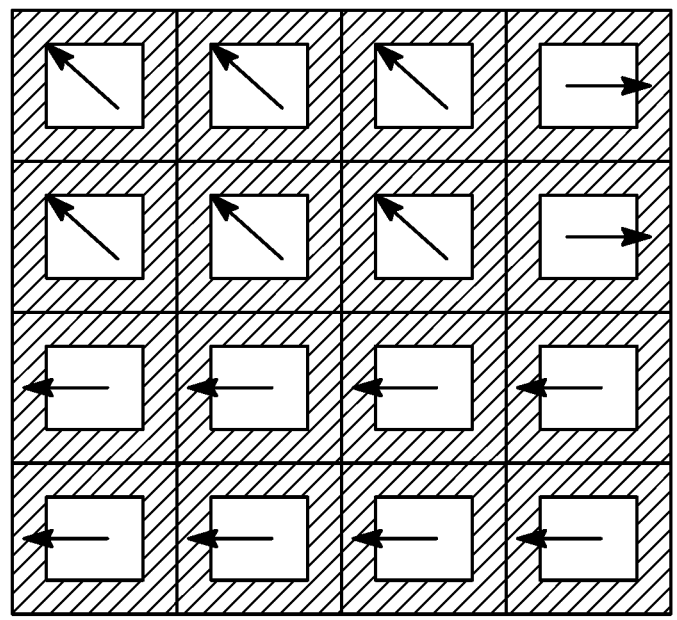
FIG. 17A illustrates an example indication of samples that are affected by the BIO block extension constraint with a sub-block motion compensation method applied.
Figure 17B:
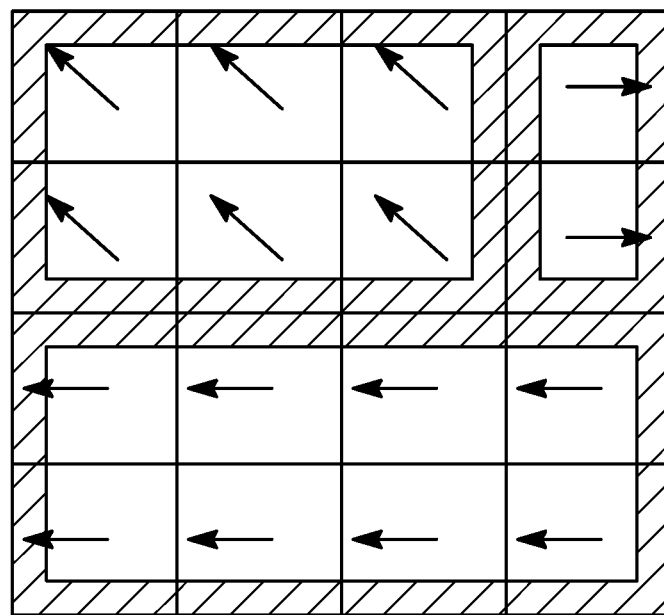
FIG. 17B illustrates an example indication of samples that are affected by the BIO block extension constraint with a sub-block motion compensation based on 2D sub-block merging.

As described herein, the sub-block merging may be performed. The block extension constraint may be applied to the BIO gradient derivation process. The neighboring samples that are within the current block may be used to calculate the local motion refinement for the sample positions inside the block. The local motion refinement of a sample may be calculated by considering the neighboring samples in a 5×5 surrounding area of the sample (as shown in (5)), and the length of the current gradient/interpolation filter may be 6. The local motion refinement values derived for the samples in the first/last two rows and the first/last two columns of the current block may be less accurate when compared to the motion refinement values derived at other sample positions, perhaps because of the duplication of the horizontal/vertical gradients of the four corner sample positions to the extended area of the current block. Using a larger block-size at the motion compensation stage may reduce the number of samples that are affected by the BIO block extension constraint. Assuming the size of sub-blocks is 8, FIGS. 17A and 17B compare the number of the affected samples due to the BIO block extension constraint when using a sub-block motion compensation method (FIG. 17A) and when using a 2D sub-block merging scheme (FIG. 17B) are applied, respectively. As seen in FIGS. 17A and 17B sub-block merging may reduce the number of the influenced samples and may also minimize the impact incurred by the inaccurate motion refinement calculation.

A rounding may be performed in BIO prediction derivation. Rounding may be applied (e.g., may firstly be applied) to an absolute value. A sign may be applied (e.g., may then be applied after right shifting). Rounding in adjustment derivation for BIO prediction may be applied as shown in Equation (24). The right shifting in Equation (24) may be an arithmetic right shift (e.g., the sign of the variable may be kept unchanged after right shifting). The adjustment adj(x,y) may be calculated in SIMD. The adjustment may be calculated with one addition and one right shift operation. Example differences between the rounding in Equation (16) and the rounding in Equation (24) may be shown in FIG. 13 and/or FIG. 14.

$$adj_{hp}(x, y) = v_x * \left(\tau_1 \frac{\partial I^{(1)}(x, y)}{\partial x} - \tau_0 \frac{\partial I^{(0)}(x, y)}{\partial x}\right) + \quad (24)$$

$$v_y * \left(\tau_1 \frac{\partial I^{(1)}(x, y)}{\partial y} - \tau_0 \frac{\partial I^{(0)}(x, y)}{\partial y}\right)$$

$$adj(x, y) = (adj_{hp}(x, y) + \text{round } 1) \gg \text{shift } 1$$

The rounding method seen in (24) may perform two rounding operations (e.g., round1 in (24) and round2 in (17)) on the original input values. The rounding method seen in (24) may merge the two right shift operations (e.g., shift1 in (24) and shift2 in (17)) into a one right shift. A final prediction generated by the BIO may be seen in Equation (25):

$$\text{pred}_{BIO}(x,y) = (((I^{(0)}(x,y) + I^{(1)}(x,y)) \ll \text{shift1}) + adj_{hp}(x, y) + \text{round3}) \gg (\text{shift1} + \text{shift2}) \quad (25)$$

where round3 is equal to $(1 \ll (\text{shift1} + \text{shift2} - 1))$.

A current bit-depth for deriving the adjustment values (which may be set to 21-bit, where one bit may be used for the sign) may be higher than an intermediate bit-depth of bi-prediction. As shown in (16), a rounding operation (e.g., round1) may be applied to an adjustment value (e.g., $adj_{hp}(x, y)$). The intermediate bit-depth may be applied for generating bi-prediction signals (e.g., which may be set to 14-bit). An absolute value based right shift (e.g., shift1=20-14=6) may be implemented in Equation (16). The bit-depth of the derived BIO adjustment value may be reduced, for example, from 21-bit to 15-bit, such that the first rounding operation (e.g., round1) may be skipped during the BIO process. The BIO generation process seen in (16) and (17), may be altered, as seen in (26) and (27):

$$adj_{Lp}(x, y) = v_x^{LP} * \left(\tau_1 \frac{\partial^{LP} I^{(1)}(x, y)}{\partial x} - \tau_0 \frac{\partial^{LP} I^{(0)}(x, y)}{\partial x}\right) + \quad (26)$$

$$v_y^{LP} * \left(\tau_1 \frac{\partial^{LP} I^{(1)}(x, y)}{\partial y} - \tau_0 \frac{\partial^{LP} I^{(0)}(x, y)}{\partial y}\right)$$

$$\text{pred}_{BIO}(x, y) = (I^{(0)}(x, y) + I^{(1)}(x, y) + adj_{Lp}(x, y) + \quad (27)$$

$$\text{round } 2) \gg \text{shift } 2 \text{ where } \frac{\partial^{LP} I^{(k)}(x, y)}{\partial x} \text{ and } \frac{\partial^{LP} I^{(k)}(x, y)}{\partial y}$$

may be the horizontal and vertical prediction gradients derived at a reduced precision, and $v_x^{LP}$ and $v_y^{LP}$ may be the corresponding local motion at a lower bit-depth. As seen in (27), one rounding operation may be used in a BIO generation process.

It should be mentioned that in addition to being applied separately, the methods described herein may be applied in combination. For example, the BIO gradient derivation and the sub-block motion compensation described herein may be combined. The methods described herein may be jointly enabled at the motion compensation stage.

Figure 19:
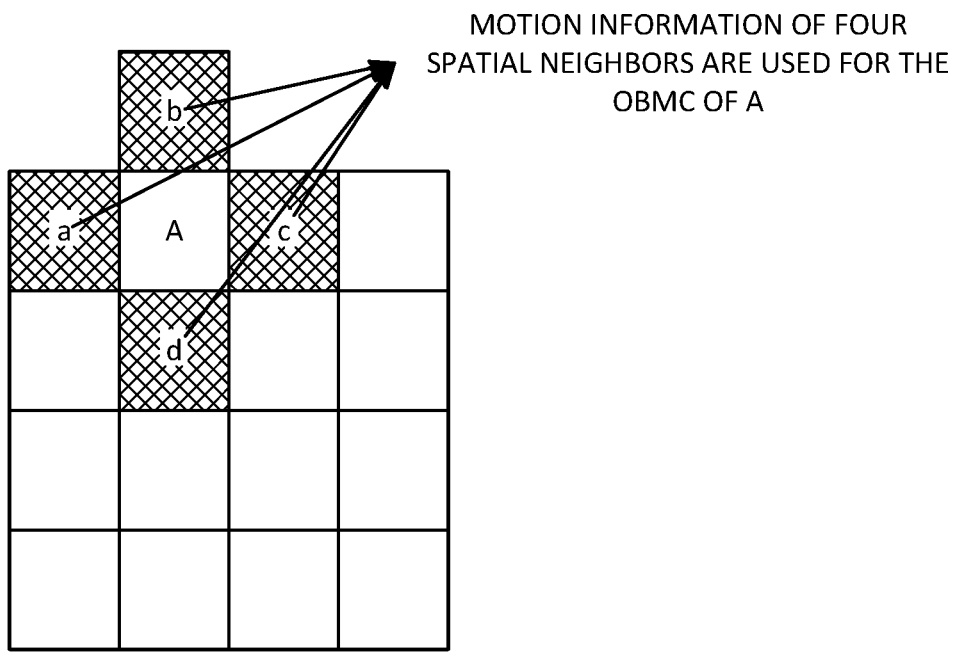
FIG. 19 illustrates an example of overlapped block motion compensation.

The overlapped block motion compensation (OBMC) may be performed to remove the blocking artifact at the MC stage. OBMC may be performed for one or more, or all, inter block boundaries, perhaps for example except the right and/or bottom boundaries of one block. When one video block is coded in one sub-block mode, a sub-block mode may refer to a coding mode that allows the sub-blocks inside the current block to have their own motion, e.g., the FRUC mode). OBMC may be performed for one or more, or all four of the sub-block's boundaries. FIG. 19 illustrates an example of the concept of the OBMC. When the OBMC is applied to one sub-block (e.g., the sub-block A in FIG. 19), perhaps in addition to the motion vector of the current sub-block, motion vectors of up to four neighboring sub-blocks may also be used to derive the prediction signal of the current sub-block. The one or more, or multiple, prediction blocks using the motion vectors of neighboring sub-blocks may be averaged to generate the final prediction signal of the current sub-block.

Weighted averages may be used in OBMC to generate the prediction signal of one or more blocks. The prediction signal may be denoted using the motion vector of at least one neighboring sub-block as PN and/or the prediction signal using the motion vector of the current sub-block as PC. When OBMC is applied, the samples in the first/last four rows/columns of PN may be weighted averaged with the samples at the same positions in PC. The samples to which the weighted averaging is applied may be determined according to the location of the corresponding neighboring sub-block. When the neighboring sub-block is an above neighbor (e.g., sub-block b in FIG. 19), for example, the samples in the first X rows of the current sub-block may be adjusted. When the neighboring sub-block is a below neighbor (e.g., sub-block d in FIG. 19), for example, the samples in the last X rows of the current sub-block may be adjusted. When the neighboring sub-block is a left neighbor (e.g., sub-block a in FIG. 19), for example, the samples in the first X columns of the current block may be adjusted. Perhaps when the neighboring sub-block is a right neighbor (e.g., sub-block c in FIG. 19), for example, the samples in the last X columns of the current sub-block may be adjusted.

The values of X and/or the weight may be determined based on the coding mode that is used to code the current block. For example, when the current block is not coded in a sub-block mode, weighting factors {¼, ⅛, 1/16, 1/32} may be used for at least the first four rows/columns of PN and/or weighting factors {¾, ⅞, 15/16, 31/32} may be used for the first four rows/columns of PC. For example, when the current block is coded in sub-block mode, the first two rows/columns of PN and PC may be averaged. In such scenarios, among others, weighting factors {¼, ⅛} may be used for PN and/or weighting factors {¾, ⅞} may be used for PC.

Figure 20:
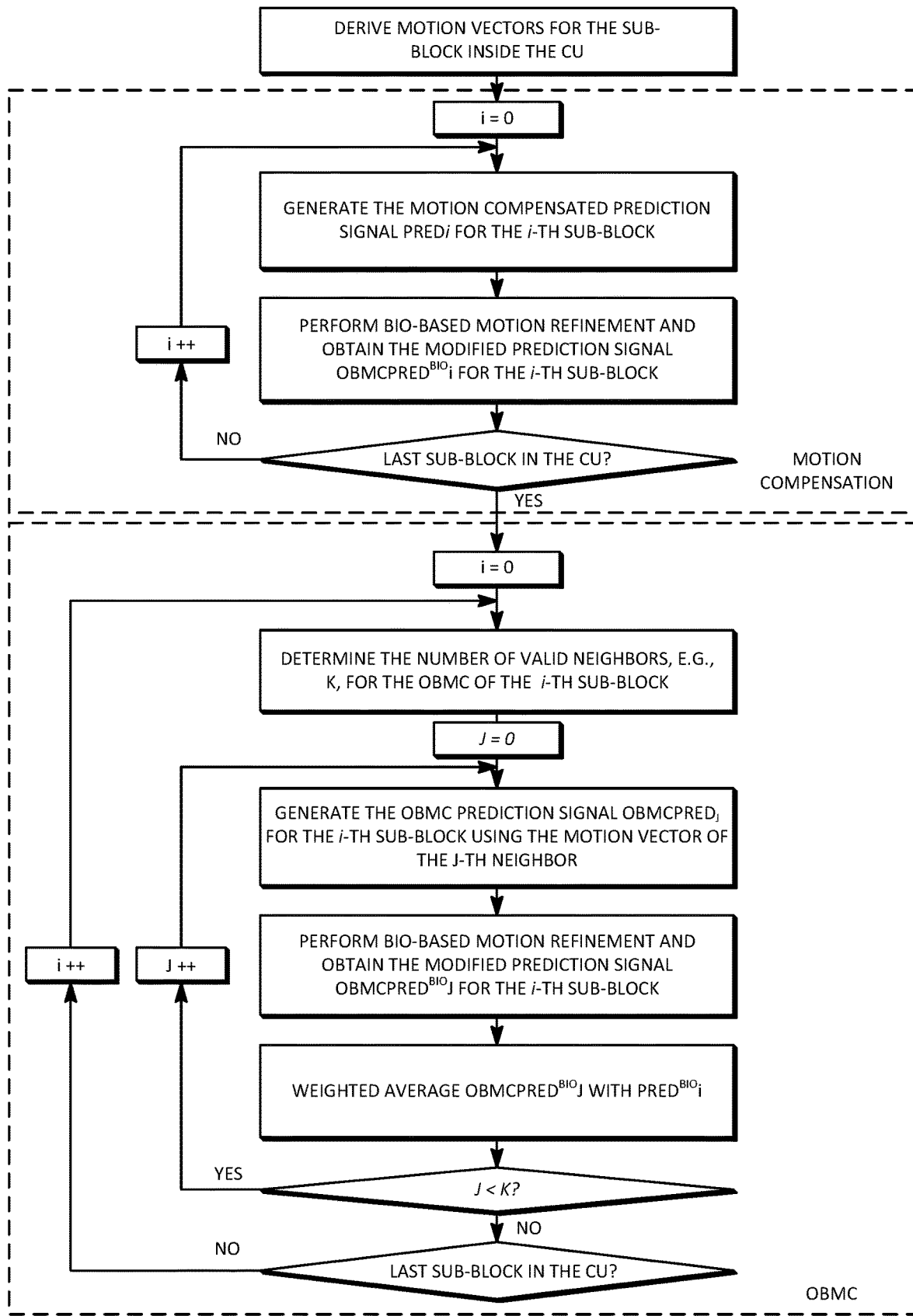
FIG. 20 illustrates an example of a motion compensation process.

As described herein, BIO can be considered as one enhancement of the regular MC by improving the granularity and/or the accuracy of the motion vectors that are used at the MC stage. Assuming that a CU contains multiple sub-blocks, FIG. 20 illustrates an example of the process to generate the prediction signal for the CU using BIO-related operations. As shown in FIG. 20, the motion vectors may be derived for one or more, or all, the sub-blocks of the current CU. The regular MC may be applied to generate the motion-compensated prediction signal (e.g., $\text{Pred}_i$) for one or more, or each, sub-block inside the CU. Perhaps if the BIO is used, for example, the BIO-based motion refinement may be performed to obtain the modified prediction signal $\text{Pred}^{BIO}_i$ for the sub-block. When the OBMC is used, for example, it may be performed for one or more, or each, sub-block of the CU by following the same procedure(s) as described herein to generate the corresponding OBMC prediction signal. In some scenarios, the motion vectors of spatial neighboring sub-blocks (e.g., perhaps instead of the motion vector of the current sub-block) may be used to derive prediction signal.

Figure 21:
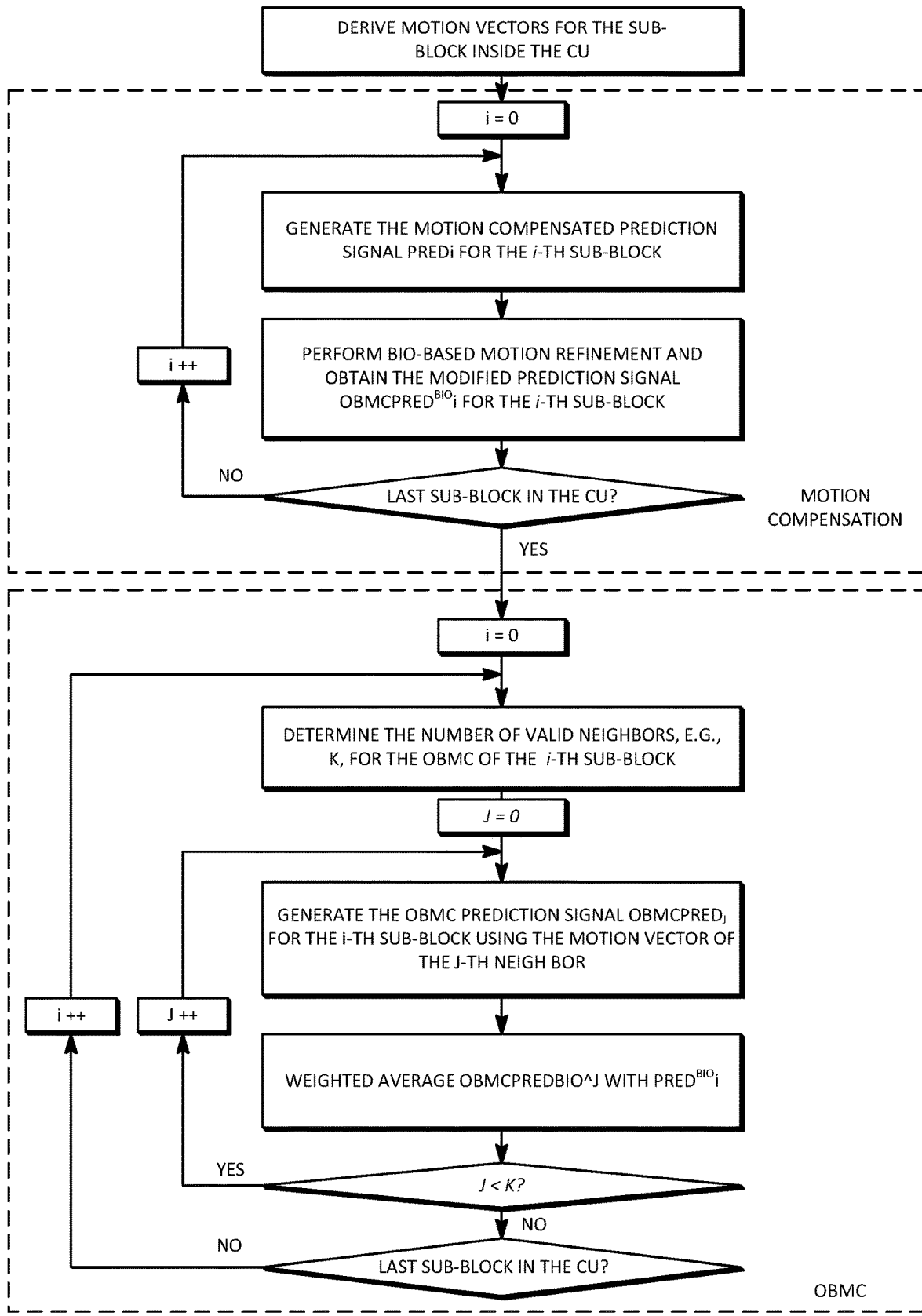
FIG. 21 illustrates an example of a motion compensation process.

In FIG. 20, for example when at least one sub-block is bi-predicted, the BIO may be used at the regular MC stage and/or the OBMC stage. The BIO may be invoked for generating the prediction signal of the sub-block. FIG. 21 shows an example flowchart of a prediction generation process after the OBMC, which may be performed without the BIO. In FIG. 21, perhaps for example at the regular MC stage, the motion-compensated prediction may still be followed by the BIO. As described herein, the derivation of BIO-based motion refinement may be a sample-based operation.

BIO may be applied at the regular MC process for a current CU coded with a sub-block mode (e.g., FRUC, affine mode, ATMVP, and/or STMVP). For the CUs coded by one or more, or any, of those sub-block modes, the CU may further split into one or more, or multiple, sub-blocks and one or more, or each, sub-block may be assigned one or more unique motion vectors (e.g., uni-prediction and/or bi-prediction). Perhaps for example when the BIO is enabled, the decision on whether to apply the BIO or not and/or the BIO operation itself may be performed separately for one or more, or each, of the sub-blocks.

As described herein, one or more techniques are contemplated to skip BIO operations at the MC stage (e.g., the regular MC stage). For example, the core design of BIO (e.g., the calculation of the gradients and/or the refined motion vectors) may be kept the same and/or substantially similar. In one or more techniques, the BIO operation may be (e.g., partially or completely) disabled for the blocks/ sub-blocks where one or more factors or conditions may be satisfied. In some instances, MC may be performed without the BIO.

In a sub-block mode, a CU may be allowed to split into more than one sub-blocks and/or one or more different motion vectors may be associated with one or more, or each, sub-block. Motion compensated prediction and/or BIO operations may be performed on the CU and/or the more than one sub-blocks (e.g., if the CU is enabled with sub-block coding). One or more of the techniques described herein may be applicable to video blocks that might not be coded by the sub-block mode (e.g., without being split and/or having a (e.g., single) motion vector).

As described herein, BIO may compensate for the (e.g., small) motion that may remain between the (e.g., at least) two prediction blocks generated by the conventional block-based MC. As shown in FIG. 8A and FIG. 8B, FRUC bilateral-matching may be used to estimate the motion vectors based on the temporal symmetry along the motion trajectory between the prediction blocks in the forward and/or backward reference pictures. For example, the value of the motion vectors associated with the two prediction blocks may be proportional to the temporal distance between the current picture and their respective reference picture. Bilateral-matching based motion estimation can provide one or more (e.g., reliable) motion vectors, perhaps for example when there may be (e.g., only) small translational motion between two reference blocks (e.g., the coding blocks in the highest temporal layers in the random-access configuration).

Figure 22:
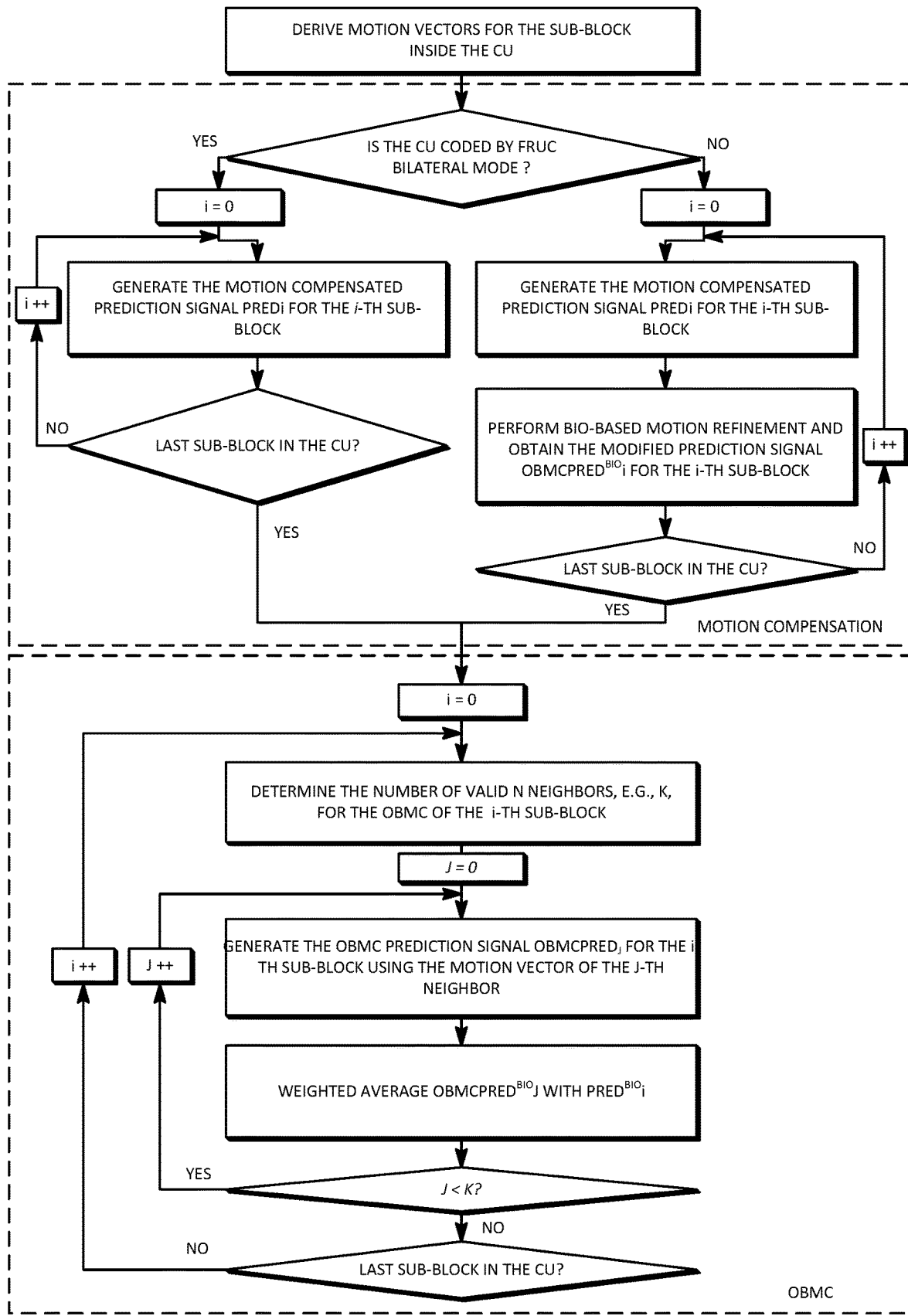
FIG. 22 illustrates an example motion compensation process after skipping the BIO for the blocks coded in/by a FRUC bilateral mode.

For example, when at least one sub-block is coded by the FRUC bilateral mode, among other scenarios, the one or more true motion vectors of the samples inside the sub-block may be (e.g., should be) coherent. In one or more techniques, the BIO may be disabled during the regular MC process for the one or more sub-blocks which are coded by the FRUC bilateral mode. FIG. 22 shows an example diagram for a prediction generation process after disabling the BIO process for FRUC bilateral blocks at the MC stage. For example, at the decoder side, perhaps once the decoder may determine that FRUC bilateral mode is/was used to code a block, the BIO process may be bypassed.

As described herein, the BIO may be skipped for the one or more FRUC bilateral sub-blocks for which the two motion vectors may be (e.g., may always be) symmetric in the temporal domain. Perhaps to achieve further complexity reductions, among other scenarios, the BIO process may be skipped at the MC stage based on the (e.g., absolute) difference between the at least two motion vectors of at least one bi-predicted sub-block. For example, for the one or more sub-blocks that may be predicted by two motion vectors that may be approximately proportional in the temporal domain, it may be reasonably assumed that the two prediction blocks are highly correlated and/or the motion vectors that are used at the sub-block-level MC may be sufficient to accurately reflect the true motion between the prediction blocks. In one or more scenarios, the BIO process may be skipped for those sub-blocks. For scenarios in which the bi-predicted sub-blocks whose motion vectors might not be (e.g., may be far from) being temporally proportional, BIO may be performed on top of the sub-block-level motion-compensated predictions.

Using the same notations as in FIG. 3, e.g., $(MV_{x0}, MV_{y0})$ and/or $(MV_{x1}, MV_{y1})$ denote the sub-block-level motion vectors (e.g., prediction signal) that may be used to generate the two prediction blocks. Also, $\tau_0$ and $\tau_1$ denote the temporal distances of the forward and/or backward temporal reference pictures to the current picture. Also, $(MV^s_{x1}, MV^s_{y1})$ may be calculated as the scaled version of $(MV_{x1}, MV_{y1})$, which may be generated based on $\tau_0$ and $\tau_1$ as:

$$MV^s_{x1} = MV_{x1} \cdot \frac{\tau_0}{\tau_1}, MV^s_{y1} = MV_{y1} \cdot \frac{\tau_0}{\tau_1} \qquad (28)$$

Based on (28), perhaps when one or more contemplated techniques may be applied, the BIO process may be skipped for at least one block and/or sub-block. For example, based on (28), two prediction blocks (e.g., reference blocks) may be determined to be similar or dissimilar (e.g., determined based on a prediction difference). If the two prediction blocks (e.g., reference blocks) are similar, the BIO process may be skipped for the at least one block or sub-block. If the two predictions blocks (e.g., reference blocks) are dissimilar, the BIO process may not be skipped for the at least one block or sub block. For example, two prediction blocks may be determined to be similar when the following condition is satisfied:

$$\max(\text{abs}(MV_{x0}-MV^s_{x1}),\text{abs}(MV_{y0}-MV^s_{y1})) \leq \text{thres} \qquad (29)$$

The variable thres may indicate a pre-defined/predetermined threshold of a motion vector difference. Otherwise, the motion vectors that may be used for the sub-block-level MC of the current sub-block might be considered inaccurate. In such scenarios, among others, the BIO may still be applied for the sub-block. For example, the variable thres may be signaled and/or determined (e.g., determined by a decoder) based on a desired coding performance.

Figure 23:
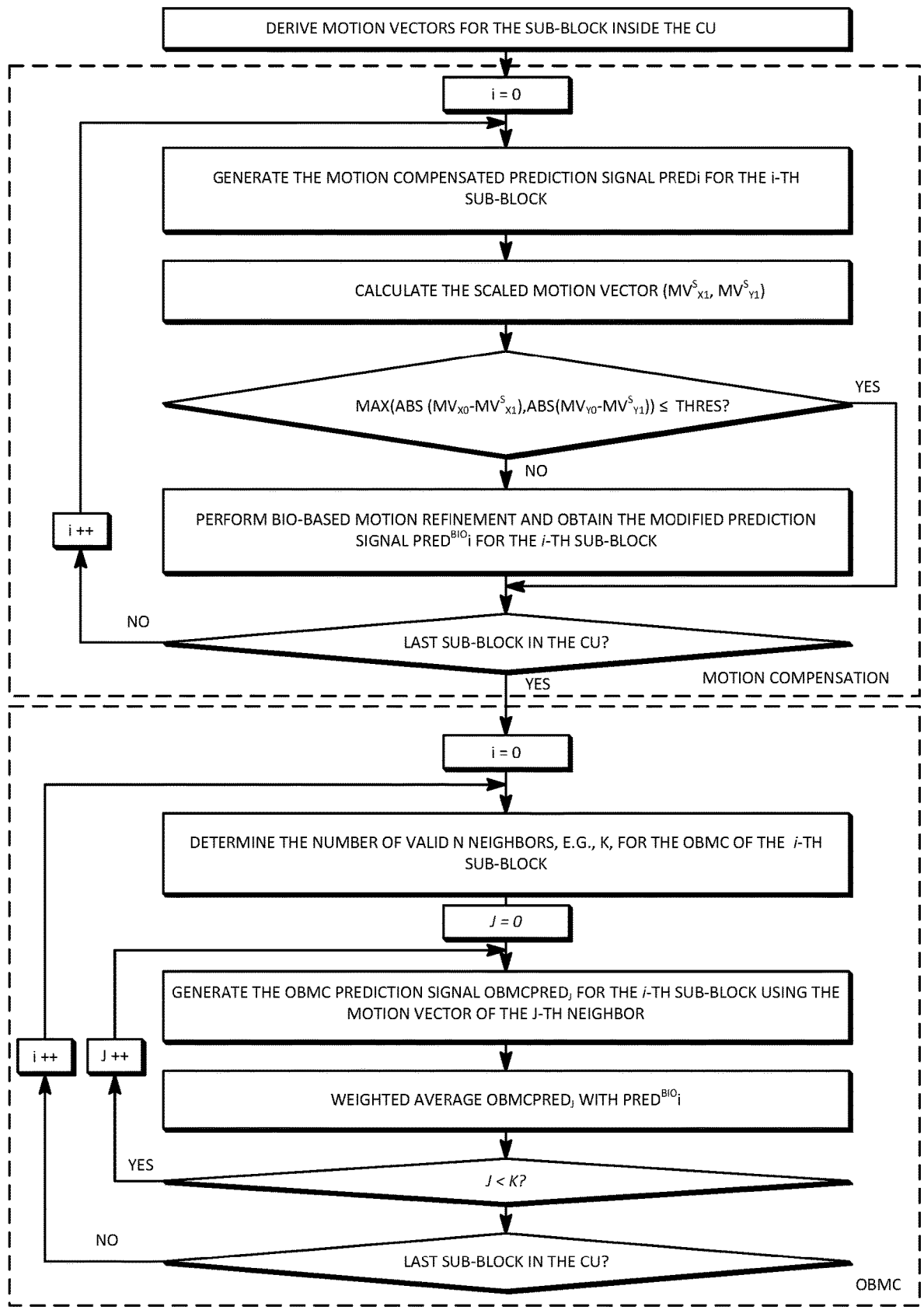
FIG. 23 illustrates an example motion compensation process after skipping the BIO based on motion vector difference.

FIG. 23 illustrates an example prediction generation process in which the BIO may be disabled based on the motion vector difference criterion of (29). As can be seen from (29), the threshold of a motion vector difference (e.g., thres) may be used to determine whether at least one block or sub-block can skip the BIO process at the MC stage. In other words, the threshold may be used to identify where skipping the BIO process may or may not have a non-negligible impact on the overall encoding/decoding complexity. Thresholds may be used to determine whether to skip or to not skip the BIO process. In one or more techniques, a same threshold of motion vector difference for one or more, or all, the pictures may be used at the encoder and/or the decoder. In one or more techniques, one or more different thresholds may be used for different pictures. For example, in a random-access configuration, relatively small threshold(s) may be used for the pictures at high temporal layer(s) (e.g., perhaps due to the smaller motion). For example, relatively large threshold (s) may be used for the pictures at low temporal layer(s) (e.g., due to the larger motion).

As shown in (28) and (29), the motion vector scaling may be applied to $(MV_{x1}, MV_{y1})$ for calculating the motion vector difference. For example, when the motion vector scaling in (28) is applied and/or it is assumed that $\tau_0>\tau_1$, the error incurred by the motion estimation of $(MV_{x1}, MV_{y1})$ may be amplified. Motion vector scaling may be applied (e.g., may always be applied) to the motion vector that is associated with the reference picture which has a relatively large temporal distance from the current picture. For example, when $\tau_0<\tau_1$, the motion vector $(MV_{x1}, MV_{y1})$ may be scaled for calculating the motion vector difference (e.g., as shown by (28) and (29)). Otherwise, for example, where $\tau_0>\tau_1$, the motion vector $(MV_{x0}, MV_{y0})$ may be scaled for calculating the motion vector difference, as indicated as:

$$MV_{x0}^s = MV_{x0} \cdot \frac{\tau_1}{\tau_0}, MV_{y0}^s = MV_{y0} \cdot \frac{\tau_1}{\tau_0} \quad (30)$$

$$\max(\text{abs}(MV_{x1} - MV_{x0}^s), \text{abs}(MV_{y1} - MV_{y0}^s)) \leq thres \quad (31)$$

As described herein, the motion vector scaling may be applied when the temporal distances of the two reference pictures to the current picture are different (e.g., $\tau_0 \neq \tau_1$). As the motion vector scaling could introduce additional errors (e.g., due to the division and/or rounding operations), it could influence (e.g., reduce) the accuracy of the scaled motion vector. To avoid or reduce such errors, among other scenarios, the motion vector difference (e.g., as indicated in (30) and (31)) may be used (e.g., may only be used) for disabling the BIO at the MC stage, perhaps for example when (e.g., only when) the temporal distance of at least two, or up to two, reference pictures (e.g., reference blocks) from the current sub-block may be the same or substantially similar (e.g., $\tau_0=\tau_1$).

As described herein, the motion vector difference may be used as the measurement to determine whether the BIO process can be skipped for at least one sub-block at the MC stage (e.g., based on whether the two reference blocks are similar). When the motion vector difference between two reference blocks is relatively small (e.g., below a threshold), it may be reasonable to assume that the two prediction blocks may be similar (e.g., highly correlated), such that the BIO can be disabled without incurring (e.g., substantial) coding loss. The motion vector difference may be one of a number of ways to measure the similarity (e.g., correlation) between two prediction blocks (e.g., reference blocks). In one or more techniques, the correlation between two prediction blocks may be determined by calculating an average difference between two prediction blocks, for example:

$$Diff = \frac{1}{N} \cdot \sum_{(x,y) \in B} D(I^{(0)}(x, y), I^{(1)}(x, y)) \quad (32)$$

Figure 24:
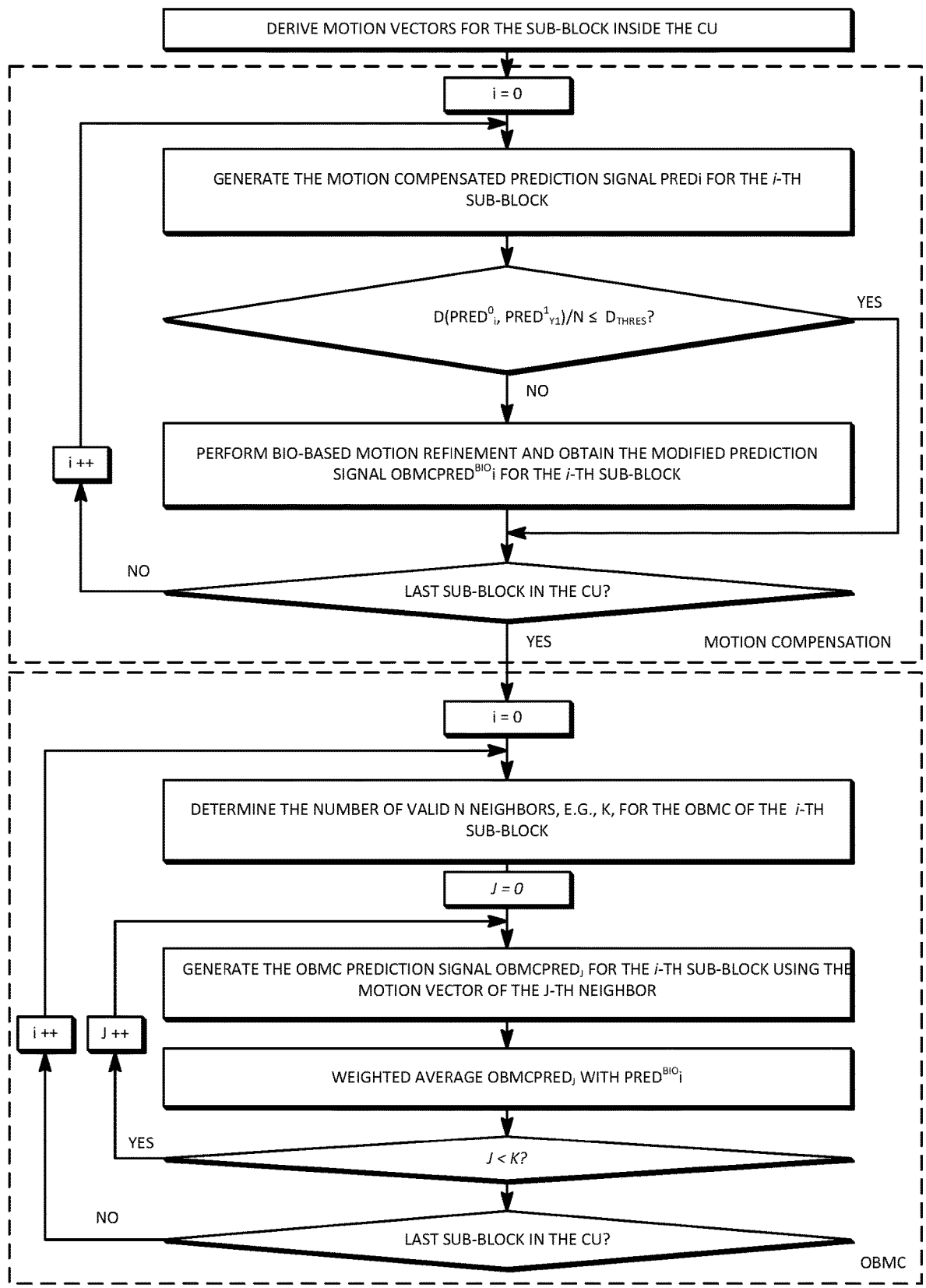
FIG. 24 illustrates an example motion compensation process after skipping the BIO based on a difference between at least two prediction signals.

The variables $I^{(0)}(x, y)$ and $I^{(1)}(x, y)$ are the sample values at the coordinate (x, y) of the motion-compensated blocks derived from the forward and/or backward reference pictures (e.g., reference blocks). The sample values may be associated with that luma values of the respective reference blocks. The sample values may be interpolated from their respective reference blocks. The variables B and N are the set of the sample coordinates and the number of samples as defined within the current block or sub-block, respectively. The variable D is the distortion measurement for which one or more different measurements/metrics may be applied, such as: a sum of square error (SSE), a sum of absolute difference (SAD), and/or a sum of absolute transformed difference (SAID). Given (32), the BIO could be skipped at the MC stage, perhaps for example when the difference measurement may be no larger than one or more pre-defined/predetermined thresholds, e.g., Diff$\leq D_{thres}$. Otherwise, the two prediction signals of the current sub-block may be regarded as dissimilar (e.g., less correlated), for which the BIO may be (e.g., may still be) applied. As described herein, $D_{thres}$ may be signaled or determined by the decoder (e.g., based on the desired coding performance). FIG. 24 illustrates an example of a prediction generation process after the BIO is skipped based on measuring the difference between two prediction signals.

As described herein, the BIO process may be conditionally skipped at the CU or sub-CU (e.g., at sub-blocks with the CU) level. For example, an encoder and/or decoder may determine is BIO may be skipped for a current CU. As described herein, this determination may be based on the similarity of two reference blocks associated with the current CU (e.g., using (28), (29), (30), (31), and/or (32)). If the encoder and/or decoder determines that BIO is to be skipped for the current CU, the encoder and/or decoder may determine if the current CU is coded with sub-block coding enabled. If the current CU is coded with sub-block coding enabled, the encoder and/or decoder may determine that BIO may be skipped for the sub-blocks within the CU.

As shown in FIG. 24, the BIO process may be conditionally skipped for the current CU or the sub-blocks inside the current CU whose distortion between its two prediction signals may be no larger than a threshold. The calculation of the distortion measurement and the BIO process may be performed on a sub-block basis and may be invoked frequently for the sub-blocks in the current CU. The CU-level distortion measurement may be used for determining whether to skip the BIO process for the current CU. A multi-stage early termination may be performed, where the BIO process may be skipped based on the distortion values calculated from different block levels.

Figure 26:
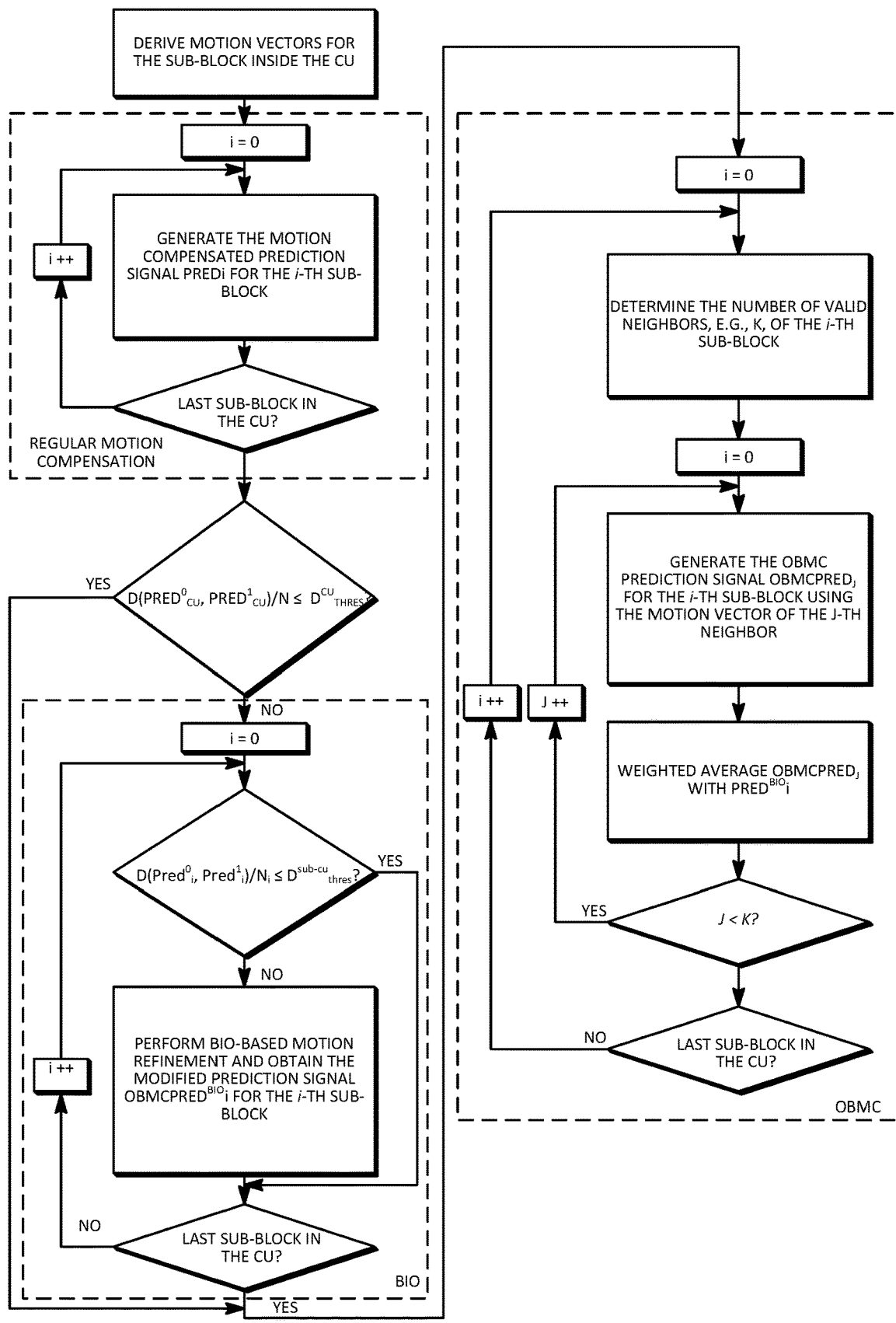
FIG. 26 illustrates an example motion compensation process with a multi-stage BIO early termination.

The distortion may be calculated considering some (e.g., all) samples within the current CU. For example, if the CU-level distortion is sufficiently small (e.g., no larger than a pre-defined CU-level threshold), the BIO process may be skipped for the CU; otherwise, the distortion for each sub-block inside the current CU may be calculated and used to determine whether to skip the BIO process at the sub-block level. FIG. 26 illustrates an example motion compensated prediction process with a multi-stage early termination being applied for the BIO. FIG. 26 variables, $Pred_{cu}^0$, and $Pred_{cu}^1$ represent prediction signals generated for the current CU from the reference picture list L0 and L1, and $Pred_i^0$ and $Pred_i^1$ represent the corresponding prediction signals generated for the i-th sub-block inside the CU.

As described herein, the CU-level distortion may be calculated to determine whether, for example, the BIO operation may be disabled for the current CU or not. The motion information of the sub-blocks inside the CU may or may not highly correlate. The distortions of sub-blocks inside the CU may vary. A multi-stage early termination may be performed. For example, a CU may be divided into multiple groups of sub-blocks, and a group may include contiguous sub-blocks that have similar (e.g., the same) motion information (e.g., the same reference picture indices and the same motion vectors). The distortion measurement may be calculated for each sub-block group. If, for example, the distortion of one sub-block group is small enough (e.g., no larger than a pre-defined threshold), the BIO process may be skipped for the samples inside the sub-block group; otherwise, the distortion for each sub-block inside the sub-block group may be calculated and used to determine whether to skip the BIO process for the sub-block.

In (32), $I^{(0)}(x, y)$ and $I^{(1)}(x, y)$ may refer to the values (e.g., the luma values) of the motion compensated samples at the coordinate (x, y) obtained from the reference picture lists L0 and L1. The values of the motion compensated samples may be defined at the precision of the input signal bit-depth (e.g., 8-bit or 10-bit if the input signal is 8-bit or 10-bit video). The prediction signal of one bi-predictive block may be generated by averaging the two prediction signals from the L0 and L1 at the precision of the input bit-depth.

Figure 27:
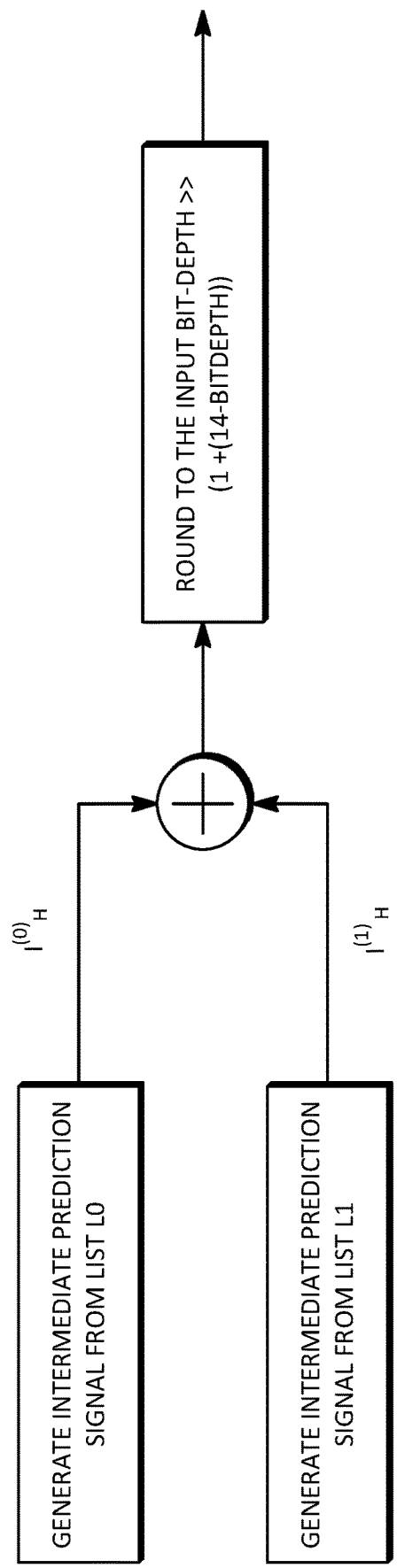
FIG. 27 illustrates an example bi-prediction process when averaging the two intermediate prediction signals at high precision.

If, for example, the MVs point to fractional sample positions, $I^{(0)}(x, y)$ and $I^{(1)}(x, y)$ are obtained using interpolation at one intermediate precision (which may be higher than the input bit-depth), and the intermediate prediction signals are then rounded to the input bit-depth prior to the average operation. For example, the two prediction signals at the precision of the input bit-depth may be averaged at the intermediate precision (e.g., an intermediate precision specified in H.265/HEVC and JEM), if fractional MVs are used for one block. If, for example, the MVs used to obtain $I^{(0)}(x, y)$ and $I^{(1)}(x, y)$ correspond to fractional sample positions, the interpolation filter process may keep the intermediate value at high precision (e.g., the intermediate bit-depth). For example, when one of two MVs is integer motion (e.g., the corresponding prediction is generated without applying interpolation), the precision of the corresponding prediction may be increased to the intermediate bit-depth before the averaging is applied. FIG. 27 illustrates an example bi-prediction process when averaging the two intermediate prediction signals at the high precision, where) $I_h^{(0)}$ and $I_h^{(1)}$ refer to the two prediction signals obtained from the list L0 and L1 at the intermediate bit-depth (e.g., 14-bit as specified in HEVC and JEM) and BitDepth indicate the bit-depth of the input video.

Given the bi-prediction signals generated at high bit-depth, the corresponding distortion between the two prediction blocks in equation (32) may be calculated at the intermediate precision, as specified as:

$$Diff_h = \frac{1}{N} \cdot \sum_{(x,y) \in B} D(I_h^{(0)}(x, y), I_h^{(1)}(x, y)) \qquad (33)$$

where $I_h^{(0)}(x, y)$ and $I_h^{(1)}(x, y)$ are the high-precision sample values at the coordinate (x, y) of the prediction blocks generated from L0 and L1, respectively; $Diff_h$ represents the corresponding distortion measurement as calculated at the intermediate bit-depth. Additionally, perhaps due to the high bit-depth distortion in (33), the CU-level threshold and the sub-block-level threshold used by the BIO early termination (e.g., as described herein with respect to in FIG. 24 and FIG. 26) may be adjusted such that they are defined at the same bit-depth of the prediction signals. Using the L1 norm distortion (e.g., SAD) as an example, the following equations may explain how to adjust the distortion thresholds from the input bit-depth to the intermediate bit-depth:

$$D_{hp\text{-}thres}^{cu} = D_{thres}^{cu} << (14 - BitDepth) \qquad (34)$$

$$D_{hp\text{-}thres}^{sub\text{-}cu} = D_{thres}^{sub\text{-}cu} << (14 - BitDepth) \qquad (35)$$

The variables $D_{thres}^{cu}$ and $D_{thres}^{sub\text{-}cu}$ are the CU-level and sub-block distortion thresholds at the precision of the input bit-depth; $D_{hp\text{-}thres}^{cu}$ and $D_{hp\text{-}thres}^{sub\text{-}cu}$ are the corresponding distortion thresholds at the precision of the intermediate bit-depth.

As described herein, the BIO may provide sample-wise motion refinement, which may be calculated based on the local gradient information at one or more, or each, sample location in at least one motion compensated block. For the sub-blocks within one region that may contain less high-frequency details (e.g., the flat area), the gradients that may be derived using the gradient filters in Table 1 may tend to be small. As shown in equation (4), when the local gradients (e.g., $\partial I^{(k)}(x,y)/\partial x$ and $\partial I^{(k)}(x,y)/\partial y$) are close to be zero, the final prediction signal obtained from the BIO may be approximately equal to the prediction signal generated by the conventional bi-prediction, e.g., $pred_{BIO}(x, y) \approx \frac{1}{2}(I^{(0)}(x, y) + I^{(1)}(x, y))$.

Figure 25:
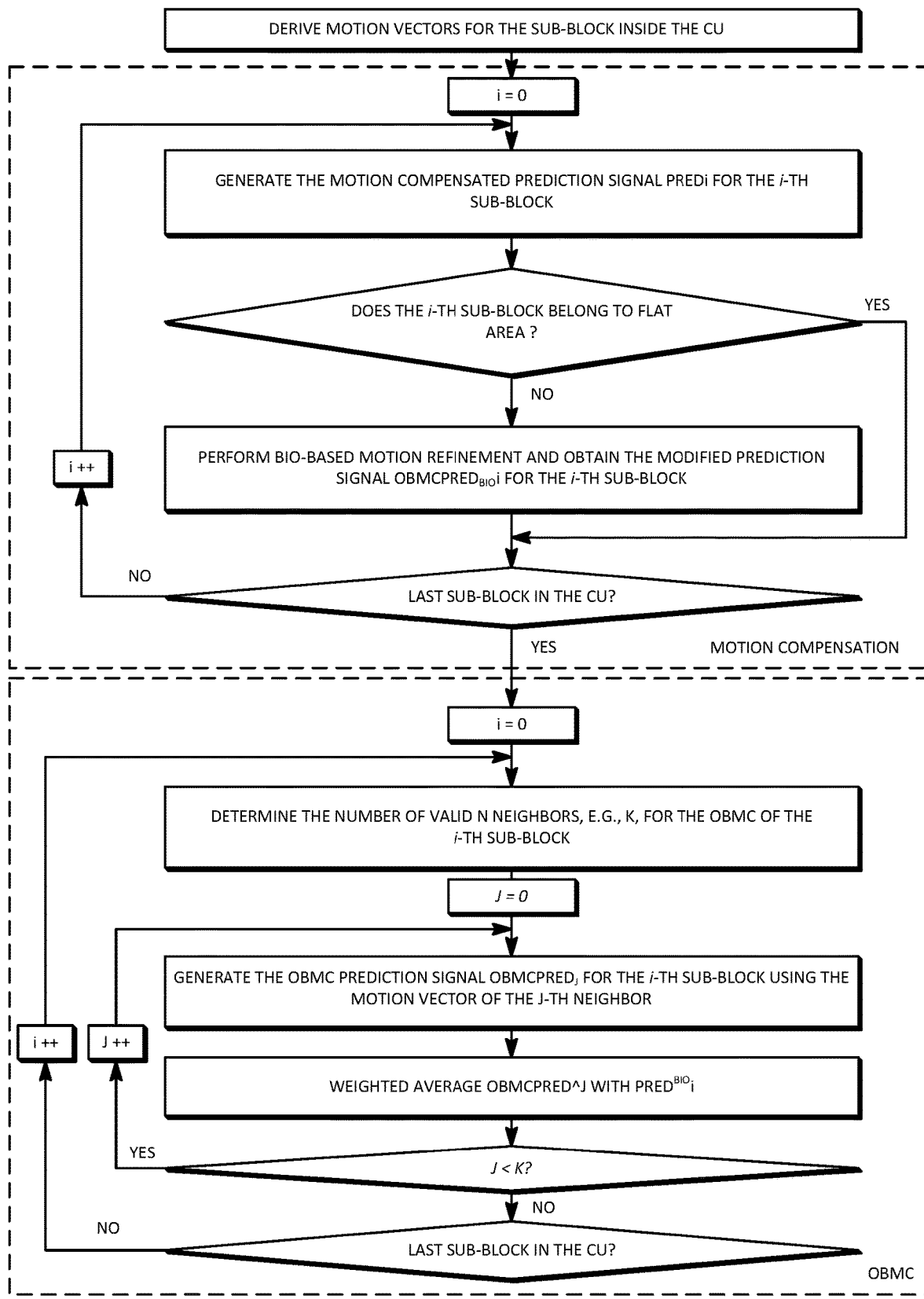
FIG. 25 illustrates an example motion compensation process after skipping the BIO based on a gradient information.

In one or more techniques, the BIO may be applied (e.g., may only be applied) to the one or more predication samples of the sub-blocks that may contain sufficient and/or abundant high-frequency information. The determination of whether the prediction signals of at least one sub-block contains high-frequency information can be made, for example, based on the average magnitude of the gradients for the samples within the at least one sub-block. Perhaps if the average is smaller than at least one threshold, for example, the sub-block may be classified as a flat area and/or the BIO might not be applied to the sub-block. Otherwise, the at least one sub-block may be considered to contain sufficient high-frequency information/details where the BIO may still be applicable. The value of the one or more thresholds may be pre-determined and/or adaptively determined for one or more, or each, reference picture, perhaps for example based on the average gradients in that reference picture. In one or more techniques, the gradient information may be calculated (e.g., may only be calculated) to decide whether the current sub-block may belong to one flat area, or not. In some techniques, this gradient information might not be as accurate as the gradient values that may be used for generating the BIO prediction signal (e.g., as shown in (4)). Relatively simple gradient filters may be used to determine whether to apply BIO to at least one sub-block. For example, a 2-tap filter [−1, 1] may be applied for deriving the horizontal and/or vertical gradients. FIG. 25 shows an example flowchart of a prediction generation process after applying gradient-based BIO skipping.

The one or more techniques described herein individually that may skip the BIO at the MC stage, may be jointly applied (e.g., more than one technique may be combined, etc.). The one or more techniques, thresholds, equations, and/or factors/conditions, etc., described herein can be freely combined. One or more different combinations of the techniques, thresholds, equations, and/or factors/conditions, etc., described herein can provide different tradeoffs in terms of the coding performance and/or the encoding/decoding complexity reduction. For example, one or more of the techniques, thresholds, equations, and/or factors/conditions, etc., described herein may be jointly or separately implemented such that the BIO process may be (e.g., may be completely) disabled for at least one block/sub-block.

Figure 28A:
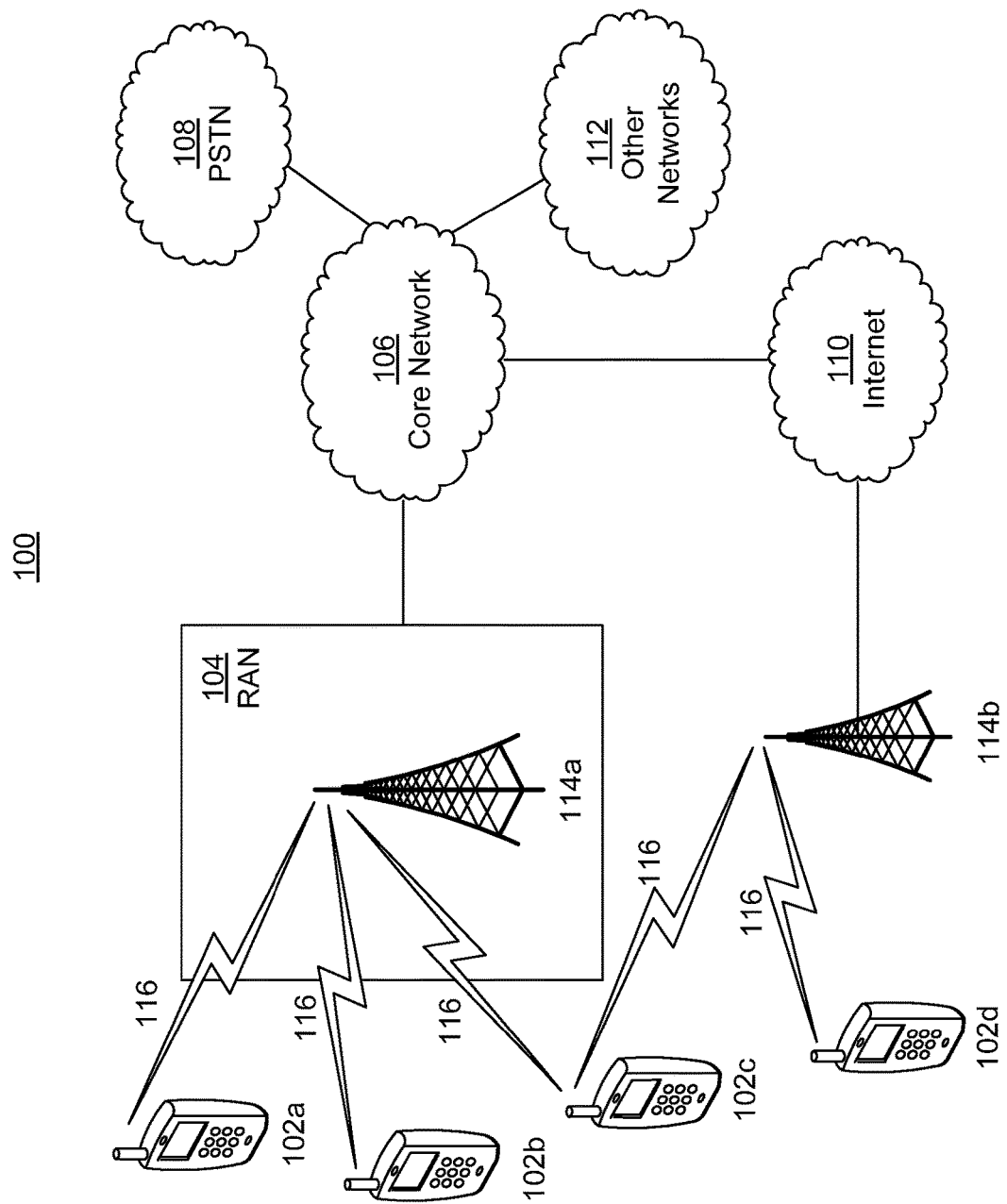
FIG. 28A is a system diagram of an example communications system in which one or more disclosed embodiments may be implemented.

FIG. 28A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 28A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (M IMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using Previously Presented Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 28A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114*b* and the WTRUs 102*c*, 102*d* may implement a radio technology such as IEEE 802.11 to establish a wireless local area network (WLAN). In an embodiment, the base station 114*b* and the WTRUs 102*c*, 102*d* may implement a radio technology such as IEEE 802.15 to establish a wireless personal area network (WPAN). In yet another embodiment, the base station 114*b* and the WTRUs 102*c*, 102*d* may utilize a cellular-based RAT (e.g., WCDMA, CDMA2000, GSM, LTE, LTE-A, LTE-A Pro, NR etc.) to establish a picocell or femtocell. As shown in FIG. 28A, the base station 114*b* may have a direct connection to the Internet 110. Thus, the base station 114*b* may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102*a*, 102*b*, 102*c*, 102*d*. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 28A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102*a*, 102*b*, 102*c*, 102*d* to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102*a*, 102*b*, 102*c*, 102*d* in the communications system 100 may include multi-mode capabilities (e.g., the WTRUs 102*a*, 102*b*, 102*c*, 102*d* may include multiple transceivers for communicating with different wireless networks over different wireless links). For example, the WTRU 102*c* shown in FIG. 28A may be configured to communicate with the base station 114*a*, which may employ a cellular-based radio technology, and with the base station 114*b*, which may employ an IEEE 802 radio technology.

Figure 28B:
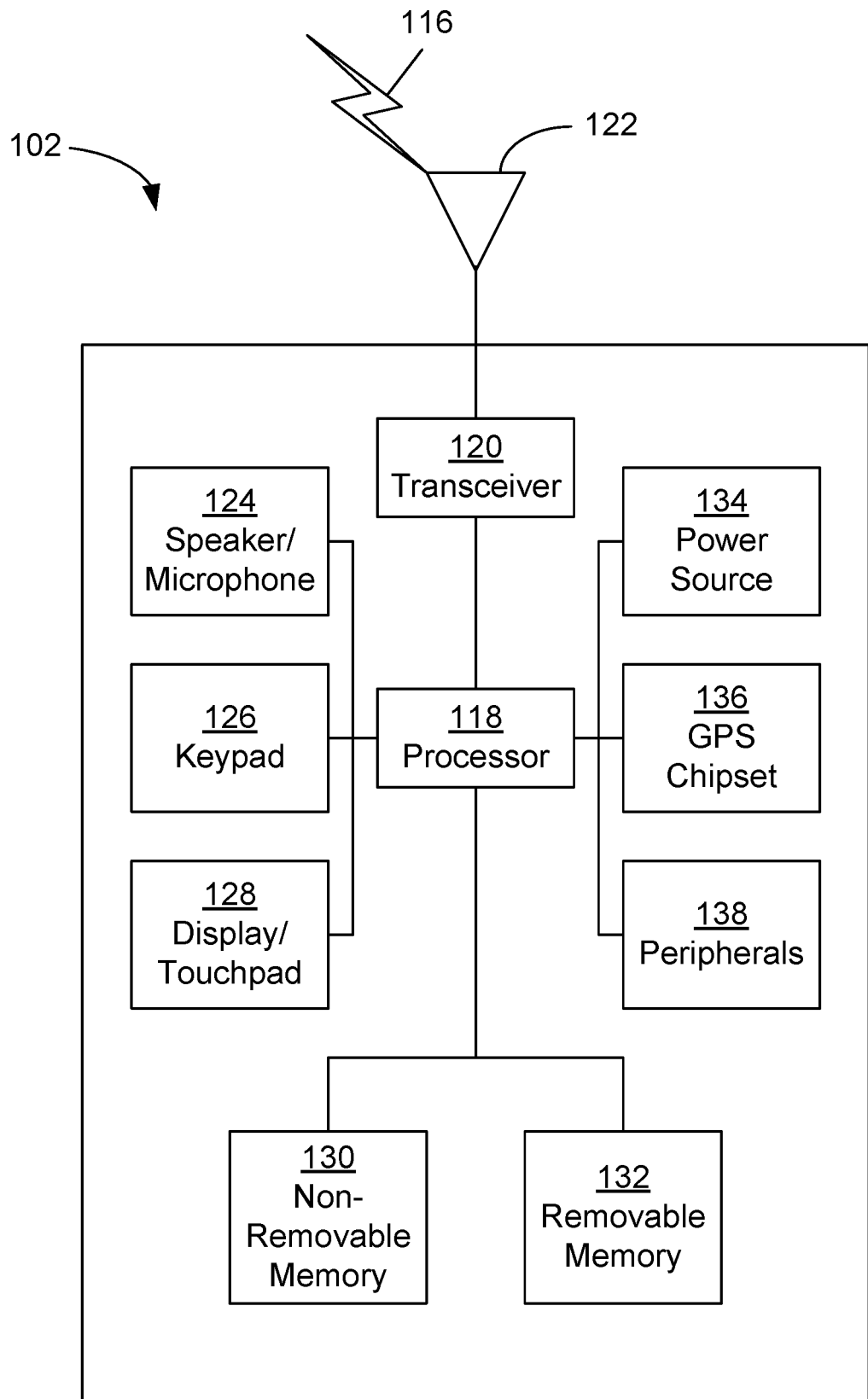
FIG. 28B is a system diagram of an example wireless transmit/receive unit (WTRU) that may be used within the communications system illustrated in FIG. 28A.

FIG. 28B is a system diagram illustrating an example WTRU 102. As shown in FIG. 28B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 28B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114*a*) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 28B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit 139 to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 28C:
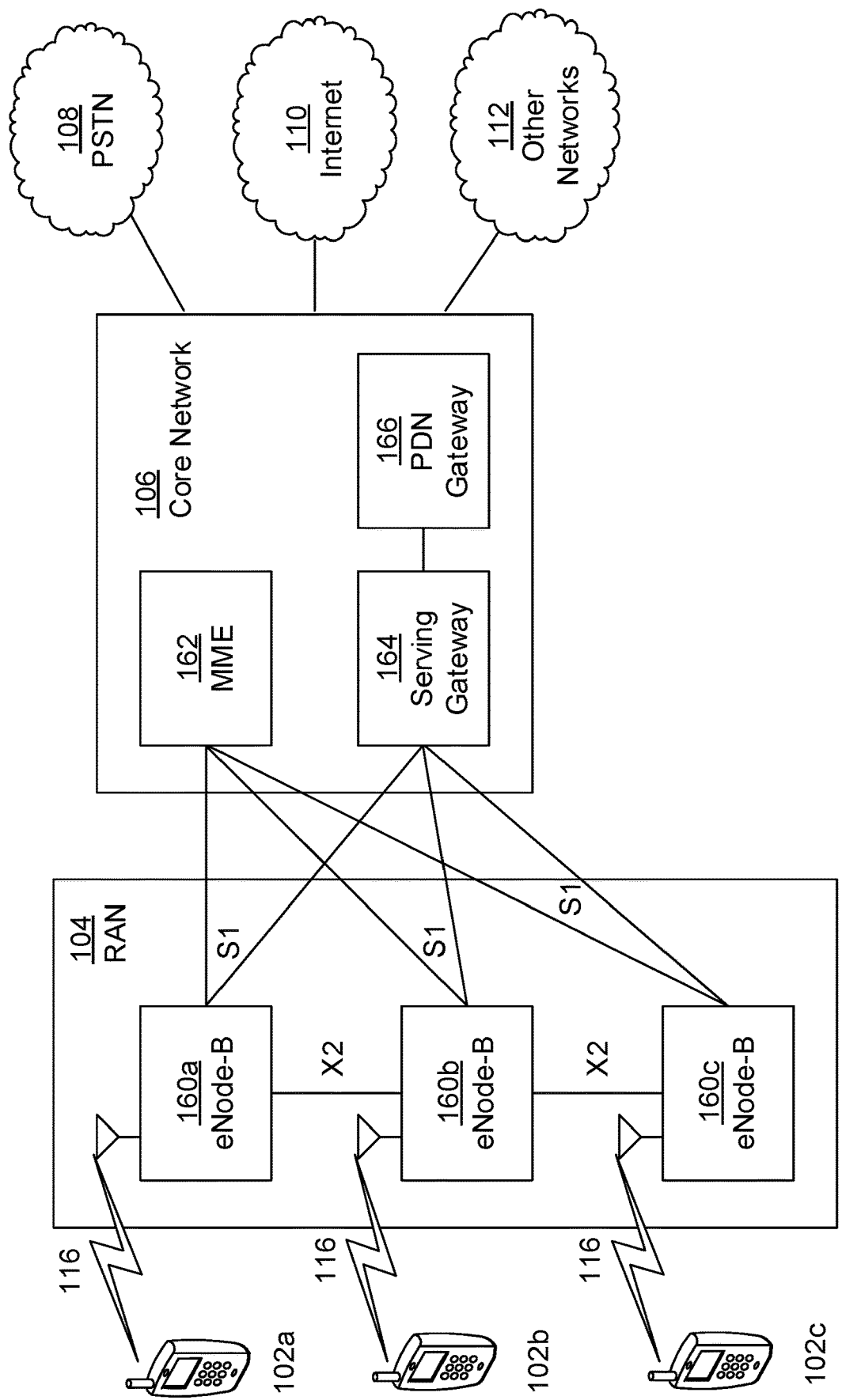
FIG. 28C is a system diagram of an example radio access network (RAN) and an example core network (CN) that may be used within the communications system illustrated in FIG. 28A.

FIG. 28C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 28C, the eNode-Bs 160a, 160b, 160c may communicate with one another over an X2 interface.

The CN 106 shown in FIG. 28C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers Although the WTRU is described in FIGS. 29A-29D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life)

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

Figure 28D:
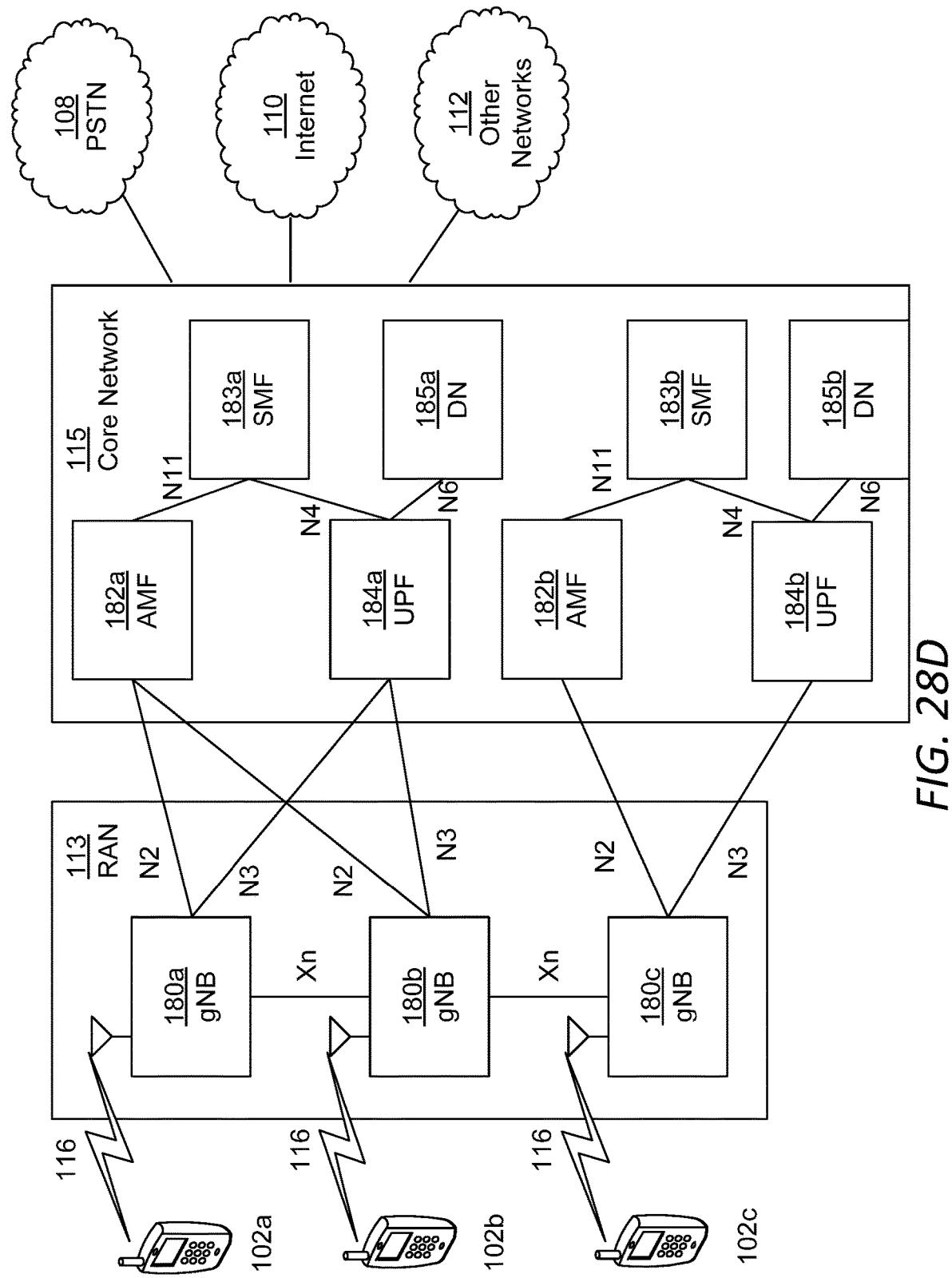
FIG. 28D is a system diagram of further example RAN and a further example CN that may be used within the communications system illustrated in FIG. 28A.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code FIG. 28D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 28D, the gNBs 180a, 180b, 180c may communicate with one another over an Xn interface.

The CN 115 shown in FIG. 28D may include at least one AMF 182a, 182b, at least one UPF 184a,184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 29A-29D, and the corresponding description of FIGS. 29A-29D, one or more, or all, of the functions described herein with regard to one or more of: WTRU 102a-d, Base Station 114a-b, eNode-B 160a-c, MME 162, SGW 164, PGW 166, gNB 180a-c, AMF 182a-ab, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A device for video decoding, comprising:
a processor, the processor configured to:
obtain a first plurality of sample values in a first reference prediction block of a current subblock and a second plurality of sample values in a second reference prediction block of the current subblock, wherein the first reference prediction block is associated with a first reference picture list of the current subblock, and the second reference prediction block is associated with a second reference picture list of the current subblock;
derive a variable sum of absolute differences (SAD) based on between the first plurality of sample values of the first reference prediction block and the second plurality of sample values of the second reference prediction block;
determine to disable bi-directional optical flow (BIO) for the current subblock based on the variable SAD being less than a value; and
decode the current subblock based on the determination to disable BIO for the current subblock.

2. The device of claim 1, wherein the first reference picture is associated with a first reference picture list, and the second reference picture is associated with a second reference picture list, and wherein the first reference picture list and the second reference picture list are different.

3. The device of claim 1, wherein the processor is configured to: obtain a first interpolated sample value based on at least one of the first plurality of sample values; and obtain a second interpolated sample value based on at least one of the second plurality of sample values, wherein the variable is derived further deriving the SAD between the first plurality of sample values of the first prediction block and the second plurality of sample values of the second prediction block comprises deriving the SAD based on the first interpolated sample value and the second interpolated sample value.

4. The device of claim 1, wherein the device further comprises a memory.

5. A method for video decoding, comprising:
obtaining a first plurality of sample values in a first reference prediction block of a current subblock and a second plurality of sample values in a second reference prediction block of the current subblock, wherein the first reference prediction block is associated with a first reference picture list of the current subblock, and the second reference prediction block is associated with a second reference picture list of the current subblock;
deriving a variable sum of absolute differences (SAD) based on between the first plurality of sample values of the first reference prediction block and the second plurality of sample values of the second reference prediction block;
determining to disable bi-directional optical flow (BIO) for the current subblock based on the variable SAD being less than a value; and decoding the current subblock based on the determination to disable BIO for the current subblock.

6. The method of claim 5, further comprising determining a prediction sample value difference based on the first plurality of sample values and the second plurality of sample values, wherein the first reference block is associated with a first reference picture list, and the second reference block is associated with a second reference picture list, wherein the first reference picture list and the second reference picture list are different, and wherein the variable is derived based on the prediction sample value difference.

7. A non-transitory computer-readable medium including instructions, which, when executed by one or more processors, cause the one or more processors to perform the method of claim 5.

8. The method of claim 5, comprising:
obtaining a first interpolated sample value based on at least one of the first plurality of sample values; and obtaining a second interpolated sample value based on at least one of the second plurality of sample values, wherein deriving the SAD between the first plurality of sample values of the first prediction block and the second plurality of sample values of the second prediction block comprises deriving the SAD based on the first interpolated sample value and the second interpolated sample value.

9. A device for video encoding, comprising:
a processor, the processor configured to:
obtain a first plurality of sample values in a first reference prediction block of a current subblock and a second plurality of sample values in a second reference prediction block of the current subblock, wherein the first reference prediction block is associated with a first reference picture list of the current subblock, and the second reference prediction block is associated with a second reference picture list of the current subblock;
obtain a variable sum of absolute differences (SAD) based on between the first plurality of sample values of the first reference prediction block and the second plurality of sample values of the second reference prediction block;

determine to disable bi-directional optical flow (BIO) for the current subblock based on the variable SAD being less than a value; and encode the current subblock based on the determination to disable BIO for the current subblock.

10. The device of claim 9, wherein the processor is configured to determine a prediction sample value difference based on the first plurality of sample values and the second plurality of sample values, wherein the first reference picture is associated with a first reference picture list, and the second reference picture is associated with a second reference picture list, wherein the first reference picture list and the second reference picture list are different, and wherein the variable is obtained based on the prediction sample value difference.

11. The device of claim 9, wherein the device further comprises a memory.

12. The device of claim 9, wherein the processor is configured to:

obtain a first interpolated sample value based on at least one of the first plurality of sample values; and obtain a second interpolated sample value based on at least one of the second plurality of sample values, wherein obtaining the SAD between the first plurality of sample values of the first prediction block and the second plurality of sample values of the second prediction block comprises obtaining the SAD based on the first interpolated sample value and the second interpolated sample value.

13. A method for video encoding, comprising:

obtaining a first plurality of sample values in a first reference prediction block of a current subblock and a second plurality of sample values in a second reference prediction block of the current subblock, wherein the first reference prediction block is associated with a first reference picture list of the current subblock, and the second reference prediction block is associated with a second reference picture list of the current subblock;

obtaining a variable sum of absolute differences (SAD) based on between the first plurality of sample values of the first reference prediction block and the second plurality of sample values of the second reference prediction block;

determining to disable bi-directional optical flow (BIO) for the current subblock based on the variable SAD being less than a value; and encoding the current subblock based on the determination to disable BIO for the current subblock.

14. The method of claim 13, further comprising determining a prediction sample value difference based on the first plurality of sample values and the second plurality of sample values, wherein the first reference picture is associated with a first reference picture list, and the second reference picture is associated with a second reference picture list, wherein the first reference picture list and the second reference picture list are different, and wherein the variable is obtained based on the prediction sample value difference.

15. A non-transitory computer-readable medium including instructions, which, when executed by one or more processors, cause the one or more processors to perform the method of claim 13.

16. The method of claim 13, comprising:

obtaining a first interpolated sample value based on at least one of the first plurality of sample values; and obtaining a second interpolated sample value based on at least one of the second plurality of sample values, wherein obtaining the SAD between the first plurality of sample values of the first prediction block and the second plurality of sample values of the second prediction block comprises obtaining the SAD based on the first interpolated sample value and the second interpolated sample value.

* * * * *